(12) United States Patent
Friske et al.

(10) Patent No.: US 11,334,833 B2
(45) Date of Patent: May 17, 2022

(54) DETERMINING PROPENSITIES OF ENTITIES WITH REGARD TO BEHAVIORS

(71) Applicant: AT&T Intellectual Property I, L.P., Atlanta, GA (US)

(72) Inventors: Morgan Friske, Richardson, TX (US); Brian Bachman, Grapevine, TX (US); James Pratt, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 32 days.

(21) Appl. No.: 16/881,343

(22) Filed: May 22, 2020

(65) Prior Publication Data

US 2021/0365863 A1    Nov. 25, 2021

(51) Int. Cl.
*G06Q 30/02* (2012.01)
*G06Q 10/06* (2012.01)

(52) U.S. Cl.
CPC ... *G06Q 10/06375* (2013.01); *G06Q 30/0202* (2013.01); *G06Q 30/0281* (2013.01); *G06Q 30/0224* (2013.01); *G06Q 30/0255* (2013.01)

(58) Field of Classification Search
CPC .......................... G06Q 30/02; G06Q 10/06375
See application file for complete search history.

(56) References Cited

U.S. PATENT DOCUMENTS

| | | |
|---|---|---|
| 7,155,508 B2 | 12/2006 | Sankuratripati et al. |
| 7,933,895 B2 | 4/2011 | Amjadi |
| 8,630,892 B2 | 1/2014 | Bhalla et al. |
| 8,650,184 B2 | 2/2014 | Kowalchuk et al. |
| 8,719,105 B2 | 5/2014 | Minnis et al. |
| 9,002,729 B2 | 4/2015 | Natoli et al. |
| 9,576,499 B2 | 2/2017 | Kostoff et al. |

(Continued)

FOREIGN PATENT DOCUMENTS

WO    0167332    9/2001

OTHER PUBLICATIONS

Friedman, "A.I. Still Needs H.I. (Human Intelligence), for Now," New York Times, Feb. 26, 2019, 3 pages.

(Continued)

*Primary Examiner* — Vincent M Cao
(74) *Attorney, Agent, or Firm* — Amin, Turocy & Watson, LLP

(57) ABSTRACT

Propensities of entities, comprising human users and virtual assistants (VAs), for various behaviors can be determined and used to facilitate managing interactions between entities. An interaction management component (IMC) can determine an aggregate propensity metric relating to a propensity of an entity to engage in a behavior based on a cross-correlation of respective propensity metrics relating to respective propensities of the entity to engage in respective behaviors. During an interaction between entities, including the entity, IMC can determine an action to perform to interact with the entity based on the aggregate propensity metric and a context determined for the interaction. The action can be one that is predicted to elicit a defined action by the entity in response to the action. During (or after) the interaction, IMC can update behavior attributes, context, and/or aggregate propensity metric associated with the entity based on actions performed during the interaction.

20 Claims, 10 Drawing Sheets

(56) References Cited

U.S. PATENT DOCUMENTS

| | | | |
|---|---|---|---|
| 9,710,821 | B2 | 7/2017 | Heath |
| 10,373,177 | B2 | 8/2019 | Vijayaraghavan et al. |
| 10,412,430 | B2 | 9/2019 | Ferber et al. |
| 2002/0138333 | A1* | 9/2002 | DeCotiis ............... G06Q 10/067 705/7.32 |
| 2004/0213389 | A1* | 10/2004 | Ljubicich ............... G06Q 30/02 379/111 |
| 2007/0050201 | A1 | 3/2007 | Gardner et al. |
| 2010/0042387 | A1* | 2/2010 | Gibbon ................. G06Q 30/02 703/6 |
| 2010/0169176 | A1 | 7/2010 | Turakhia |
| 2011/0040636 | A1* | 2/2011 | Simmons ........... G06Q 30/0243 705/14.71 |
| 2011/0119108 | A1 | 5/2011 | Black et al. |
| 2011/0307257 | A1* | 12/2011 | Pereg ................. G06Q 30/0202 704/251 |
| 2012/0158517 | A1 | 6/2012 | Rathod |
| 2013/0041750 | A1 | 2/2013 | Ye et al. |
| 2013/0138507 | A1 | 5/2013 | Kumar et al. |
| 2013/0346154 | A1* | 12/2013 | Holz ................. G06Q 30/0201 705/7.31 |
| 2014/0279782 | A1* | 9/2014 | Davies ............... G06Q 30/0201 706/46 |
| 2014/0289017 | A1 | 9/2014 | Trenkle et al. |
| 2015/0304373 | A1* | 10/2015 | Schleier-Smith ...... G06Q 30/02 715/753 |
| 2016/0189312 | A1 | 6/2016 | Lee et al. |
| 2016/0267499 | A1 | 9/2016 | Valimaki |
| 2017/0357987 | A1 | 12/2017 | Maugans et al. |
| 2018/0285969 | A1 | 10/2018 | Busch et al. |
| 2019/0019222 | A1* | 1/2019 | Agrawal ............ G06Q 30/0269 |
| 2019/0164212 | A1* | 5/2019 | Price ...................... G06Q 30/02 |
| 2019/0289085 | A1 | 9/2019 | Miller et al. |
| 2019/0384640 | A1 | 12/2019 | Swamy et al. |

OTHER PUBLICATIONS

"[24]7.ai," https://www.247.ai/, 3 pages.

Streeter, "Capital One Doubles Down on Chatbot with New Features and Marketing," The Financial Brand, https://thefinancialbrand.com/93003/capital-one-eno-chatbot-marketing-virtual-digital-assistant/, Feb. 12, 2020, 6 pages.

Boyer et al., "Customer Behavior in an Online Ordering Application: A Decision Scoring Model," Decision Sciences, vol. 36, No. 4, Dec. 2005, 30 pages.

Grigoroudis et al., "Tracking Changes of E-Customer Preferences Using Multicriteria Analysis," Graduate Technological Education Institute of Piraeus, Department of Business Administration Marketing Laboratory, Jul. 2006, 33 pages.

Kwan et al., "An e-customer behavior model with online analytical mining for internet marketing planning," Decision Support Systems 41 (2005), 16 pages.

Nash et al., "Customer Experience 2.0: How Data, Technology, and Advanced Analytics are Taking an Integrated, Seamless Customer Experience to the Next Frontier," Journal of Integrated Marketing Communications, 2013, 8 pages.

\* cited by examiner

DETERMINING PROPENSITIES OF ENTITIES WITH REGARD TO BEHAVIORS

TECHNICAL FIELD

This disclosure relates generally to electronic communications, e.g., to determining propensities of entities with regard to behaviors.

BACKGROUND

Communication devices (e.g., landline phones, mobile phones, electronic pads or tablets, computers, . . . ) can be utilized to engage in electronic communications (e.g., voice and/or data traffic) between entities associated with the communication devices. Various services can be provided to and utilized by entities using communication devices in a communication network.

The above-described description is merely intended to provide a contextual overview regarding electronic communications, and is not intended to be exhaustive.

DETAILED DESCRIPTION

Figure 1:
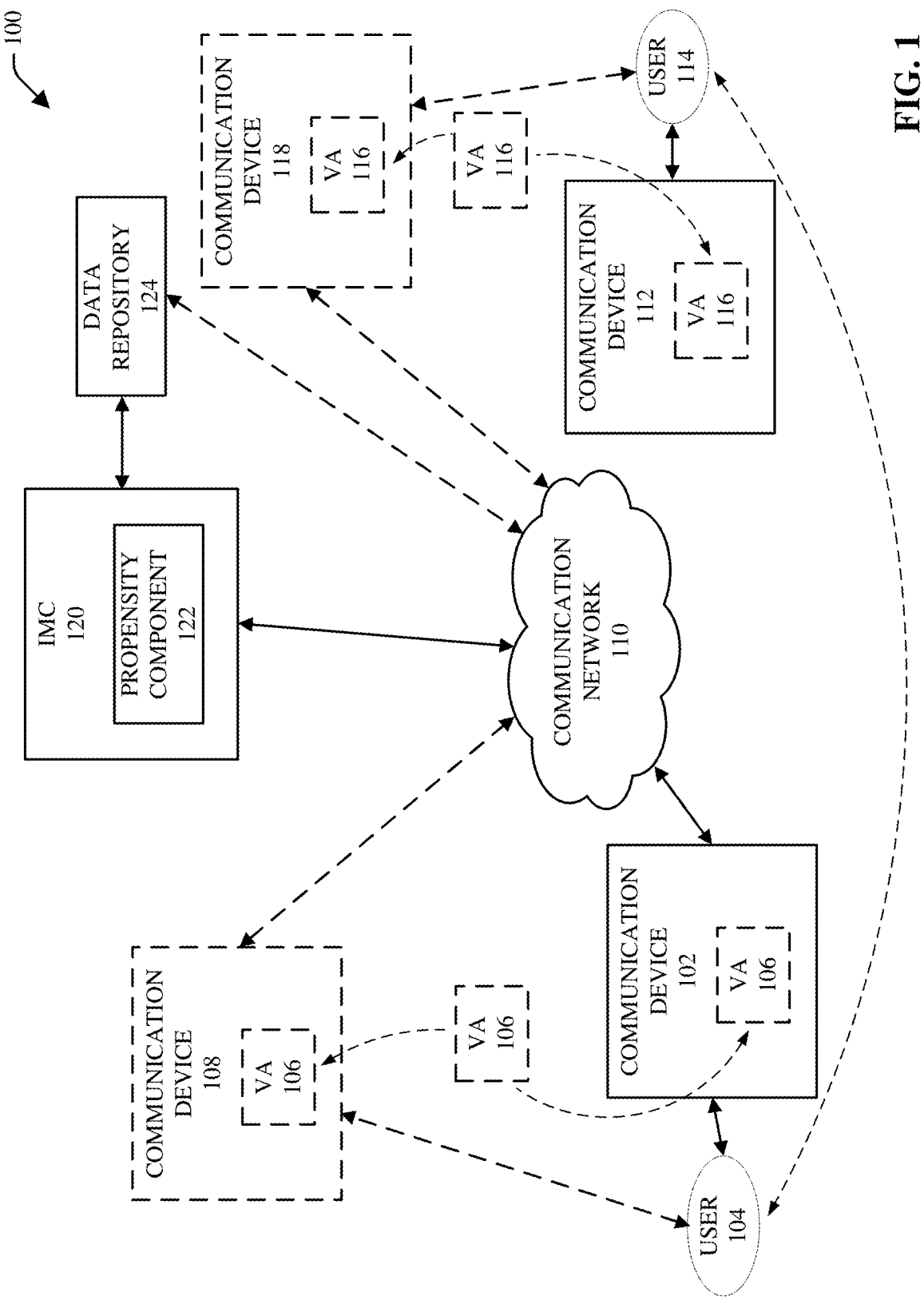
FIG. 1 illustrates a block diagram of an example system that can determine propensities of entities for various behaviors and use such propensities to facilitate managing interactions between entities, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Communication devices (e.g., landline phones, mobile phones, electronic pads or tablets, computers, devices in or integrated with vehicles, . . . ), can operate and communicate via wireline or wireless communication connections (e.g., communication links or channels) in a communication network to perform desired transfers of data (e.g., voice and/or data communications), utilize services, engage in transactions or other interactions, and/or perform other operations. For example, communication devices can be utilized to engage in online-related commerce and/or perform transactions between entities associated with the communication devices, wherein the entities can comprise human users or other users or entities, such as virtual assistants (VAs) and/or software entities or components. As another example, communication devices can be utilized to utilize or provide a service, wherein the communication session between the communication devices can involve one or more human users, one or more VAs, and/or one or more other entities (e.g., software entities or components). With further regard to VAs, VAs can, for example, engage in and/or complete conversations, on behalf of humans, with other humans or with other VAs.

Tracking of a propensity of entities (e.g., user, such as a customer; or VA, such as, for example, a VA acting on behalf of a user) for various behaviors in interactions with a person (e.g., service provider representative) or a VA (e.g., VA acting on behalf of a service provider) can be desirable (e.g., wanted and/or beneficial) to a service provider. Various behaviors, including, for example, churn, payment scheduling, likelihood to purchase a product or service, digital adoption, and/or other types of behaviors of entities can assist in building a more complete picture of an entity's desires (e.g., wants, wishes, or needs) and journey. Knowledge regarding such various behaviors can enable the service provider to develop a richer and more personalized entity experience and predict products and services that can satisfy (e.g., meet) the desires (e.g., wants, wishes, or needs) of an entity.

Traditionally, to the extent that looking at the behavior of customers has even been done, it typically has been done uniquely and independently through human agents. It can be desirable though to track the various behaviors of entities, and track the propensities of entities for various behaviors, in a coordinated manner such that they can be coordinated across the entity experience in a catalogued, referenced, and repeatable way. It also can be desirable to have techniques for this cataloging to share the entity experience (e.g., experience of a customer or VA acting on behalf of the customer) experience with multiple groups of service provider entities (e.g., human service provider representatives and/or VAs acting on behalf of the service provider) impacting what is viewed from the entity's perspective as a single experience from the service provider.

To that end, techniques for determining propensities of entities (e.g., human users or VAs) for various behaviors and using such propensities to facilitate managing interactions between entities are presented. The disclosed subject matter can comprise an interaction management component (IMC) that can determine a propensity metric relating to a propensity of an entity (e.g., user, such as a customer; or a VA acting on behalf of the user) to engage in or exhibit a behavior based at least in part on a behavior attribute(s) of the entity, which can be determined (e.g., by the IMC) from a previous action(s) performed by the entity. During an interaction between entities, including the entity and another entity(ies) (e.g., a service provider representative, or a VA acting on behalf of the service provider), the IMC can determine an action to perform to interact with the entity, via a device (e.g., communication device or VA device) associated with the entity, based at least in part on the propensity metric and a context (e.g., current context) determined for the interaction (e.g., by the IMC). For instance, the IMC can determine the action that is predicted to elicit (e.g., most likely to elicit) a defined favorable action by the entity (e.g., cause the entity to perform the defined favorable action) in response (e.g., in direct or indirect response) to the action performed by the other entity during the interaction.

For example, if the entity is a customer who has a subscription for mobility services (e.g., wireless phone and data services) with the service provider with a question regarding the customer's account, the IMC (e.g., employing a propensity component) can determine, generate, and/or analyze one or more propensity models relating to one or more behaviors of the customer based at least in part on one or more propensity metrics that the IMC can determine based at least in part on information regarding previous interactions (or the current interaction) involving the customer (e.g., previous interaction(s) (or the current interaction) with this business unit of the service provider, previous interaction(s) with another business unit(s) of the service provider) and/or external information relating to the customer (e.g., information relating to social media accounts of the customer, demographic information, . . . ). It is to be appreciated and understood that, while this example relates to entity-specific (e.g., model-specific) propensity models relating to behaviors of this particular entity (e.g., customer), in some embodiments, alternatively or additionally, the IMC can determine and generate respective generalized (e.g., model-general) propensity models relating to respective behaviors based at least in part on demographic data regarding entities and/or entity interaction histories of a group of entities, and the IMC can determine one or more generalized propensity models that can be applicable to the entity for the interaction, based at least in part on demographic characteristics of the entity, the type of interaction, the respective demographic characteristics associated with the respective generalized propensity models, and/or other desired factors, in accordance with the defined interaction management criteria.

In some embodiments, the IMC (e.g., employing the propensity component) can cross-correlate respective information relating to respective behaviors of an entity (or group of entities), and/or respective propensity models regarding respective behaviors of an entity (or group of entities) (e.g., with regard to a same business unit of a business entity, or across different business units of the business entity). Based at least in part on such cross-correlation, the IMC can determine an aggregate propensity model relating to a propensity of the entity (or group of entities) to engage in a particular behavior. For instance, the IMC can determine a first propensity model regarding a first propensity of an entity to engage in a first behavior, and a second propensity model regarding a second propensity of the entity to engage in a second behavior. To facilitate determining an aggregate propensity of the entity to engage in the first behavior, the IMC can cross-correlate the first propensity model and the second propensity model, and based at least in part on such cross-correlation, the IMC can determine an aggregate propensity model regarding a propensity of the entity to engage in the first behavior.

The IMC can determine respective propensity scores for the respective propensity models being utilized with respect to the entity, wherein the respective propensity scores can indicate or predict the respective likelihoods that the customer may exhibit or engage in the respective behaviors of the respective propensity models. The IMC also can determine respective weights for the respective propensity scores and apply the respective weights to the respective propensity scores, based at least in part on the defined interaction management criteria, for example, to account for the relative significance (e.g., relevance or importance) of each of the respective propensity scores and associated behaviors with regard to the interaction (e.g., type of interaction), business goals of the service provider, and/or other desired factors. Based at least in part on the respective weighted propensity scores of the respective propensity models associated with the respective behaviors of the customer, the IMC can determine an action that the service provider representative (e.g., human representative or service provider VA) can perform to interact with the customer. For instance, while the customer contacted the service provider representative with a question regarding the customer's account, the highest weighted propensity score can be associated with a propensity model that can indicate the customer may be receptive to an offer for cable or satellite television service, which can be provided by the service provider (e.g., through the same or different business unit of the service provider). The IMC also can determine a script relating to the offer that the service provider representative can use to convey the offer to the customer, via their respective communication devices (e.g., mobile phone(s), computer(s), . . . ). The service provider representative can convey the offer to the customer, via their respective communication devices, and the customer can respond to the offer by accepting the offer, rejecting the offer, or behaving or responding in another way to the offer.

The service provider representative, the communication device of the service provider representative, and/or the IMC can monitor or receive the response (e.g., response action) of the customer to the offer. The service provider representative or associated communication device can notate (e.g., provide information regarding) the response of the customer to the IMC or the IMC can receive (e.g., capture or obtain) the information regarding the response of the customer to the offer.

The IMC can update (e.g., in real time) one or more behavior attributes associated with the customer, one or more propensity metrics associated with the one or more behaviors, one or more of the respective propensity models associated with the one or more behaviors, one or more of the respective propensity models scores associated with the one or more respective propensity models, and/or update the context of the interaction, etc., based at least in part on the results of analyzing the response of the customer to the offer. Depending on the status of the interaction at this point, the interaction can continue or can end, wherein the IMC can continue to update the one or more behavior attributes associated with the customer, one or more propensity metrics associated with the one or more behaviors, one or more of the respective propensity models associated with the one or more behaviors, one or more of the respective propensity models scores associated with the one or more respective propensity models, and/or update the context of the interaction, etc., as appropriate.

For instance, throughout the remainder of the interaction or after the interaction, the IMC can update the one or more behavior attributes associated with the customer, one or more propensity metrics associated with the one or more behaviors, one or more of the respective propensity models associated with the one or more behaviors, one or more of the respective propensity models scores associated with the one or more respective propensity models, and/or update the context of the interaction, etc., based at least in part on the respective actions performed by the respective entities during the interaction, the outcome of the interaction, information provided by the entity (e.g., customer) during the interaction, information provided by the other entity (e.g., service provider representative) during (or after) the interaction, and/or other factors relating to the interaction or the entities.

In connection with monitoring and managing interactions between entities, the IMC can store information relating to entities and interactions in a data repository (e.g., a central data repository) that can be accessed by the IMC to retrieve desired information regarding an entity in connection with an interaction involving that entity to facilitate determining how to interact with that entity during the interaction. For each entity, such information regarding the entity can comprise, for example, information relating to previous interactions involving the entity, context information relating to the context of an interaction or context of the entity, respective propensity metrics relating to respective behaviors associated with (e.g., exhibited by) the entity, one or more propensity models (e.g., behavior propensity models) relating to behaviors determined (e.g., by the IMC) with regard to the entity, one or more propensity scores (e.g., weighted propensity model scores) associated with the one or more propensity models (e.g., as determined by the IMC), and/or other desired information. During an interaction (or prior to the interaction), the IMC can retrieve desired information regarding the entity (e.g., regarding various propensities for various behaviors of the entity) from the data repository and can determine an action(s) that another entity (e.g., service provider human representative or service provider VA) can perform to interact with the entity to attempt to achieve a desirable response (e.g., desirable favorable response action or reaction) from the entity and/or a desirable outcome of the interaction, in accordance with defined interaction management criteria, as more fully described herein.

These and other aspects and embodiments of the disclosed subject matter will now be described with respect to the drawings.

Referring now to the drawings, FIG. 1 illustrates a block diagram of an example system 100 that can determine propensities of entities (e.g., human users or VAs) for various behaviors and use such propensities to facilitate managing interactions between entities, in accordance with various aspects and embodiments of the disclosed subject matter. The system 100 can comprise a communication device 102 that can be associated with a user 104 (e.g., human user) and/or a VA 106 (e.g., a VA that can be incorporated into or accessible by the communication device 102). In other embodiments, the VA 106 can be part of a communication device 108 that the user 104 can access and use at a location where the user 104 is located, or can access and use remotely via a communication network 110. The communication device 102 and/or communication device 108 can be associated with (e.g., communicatively connected to) the communication network 110 via a wireline or wireless communication connection. A communication device (e.g., communication device 102, communication device 108, . . . ) can be, for example, a mobile and/or wireless communication device, such as a mobile phone, a landline or wireline phone, an electronic notebook, an electronic pad or tablet, an electronic gaming device, a personal digital assistant (PDA), electronic bodywear (e.g., electronic or smart glasses, electronic or smart watch, or augmented reality (AR) or virtual reality (VR) headset, . . . ), a computer, a set-top box, an Internet Protocol (IP) television, an Internet of Things (IoT) device, or other type of communication device that can operate and communicate in a communication network environment of a communication network 110 of the system 100.

The communication network 110 can comprise a packet data network (e.g., an IP-based network, such as the Internet and/or intranet) (not shown) and/or a mobility core network (e.g., a wireless communication network) (not shown) that can be associated with the packet data network. The mobility core network of the communication network 110 can include a radio access network (RAN) (not shown) that can comprise or be associated with a set of base stations (e.g., access points (APs)) (not shown) that can serve communication devices (e.g., communication device 102) located in respective coverage areas served by respective base stations in the mobility core network of the communication network 110. In some embodiments, the RAN can be a cloud-RAN (C-RAN) that can be located in or associated with a cloud computing environment, comprising various cloud network components of the communication network 110. The respective base stations can be associated with one or more sectors (not shown), wherein respective sectors can comprise respective cells. The cells can have respective coverage areas that can form the coverage area covered by the one or more sectors. The respective communication devices can be communicatively connected to the communication network 110 via respective wireless or wireline communication connections with one or more of the respective cells.

The system 100 also can comprise a communication device 112 that can be associated with a user 114 associated with a business entity (e.g., a business entity that sells or provides services and/or products), which can employ one or more communication devices, including communication device 112, that can be utilized by one or more users, such as user 114, employed or associated with the business entity. In accordance with various embodiments, the system 100 can include a VA 116 that can be part of or accessible to the communication device 114 or can comprise a communication device 118 that can comprise the VA 116, wherein the VA 116 can be accessed by the user 114 or another user of the business entity. The communication device 112 and/or communication device 118 can be associated with (e.g., communicatively connected to the communication network 110.

It is to be appreciated and understood that, while various aspects of the disclosed subject matter are typically described with regard to VAs, another type of software-based entity can be employed to perform the functions of a VA, as described herein. It also is to be appreciated and understood that, while some aspects of the disclosed subject matter are described where a user (e.g., user 104, user 114) can use the communication device for communication (e.g., transmission, reception) of information (e.g., interaction-related and/or event-related information) to or from another device (e.g., another communication device and/or a VA, . . . ), in certain aspects of the disclosed subject matter, the user can communicate information using, and can receive information from, the VA (e.g., by speaking into an interface of or associated with the VA, by receiving (e.g., hearing, viewing) information presented via an interface of or associated with the VA). For example, a VA (e.g., VA 106) can be part of a communication device, such as an intelligent IoT device (e.g., intelligent or smart speaker device comprising VA and/or artificial intelligence), wherein the user (e.g., user 104) can use (e.g., communicate using) the VA with regard to one or more services that can be provided using or facilitated by the VA. As another example, a VA (e.g., VA 106) can be associated with (e.g., integrated with, attached to) a vehicle of the user (e.g., user 104), wherein the user can use (e.g., communicate using) the VA with regard to one or more services that can be provided using or facilitated by the VA.

In accordance with various embodiments, a VA (e.g., VA 106, VA 116) can be a domain-specific VA or can be a generalized (or at least more generalized) VA. For example, a domain-specific VA can be created and utilized to provide products or services for one or a relatively small subset of domains (e.g., a VA that provides or facilitates providing food-related products or services; a VA that provides or facilitates providing video and/or audio content-related products or services; a VA that provides or facilitates providing sports-related products or services; . . . ). As another example, a generalized (or more generalized) VA can be created and utilized to provide products or services for all domains or at least a relatively large subset of domains. The disclosed subject matter can enable the use of VAs to act as intermediaries and/or navigators for and on behalf of users and/or other entities, for example, with regard to interactions (e.g., transactions).

The system 100 can comprise an interaction management component (IMC) 120 that can manage (e.g., control) interactions and communications between respective users (e.g., user 104, user 114), respective communication devices (e.g., communication device 102, 108, 112, and/or 118), and/or respective VAs (e.g., VA 106, VA 116), in accordance with defined interaction management criteria. The IMC 120 can comprise a propensity component 122 that can determine propensity models relating to behaviors of entities (e.g., user 104, such as a customer; or VA 106 acting on behalf of the human user) involved in interactions with other entities (e.g., user 114, such as a service representative or technician, or VA 116 acting as a service representative or technician, of a business entity), based at least in part on information relating to the interactions, historical information relating to the entities, demographic information associated with entities, and/or other information (e.g., social media information) associated with the entities, in accordance with the defined interaction management criteria. The propensity component 122 can comprise a variety of systems (e.g., subsystems), components, and/or functions. For example, the propensity component 122 can comprise a behavior tracking component (e.g., behavior tracking system) for tracking and measuring the behaviors of entities, as more fully described herein. The propensity component 122 can include a propensity orchestrator component that can determine actions to be taken by entities (e.g., user 114, such as a service representative or technician, or VA 116) when interacting with another entity (e.g., user 104 or VA 106), in accordance with the defined interaction management criteria, as more fully described herein. The propensity component 122 also can comprise a propensity model platform that can determine and generate propensity models relating to behaviors associated with entities (e.g., user 104, or VA 106), as more fully described herein. The propensity component 122 further can include a scoring component (e.g., a real time scoring system) that can determine propensity scores (e.g., real-time weighted propensity scores) associated with the propensity models, wherein the propensity scores can be used to facilitate determining what action(s) to take during an interaction with an entity (e.g., offer a particular product or service to the user 104 or VA 106, modify a web page of a website presented to the user 104 or VA 106, or modify an automated audio menu presented to the user 104, . . . ), as more fully described herein. The propensity component 122 also can comprise a model context tracking component (e.g., model context tracking system) that can track, determine, and update the context of an interaction between entities and/or the context of an entity (e.g., user 104, or VA 106) to facilitate determining or updating propensity models relating to behaviors associated with the entity and/or determining or updating propensity scores associated the propensity models, as more fully described herein. The propensity component 122 also can include other systems, components, and/or functions, such as more fully described herein.

The IMC 120 can be associated with (as depicted in FIG. 1) or can comprise a data repository 124 (e.g., a central repository for data storage) that can store information relating to interactions between entities (e.g., user 104, VA 106, user 114, or VA 116), respective propensity metrics relating to respective propensities of respective entities to engage in or exhibit respective behaviors, entity profiles associated with entities (e.g., user 104, VA 106), demographic information relating to entities, social media information relating to entities, credit information (e.g., credit report information) relating to entities, and/or other desired information. In some embodiments, the data repository 124 can be a centralized data repository. In other embodiments, the data repository 124 can be a distributed or decentralized data repository.

The IMC 120 can collect (e.g., receive, aggregate) such information relating to the interactions, respective propensity metrics, entity profiles, demographic information, social media information relating to entities, credit information relating to entities, and/or other desired information from a variety of data sources, including various business units of the business entity (e.g., via communication devices (e.g., 112 and/or 118, . . . ) associated with various entities (e.g., user 114, VA 116, . . . ) employed or associated with the business entity, and/or external data sources (e.g., sources associated with social media accounts of users (e.g., user 104), external sources of demographic information, external sources of credit information of users, . . . ). The IMC 120 and data repository 124, by storing such information relating to the interactions, respective propensity metrics, entity profiles, demographic information, social media information relating to entities, credit information relating to entities, and/or other desired information, can make this information commonly accessible across various business units of a business entity when representatives or other agents, or VAs, of those business units are interacting with entities (e.g., user 104, such as a customer or prospective customer, or VA 106 acting on behalf of a user). The IMC 120, employing the propensity component 122, can cross-correlate the respective types of information collected and stored in the data repository 124 to facilitate determining behaviors and/or behavior attributes of entities (e.g., user 104, or VA 106), as more fully described herein. For example, the IMC 120 can cross-correlate first information relating to a first interaction(s) involving an entity (e.g., user 104) and associated with a first business unit of the business entity with second information relating to a second interaction(s) involving the entity and associated with a second business unit of the business entity and/or social media information relating to the entity (e.g., social media information associated with social media account(s) of the entity), and/or demographic information relating to demographic characteristics associated with the entity, to facilitate determining (e.g., by the IMC 120) one or more behaviors and/or behavior attributes, and/or one or more propensity metrics relating to the one or more behaviors, of or related to the entity based at least in part on the results of analyzing such respective types of information.

With further regard to the propensity component 122, the propensity component 122 (e.g., employing the behavior tracking system) can track interactions between entities, including tracking behaviors or behavior attributes exhibited or actions performed by entities during an interaction, words expressed by entities during an interaction, personality attributes exhibited by entities during an interaction, the type of interaction (e.g., reason for interaction, channel of interaction, . . . ), etc. During an interaction between an entity (e.g., user 104 or VA 106) and another entity (e.g., a user 114 or VA 116 of a business entity), the propensity component 122 can measure or determine the behavior(s) of the entity based at least in part the behavior(s) or behavior attribute(s) of the entity observed by the propensity component 122 and/or or actions performed by the entity and observed by the propensity component 122 (e.g., where the actions can relate to or be indicative of the behavior of the entity), based at least in part on behavior measurement criteria of the defined interaction management criteria.

The propensity component 122 also can facilitate maintaining histories, such as behavioral histories (e.g., entity profiles comprising behavioral histories), of entities involved in interactions, wherein the propensity component 122 can store information relating to interactions between entities in the data repository 124 of or associated with the IMC 120 (e.g., in an entity profile of an entity (e.g., human customer or associated VA) participating in an interaction that is stored in the data repository 124) and/or in a data store of the IMC 120. For instance, during an interaction between an entity (e.g., user 104 or VA 106) and another entity (e.g., a user 114 or VA 116 of a business entity), the propensity component 122 can store information relating to the interaction in an entity profile associated with the entity (e.g., user 104 or VA 106), wherein such information can include information relating to the behaviors exhibited and/or actions performed by the entity during the interaction, as obtained (e.g., directly obtained) by the IMC 120 monitoring or tracking the interaction, or received by the IMC 120 from the other entity (e.g., user 114 or VA 116) during the interaction.

In some embodiments, the propensity component 122 can transform the information relating to the interaction involving the entity (e.g., user 104 or VA 106) to generate (e.g., produce) transformed information relating to the interaction. For instance, the propensity component 122 can analyze and/or parse the information relating to the interaction, including behavior information relating to the behavior(s) of the entity. Based at least in part on the results of analyzing and/or parsing such information, the propensity component 122 can transform such information relating to the interaction into transformed data relating to the interaction, including transformed data relating to the one or more behaviors of the entity, and can store such transformed data in the data repository 124 (e.g., in the entity profile of the entity stored in the data repository 124).

For instance, based at least in part on the results of such analysis and/or parsing, the propensity component 122 can transform such information relating to the interaction into a desired format that can be usable by the propensity model platform to facilitate determining, generating, or updating one or more propensity models relating to one or more behaviors of the entity. For example, the propensity component 122 can transform respective types of information relating to respective behaviors of the entity to take into account that different types of behaviors can occur at different rates (e.g., different rates or frequencies of occurrence) and/or different times, so that the respective types of information can be understood in context when determining the propensity models relating to respective behaviors and associated propensity scores. For example, the propensity component 122 can transform information relating to monthly subscription payments for mobility services of an entity to take into account in the measurement of the behavior of the entity that the subscription payments are made by the entity on a monthly basis, as opposed to a weekly or bi-weekly. As another example, the propensity component 122 can transform information relating to the entity using a service (e.g., phone services, data services, and/or application services) to measure the behavior of the entity with respect to using the service on a real time basis, a sub-hourly basis, or an hourly basis, as, for instance, the entity may use the service one or more times during a particular hour.

As still another example, the propensity component 122 can transform information (e.g., information relating to an interaction) by normalizing or standardizing such information to put such information in a normalized or standardized form that can be in a desired context for use when determining the propensity models relating to behaviors of the entity and propensity scores of such propensity models. For instance, the propensity component 122 can normalize or standardize data relating to monthly billing for services for an entity's subscription by determining (e.g., calculating) an average, a mean, a maximum amount, or a minimum amount of the monthly billing over a defined period of time (e.g., six months, one year, or two years, . . . ), as such normalization or standardization is determined to be desirable (e.g., suitable, appropriate, or optimal), in accordance with the defined interaction management criteria. Thus, the propensity component 122 can transform different types of data (e.g., interaction or behavior information) in different ways to take into account such differences in the types of data and to place such data (as transformed) into a desirable (e.g., suitable, appropriate, or optimal) context for use in determining propensity models, and associated propensity scores, relating to the behaviors of the entity.

Based at least in part on the information relating to the interaction involving the entity (e.g., user 104, or VA 106) and/or the behavioral history associated with the entity, and/or transformed data relating to such information, the IMC 120 can determine whether the entity is a human user (e.g., user 104) or a VA (e.g., VA 106) that can be acting on behalf of the human user. A VA acting on behalf of a human user often can be a representation, at least to some degree, of the human user and can share, at least to some degree, the behaviors, behavior attributes, and/or other characteristics of the human user. The degree to which a VA represents the human user and shares the behaviors, behavior attributes, and/or other characteristics of the human user can be based at least in part on whether the VA is a general task VA that the human user can use (e.g., user has configured to use) for a variety of types of tasks or whether the VA is task-specific to only perform a relatively limited number or types of tasks, the level to which the human user has configured the VA to perform tasks on behalf of the human user and the authority the human user has given the VA to perform tasks on behalf of the human user, the available functionality of the VA, and/or other factors. It is noted that, for a variety of reasons, the behaviors, actions, or personality of a human user potentially may be relatively more temperamental, as compared to the behaviors, actions, or personality attributes of a VA associated with (e.g., configured by, or acting on behalf of) the human user, as the behaviors, actions, or personality attributes VA generally can be relatively more static (e.g., more constant or substantially constant).

The propensity models relating to behaviors and propensity scores associated with those propensity models with respect to the VA associated with the human user can be similar, at least to some degree, to corresponding propensity models and propensity scores of the human user. The degree to which the propensity models relating to behaviors and propensity scores associated with those propensity models with respect to the VA associated with the human user are similar to the corresponding propensity models and propensity scores of the human user can be based at least in part on the degree to which the VA represents the human user and shares the behaviors, behavior attributes, and/or other characteristics of the human user (e.g., as determined by the IMC 120). As more full described herein, the propensity component 122 can determine propensity models relating to behaviors of a VA (e.g., VA 106) and associated propensity scores for those propensity models based at least in part on information relating to interactions involving the VA and other information relating to the associated human user (e.g., user 104), such as interactions involving the human user, social media information associated with the human user, and/or demographic information associated with the human user. The propensity component 122 can respectively weight those different types of information (e.g., with respective weight values) to facilitate desirably (e.g., accurately, suitably, or optimally) determining the propensity models relating to behaviors of the VA (e.g., VA 106) and the associated propensity scores (e.g., weighted propensity scores) for those propensity models, in accordance with the defined interaction management criteria. For instance, the propensity component 122 can weight the information relating to interactions involving the VA higher (or lower) than the other information relating to the associated human user, for example, when doing so is in accordance with the applicable interaction management criteria. The propensity component 122 can take into account the differences between the human user (e.g., 104) and associated VA (e.g., VA 106) when determining propensity models with regard to the behaviors of the human user and associated propensity scores for those propensity models, and propensity models with regard to the behaviors of the associated VA and associated propensity scores for those propensity models. The propensity component 122 also can perform relevant propensity determinations (e.g., calculations), such as determining propensity models for entity behaviors and associated propensity scores, with regard to interactions of a human user (e.g., user 104) with a VA (e.g., VA 116 of a business entity) and with regard to VA-to-VA interactions (e.g., interaction between the VA 106 of a human user 104 and the VA 116 of a business entity).

The human user (e.g., user 104) can configure the user's VA (e.g., VA 106) to perform certain tasks and/or the authority (e.g., the level of authority) the VA has to perform such tasks on behalf of the human user and/or to bind the user (e.g., to bind the user by legally accepting an offer for a subscription to a service or product and bind the user to a contract for the subscription; or to bind the user by making a payment on a bill of the user by authorizing payment of the bill using a bank or credit account of the human user). For example, as desired, the user 104 can configure the VA 106 to electronically pay the user's mobility services bill on the first day of each month from the user's checking account, and accordingly, on the first day of each month, the VA 106 can electronically pay the user's mobility services bill from the user's checking account. As desired, the user 104 also can configure the VA 106 to set a threshold monetary amount (e.g., maximum threshold monetary amount) that the VA 106 is authorized to pay for the user's mobility services bill.

As another example, the user 104 can configure the VA 106 to access the Internet and periodically (or aperiodically) check for any offers (e.g., deals or sales) for communication services, and can authorize the VA 106 to accept, and/or sign a contract for, any offer for communication services that satisfies a set of conditions, as specified by the user 104, wherein the set of conditions can relate to the type of offer, the cost of the offer, and/or the length of time of the contract for the communication services, etc. For instance, with regard to the cost of the offer, as desired, the user 104 can configure the VA 106 to set a threshold financial cost (e.g., maximum threshold financial cost) for an offer for communication services that the VA 106 is authorized to accept on behalf of the user 104. Alternatively, the user 104 can configure the VA 106 to check on the Internet for offers for communication services and to notify the user 104 if the VA 106 finds any offer that satisfies the set of conditions.

In accordance with various embodiments, the IMC 120 can determine (e.g., automatically determine) whether a VA (e.g., VA 106) is a proper actor or is instead a malicious, fraudulent, or otherwise adversarial actor, based at least in part on information relating to the interaction between the VA (e.g., VA 106) and another entity (e.g., user 114, or VA 116), behavioral information relating to the VA (e.g., with regard to the current or previous interactions), behavioral information relating to a user (e.g., user 104) associated or ostensibly associated with the VA, external information, data-based measures, and/or other information, using one or more malware or fraud detection techniques or algorithms, in accordance with the defined interaction management criteria. For example, during an interaction with a VA (e.g., VA 106) that is an adversarial actor (e.g., malicious, fraudulent, or otherwise adversarial actor), the behavior of the VA during the interaction can give an indication to the IMC 120 that the VA is an adversarial actor, with such behavior being unusual unto itself and/or being unusual as compared to previous interactions (e.g., and propensity models relating to VA behavior) involving that VA (or as compared to other interactions involving other VAs). As another example, an identifier (e.g., IP address, mobile device identifier, or media access control (MAC) address, . . . ) associated with the VA can indicate that the VA is an adversarial actor, wherein the IMC 120 can have information stored in the data repository 124 that indicates a VA or other device associated with such identifier is or may be an adversarial actor, and wherein such information can be obtained by the IMC 120 from VA interactions or from an external data source. As still another example, a suspicious method of payment (e.g., credit card payment, or bank account payment) or mailing address being used by the VA (e.g., VA 106) with regard to a product or service transaction can indicate that the VA is an adversarial actor, wherein the IMC 120 can determine that the method of payment is suspicious due to the credit card number being used being on a list of stolen credit cards or otherwise flagged for fraudulent activity, a bank account number being associated with a bank account that has been flagged for fraudulent activity, and/or the shipping address being different from the billing address with no known link between the shipping address and billing address.

In other embodiments, the IMC 120 also can determine whether a human user (e.g., user 104) is a proper actor or is instead a malicious, fraudulent, or otherwise adversarial actor, based at least in part on information relating to the interaction between the user (e.g., user 104) and another entity (e.g., user 114, or VA 116), behavioral information relating to the user (e.g., with regard to the current or previous interactions), external information, data-based measures, and/or other information, using one or more malicious action or fraud detection techniques or algorithms, in accordance with the defined interaction management criteria. In response to identifying an adversarial actor (e.g., adversarial human user or VA), the IMC 120 can flag the interaction and the adversarial actor, terminate the interaction, terminate a transaction for or provision of a product or service, notify law enforcement, and/or take other desired action to prevent or mitigate the fraudulent, criminal, and/or otherwise improper actions of the adversarial actor.

The propensity component 122 can employ the propensity model platform to determine, generate, or update one or more propensity models relating to one or more behaviors of the entity (e.g., user 104, or VA 106) based at least in part on the results of analyzing the transformed data relating to the interaction, previous behavioral history, social media information, demographic information, and/or other desired information associated with the entity (e.g., as stored in the entity profile in the data repository 124), in accordance with the defined interaction management criteria. The propensity component 122 can utilize the propensity models relating to the behaviors of the entity in scoring the respective propensity models and respectively associated behaviors of the entity to facilitate determining how the other entity (e.g., user 114 or VA 116) is to interact in a desirable (e.g., suitable, appropriate, or optimal) manner with the entity (e.g., user 104, or VA 106), as more fully described herein.

In some embodiments, the propensity model platform of the propensity component 122 can employ machine learning techniques and algorithms (e.g., automated machine learning (autoML)), and/or artificial intelligence (AI) techniques and algorithms, to determine, generate, or update propensity models relating to behaviors of an entity (e.g., user 104, or VA 106), based at least in part on the results of analyzing information (e.g., transformed information) relating to the interaction, previous behavioral history, social media information, demographic information, and/or other desired information associated with the entity, in accordance with the defined interaction management criteria. A propensity model of a behavior of an entity can model, simulate, emulate, mimic, recreate, or reproduce the behavior of the entity such that, when information relating to certain conditions or circumstances is input to the propensity model of the behavior of the entity, the propensity model can desirably (e.g., accurately, suitably, or optimally) exhibit or produce (e.g., exhibit or produce as output) the same or similar behavior (e.g., in data form or visual form) as the entity would exhibit, or is expected or predicted to exhibit, under the same certain conditions or circumstances.

The propensity component 122, employing the scoring component, can determine (e.g., calculate) respective propensity scores (e.g., real-time weighted propensity scores) for respective propensity models relating to respective behaviors of or associated with an entity, in accordance with the defined interaction management criteria. The propensity component 122 can analyze information relating to the current interaction between the entity (e.g., user 104, or VA 106) and the other entity (e.g., user 114, or VA 116), information relating to previous interactions involving the entity (e.g., user 104, or VA 106), information relating to interactions involving a group of entities, social media information relating to the entity, demographic information regarding demographic characteristics relating to the entity, and/or other desired information. Based at least in part on the results of such analysis and based at least in part on the set of scoring factors, the propensity component 122 can determine the respective propensity scores for the respective propensity models relating to the respective behaviors of or associated with the entity (e.g., user 104, or VA 106), in accordance with the defined interaction management criteria. The scoring factors can comprise or relate to, for example, a type of behavior exhibited by the entity, a length of time the entity has exhibited a behavior, the actions performed (or not performed) by an entity with respect to a behavior, a pattern of exhibiting a behavior by the entity, an amount of information regarding the entity with respect to the behavior, a level of accuracy (e.g., determined level of accuracy) of the information regarding the entity with respect to the behavior, a confidence, certainty, accuracy, statistical likelihood (e.g., statistical probability), or strength level of the determination of a behavior for the entity, a type of demographic characteristic associated with the entity (e.g., demographic characteristic in common between the entity and other entities), a relevance (e.g., determined relevance) of a demographic characteristic to a behavior, an aging function that can take into account that entities (e.g., customers) desires can change over time, and/or another desired scoring factor, such as described herein. A propensity score of a propensity model relating to a behavior of an entity can indicate or specify a level of propensity (e.g., inclination, proclivity) that an entity will exhibit or engage in the behavior and/or can indicate the probability or likelihood that the entity will exhibit of engage in the behavior.

In some embodiments, the propensity component 122 can determine and/or update propensity scores for propensity models relating to behaviors of an entity (e.g., user 104, or VA 106) in real time (e.g., live scoring and/or updating of propensity models), or at least substantially in real time. The frequency of updating of propensity scores for propensity models, or updating the propensity models, relating to behaviors of the entity by the propensity component 122 can be based at least in part on the type of behavior and/or a context associated with the behavior, in accordance with the defined interaction management criteria. For instance, the propensity component 122 can determine that a first propensity score and/or an associated first propensity model with regard to a first type of behavior is to be updated at a first frequency, and can determine that a second propensity score and/or an associated second propensity model with regard to a second type of behavior is to be updated at a second frequency, which can be different from the first frequency, wherein the frequency can be hourly, daily, weekly, monthly, or at another time interval (e.g., on a minute level or sub-minute level), as determined to be appropriate based at least in part on the context of such behavior and the defined interaction management criteria.

With further regard to scoring of propensity models, the strength or accuracy of a propensity model of a behavior of an entity can be based at least in part on (e.g., can be a function of) the strength or accuracy of the data (e.g., transformed data relating to an interaction, previous behavioral history, and/or other information associated with the entity) utilized to determine, generate, or update the propensity model. If there is a desirable (e.g., sufficient) amount of reliable and/or accurate data (e.g., transformed to be in suitable context) relating to a behavior of the entity, the propensity model platform of the propensity component 122 can desirably (e.g., accurately, suitably, or optimally) determine a propensity model relating to the behavior of the entity. Accordingly, the propensity component 122 (e.g., employing the scoring component) can determine that such a propensity model can have a relatively higher propensity score, as the propensity score of a propensity model can be based at least in part on the level of accuracy of the propensity model.

Conversely, if there is an insufficient amount of data and/or less reliable data (e.g., data that is less accurate or of unknown accuracy) relating to the behavior of the entity, and/or if the available data does not directly relate to the behavior of the entity, the propensity model relating to the behavior of the entity, as determined by the propensity model platform of the propensity component 122, can be less accurate, or at least potentially can be less accurate, than a propensity model determined using a sufficient amount of accurate data. As a result, the propensity component 122 (e.g., employing the scoring component) can determine that such a propensity model can have a relatively lower propensity score, as the propensity score of such propensity model can be based at least in part on the level (e.g., relatively lower level) of accuracy of the propensity model.

As an example of scoring of a model, the propensity component 122, employing the scoring component, can determine (e.g., calculate) a relatively high propensity score for a propensity model relating to the behavior of paying a bill for a mobility services subscription based at least in part on the propensity component 122 determining that the entity (e.g., user 104, or VA 106) has exhibited a consistent pattern of timely paying the entity's mobility services bill for a relatively long period of time, with a relatively high confidence level in that determination regarding the entity's behavior in paying the mobility services bill. As another example, the propensity component 122, employing the scoring component, can determine a relatively low propensity score for a propensity model relating to the behavior of paying a bill for a mobility services subscription based at least in part on the propensity component 122 determining that an entity (e.g., user 104, or VA 106) has exhibited a relatively poor or inconsistent record of timely paying the entity's mobility services bill due to a number of late or missed payments with regard to the entity's mobility services bill, or if the propensity component 122 determines that it does not have sufficient reliable and/or accurate information regarding the behavior of the entity paying the entity's mobility services bill.

In certain embodiments, the propensity model platform of the propensity component 122 can determine a propensity model (e.g., general model) relating to a behavior associated with a group of entities based at least in part on information relating to interactions involving entities of the group of entities and/or demographic information relating to demographic characteristics associated with (e.g., shared by) entities of the group of entities. The propensity component 122 can apply such propensity model to the entities of the group of entities and/or can apply such propensity model to other entities (e.g., user 104, or VA 106) that share same or similar demographic characteristics with the group of entities. For example, with regard to an entity (e.g., user 104), if there is insufficient reliable information regarding the behavior of the entity available to determine a propensity model relating to the behavior of the entity based on the such information directly relating to the behavior of the entity, the propensity model platform of the propensity component 122 can determine demographic characteristics of the entity from demographic information obtained from the entity or other sources, and can determine a propensity model (e.g., general model) relating to the behavior that is associated with demographic characteristics that are shared by or are sufficiently the same as demographic characteristics of the entity. The propensity component 122 can utilize (e.g., apply) such propensity model (e.g., general model) relating to the behavior for the entity when determining actions that can be performed by the other entity (e.g., user 114 or VA 116) during an interaction with the entity.

For example, with regard to a particular behavior, if the entity (e.g. user 104) is determined to be a young male of age 23, living in Austin, Tex., and having an income of $37,000 per year, the propensity model platform of the propensity component 122 can determine that a propensity model relating to the particular behavior and associated with the demographic characteristics of males of age range 21-25, living in Austin, Tex., and having an income in the range of $35,000-$50,000 can be a desirable (e.g., suitable or acceptable) propensity model to apply with regard to the entity to determine how the other entity (e.g., user 114 or VA 116) is to interact with the entity. The propensity component 122 can desirably (e.g., suitably or optimally) determine the propensity score for such propensity model with respect to the entity based at least in part on how closely the demographic characteristics associated with the propensity model match the demographic characteristics of the entity, how reliable the propensity model has been determined to be in predicting such behavior of entities who share such demographic characteristics, and/or other desired factors.

For instance, the propensity component 122 can determine that the propensity score for such propensity model is relatively high if it is determined that the demographic characteristics associated with the propensity model closely match the demographic characteristics of the entity and such propensity model has been determined to be reliable in predicting such behavior of entities who share such demographic characteristics. In contrast, the propensity component 122 can determine that the propensity score for such propensity model is relatively lower if it is determined that the demographic characteristics associated with the propensity model less closely match the demographic characteristics of the entity and/or such propensity model has been determined to be relatively less reliable in predicting such behavior of entities who share such demographic characteristics.

In some embodiments, the propensity model platform of the propensity component 122 also can utilize the propensity model (e.g., general model) relating to the behavior associated with the behavior with respect to a group of users associated with a set of demographic characteristics to facilitate determining a propensity model (e.g., specific model) relating to the behavior for the entity (e.g., user 104), wherein the general propensity model can be utilized to supplement information particularly relating to the entity. For example, the propensity model platform of the propensity component 122 can determine a propensity model (e.g., specific model) relating to the behavior for the entity based at least in part on information relating to an interaction involving the user, behavioral history of the user, social media information relating to the user, and/or the general propensity model relating to that behavior associated with demographic characteristics shared, or at least in part shared, by the entity.

In certain embodiments, the propensity component 122 can employ human-in-the-loop models to facilitate determining propensity models relating to behaviors of entities. For example, during an interaction, or at another desired time, the IMC 120 can receive feedback information from an entity (e.g., user 114, or another employee, such as a manager, of the business entity) indicating that an alternative action, which is different from the action a particular propensity model relating to a behavior indicates is to be performed by the user 114 during an interaction with user 104 (e.g., customer), is to be performed by the user 114 instead of the action. The IMC 120 can track the results of the performance of the alternative action performed by the user 114, including receiving feedback information notating the behavior of the user 104 in response to the alternative action performed by the user 114 (e.g., presentation of an alternative offer for a service) to the user 104.

If the results of the performance of the alternative action is positive (e.g., the user 114 accepts the alternative offer or provides other positive feedback in response to the alternative action), the propensity component 122 can take that into account by updating the propensity model relating to that behavior and/or the propensity score (e.g., weighted propensity score) of that propensity model with respect to the alternative action such that the alternative action can be associated with a relatively higher propensity score with respect to the propensity model relating to the behavior of the user 104 or similar propensity models of other entities who are similar to (e.g., share demographic characteristics same as or similar to) the user 104. Accordingly, with regard to other entities, under same or similar circumstances as that with regard to the user 104, the propensity component 122 can be more likely to determine that the alternative action is to be taken by the user 114 during an interaction with an entity who is determined to be similar to the user 104.

If, instead, the results of the performance of the alternative action is negative (e.g., the user 114 does not accept the alternative offer or provides other negative feedback in response to the alternative action), the propensity component 122 can take that into account by updating the propensity model relating to that behavior and/or the propensity score (e.g., weighted propensity score) of that propensity model with respect to the alternative action such that the alternative action can be associated with a relatively lower propensity score with respect to the propensity model relating to the behavior of the user 104 or similar propensity models of other entities who are similar to (e.g., share demographic characteristics same as or similar to) the user 104. As a result, with regard to other entities, under same or similar circumstances as that with regard to the user 104, the propensity component 122 can be less likely to determine that the alternative action is to be taken by the user 114 during an interaction with an entity who is determined to be similar to the user 104 and/or can be more likely to determine that the action, which had originally been determined by the propensity model and had been bypassed with respect to the interaction with the user 104, is to be performed by the user 114 during the interaction with the entity.

In certain embodiments, the propensity component 122, employing the scoring component, can apply an aging function as a scoring factor when determining the score of a propensity model relating to a behavior of or associated with an entity (e.g., user 104, or VA 106), wherein the aging function can take into account that entities (e.g., customers) desires (e.g., wants or needs) can change over time. For instance, the propensity component 122 initially can determine a propensity score for a propensity model relating to a propensity of the entity to exhibit a particular behavior based at least in part on initial information relating to the entity with regard to that particular behavior. Over time, the propensity component 122 can apply the aging function to the initial information relating to the entity with regard to that particular behavior, such that, as time goes on, such initial information can have increasingly less weight or influence on the propensity score for the propensity model relating to the propensity of the entity to exhibit that particular behavior. Accordingly, by applying such aging function, the propensity component 122 can enhance (e.g., improve or optimize) advertising and the provision of services to entities (e.g., user 104, or VA 106, such as customers) by determining and using an aggregate propensity score relating to the propensity of an entity to exhibit a behavior(s) that can be based at least in part on the aging function to take into account that entities desires can change over time.

The propensity component 122, employing the scoring component, also can respectively weight respective propensity scores of respective propensity models relating to the behavior of an entity (e.g., user 104, or VA 106) or a group of entities. The propensity component 122, employing the scoring component, can determine the respective weights (e.g., weight values) to be applied to the respective propensity scores of the respective propensity models relating to the respective behaviors of the entity or the group of entities, and/or the respective demographic characteristics associated with the entity or the group of entities, based at least in part on a set of weighting factors, in accordance with the defined interaction management criteria. The defined interaction management criteria can indicate or specify different weights to apply to the respective propensity scores of the respective propensity models based at least in part on the set of weighting factors. The set of weighting factors can comprise or relate to, for example, a type of interaction to which a propensity model(s) is to be applied, a type of behavior associated with the propensity model, a type of demographic characteristic associated with the propensity model, a level of relevance (e.g., determined level of relevance) of a behavior and/or demographic characteristic to the interaction, whether the entity(ies) is a human user(s) or a VA(s), whether the other entity (e.g., customer service representative) interacting with the entity is a human user or a VA, a business goal of a business entity associated with the interaction, a user preference (e.g., a preference of a manager of a business unit of the business entity), and/or another desired weighting factor.

For example, with regard to a propensity score for a propensity model relating to the behavior of an entity (e.g., user 104, or VA 106) with regard to offers for services in connection with the business entity considering making an offer (e.g., deal) to the entity to purchase a bundle of services (e.g., home cable or satellite television services, home broadband services, home phone services, mobile phone services, and/or home security services), the propensity component 122 can determine that a relatively high weight (e.g., relatively high weight value) is to be applied to such propensity score based at least in part on the propensity component 122 determining that the interaction between the entity and the service provider entity relates to the entity contacting the service provider regarding services because the entity has recently moved to a new home, the entity has a history of purchasing service bundles, and a desired (e.g., relatively highly weighted) business goal of the business unit of the service provider is to try to generate new customers by offering deals on various services and/or service bundles to potential new customers. Accordingly, the propensity component 122, employing the scoring component, can apply a relatively high weight to the propensity score for the propensity model relating to the behavior of the entity (e.g., user 104, or VA 106) with regard to offers for services to generate a weighted propensity score for such propensity model.

As another example, in another instance, with regard to a propensity score for a propensity model relating to the behavior of the entity (e.g., user 104, or VA 106) with regard to offers for services in connection with the business entity considering making an offer to the entity to purchase a bundle of services, the propensity component 122, employing the scoring component, can determine that a relatively low weight (e.g., relatively low weight value) is to be applied to such propensity score based at least in part on the propensity component 122 determining that the interaction between the entity and the service provider entity relates to the entity contacting the service provider to remove a mobile device from the entity's family plan subscription, the entity already has a service bundle with the service provider, and/or a business goal of the business unit to try to retain customers by offering deals on various services and/or service bundles to has been given a relatively low priority (e.g., accordingly, a relatively low weight value) because there are relatively low budget resources remaining in the monthly budget of the business unit to actively push offers for service bundles on customers to retain customers.

The propensity component 122, employing the scoring component, can apply the respective weights to the respective propensity scores of the respective propensity models relating to the respective behaviors of the entity or the group of entities, and/or the respective demographic characteristics associated with the entity or the group of entities, to generate respective weighted propensity scores of the respective propensity models. The propensity component 122, employing the propensity orchestrator component, can utilize the propensity models relating to the respective behaviors and the respectively associated weighted propensity scores to determine one or more actions that the other entity (e.g., user 114, or VA 116) can perform (e.g., perform next) during the interaction with the entity (e.g., user 104, or VA 106), as more fully described herein. In certain embodiments, the propensity orchestrator component of the propensity component 122 can be or comprise a combined propensity orchestrator that can determine or match multiple propensities of an entity (e.g., user 104, or VA 106). The propensity component 122 also can employ multiple propensity model applications for determining complex behaviors of an entity (e.g., user 104, or VA 106), as more fully described herein.

In some embodiments, the propensity component 122, employing the scoring component, can change (e.g., modify or adjust) a weight applied to a propensity score of a propensity model, in accordance with the defined interaction management criteria and/or one or more preferences (e.g., entity preferences) of a particular entity (e.g., service representative, service technician, or manager of such representative or technician, of a business entity). For instance, during a first part of a month, the manager of a business unit may decide that certain resources in the budget for the business unit can be utilized to make offers (e.g., deals) for devices and/or associated service subscriptions to try to bring in new customers and/or to retain current customers and reduce customer churn. Accordingly, the manager can input (e.g., via an interface and/or communication device) preference information to the IMC 120, wherein the preference information can indicate that the propensity scores for propensity models of entities that can relate to a service representative (e.g., user 114, or VA 116) performing the action of making an offer for a device and/or associated service subscription are to be weighted higher such that it can be more likely that the action taken by the service representative is to present an offer for a device and/or associated service subscription to an entity (e.g., user 104, or VA 106) based at least in part on a weighted propensity score(s) of a propensity model(s) relating to a particular behavior(s) of the entity. As a result, the propensity component 122 can determine weighted propensity score(s) of the propensity model(s) relating to the particular behavior(s) of the entity based at least in part on the preference information of the manager.

Subsequently, in the middle of the month, the manager can determine that the resources in the budget are running relatively low, and can determine that there are insufficient resources in the budget to continue pushing that offer for a device and/or associated service subscription. Accordingly, the manager can input updated preference information to the IMC 120, wherein the updated preference information can indicate that the propensity scores for those propensity models of entities that can relate to a service representative (e.g., user 114, or VA 116) performing the action of making such offer for a device and/or associated service subscription are to be weighted lower (e.g., significantly lower) such that it can be less likely (e.g., far less likely or not likely at all) that the action taken by the service representative is to present such an offer for a device and/or associated service subscription to an entity (e.g., user 104, or VA 106) based at least in part on a weighted propensity score(s) of a propensity model(s) relating to a particular behavior(s) of the entity. As a result, the propensity component 122 can determine weighted propensity score(s) (e.g., updated weighted propensity score(s)) of the propensity model(s) relating to the particular behavior(s) of the entity based at least in part on the updated preference information of the manager.

During an interaction with the entity (e.g., user 104 or VA 106), the propensity component 122 can rank the respective weighted propensity scores of the respective propensity models of respective propensities of the entity to engage in respective behaviors, for example, from highest to lowest weighted propensity score, wherein the highest weighted propensity score and associated propensity model can be associated with an action (e.g., an offer or other action) that the service representative (e.g., user 114) or VA 116, acting as a service representative, can perform during the interaction with the entity. For example, the highest weighted propensity score and associated propensity model can indicate that there is a relatively high propensity that the entity will accept an offer to purchase, or at least will be receptive to the offer to purchase, a particular service or product of the business entity. The propensity component 122 can present, to the service representative (e.g., user 114 or VA 116), the ranked weighted propensity scores and associated respective propensity models, and/or the respectively associated actions (e.g., offers or other actions) that the service representative can perform in connection with those respective propensity models. Accordingly, during the interaction with the entity (e.g., user 104 or VA 106), the service representative (e.g., user 114 or VA 116) can review (e.g., analyze) such information to determine which propensity model(s) and associated action(s) is the highest (are the higher) ranked propensity model(s) and associated action(s), and typically, the service representative can perform the action (e.g., present the offer) associated with the highest ranked weighted propensity score and associated propensity model to attempt to elicit a desired action (e.g., acceptance of the offer) by the entity in response to the action performed by the service representative. In some embodiments, the propensity component 122 can provide the service representative with a script that the service representative can use (e.g., can read from) when performing the action (e.g., presenting the offer to the entity).

In accordance with various embodiments, the IMC 120 (e.g., the propensity component 122 of the IMC 120) can cross-correlate information relating to interactions and/or behaviors associated with an entity (e.g., user 104, or VA 106), cross-correlate information relating interactions and/or behaviors with respect to multiple entities (e.g., multiple customers or multiple VAs of customers) based at least in part on demographic information relating to demographic characteristics associated with such entities, cross-correlate respective propensity models relating to respective behaviors of or associated with an entity(ies), cross-correlate respective propensity metrics relating to respective behaviors of or associated with an entity(ies), cross-correlate respective propensity scores (e.g., weighted or unweighted propensity scores) associated with respective propensity models relating to respective behaviors of or associated with an entity(ies), and/or cross-correlate other information, in accordance with the defined interaction management criteria. For instance, the propensity component 122 can cross-correlate first information relating to a first interaction involving an entity (e.g., user 104, or VA 106) and a first service entity (e.g., a service representative of a business entity) with second information relating to a second interaction (e.g., a different type of interaction than the first interaction) involving the entity and a second service entity (e.g., a service technician of the business entity), cross-correlate information relating to a first behavior of or associated with an entity (e.g., user 104, or VA 106) with information relating to a second behavior of or associated with an entity, cross-correlate a first propensity model relating to the first behavior of or associated with the entity with a second propensity model relating to the second behavior of or associated with the entity, and/or cross-correlate a first propensity score associated with the first propensity model relating to the first behavior of or associated with the entity with a second propensity score associated with the second propensity model relating to the second behavior of or associated with the entity.

For example, in connection with, and to facilitate, determining an aggregate propensity model (and/or an associated first propensity score) relating to a propensity (e.g., aggregate propensity) of the entity (e.g., user 104) to purchase a mobile phone, the propensity component 122 can cross-correlate a first propensity model relating to the propensity of the entity to purchase a mobile phone (and/or the underlying information relating to the behavior of the entity with regard to mobile phone purchases) from a first type of service entity (e.g., sales representative) associated with a first business unit (e.g., product and/or service sales) of the business entity with a second propensity model (and/or an associated second propensity score) relating to a propensity of the entity to contact a service technician or a web page associated with a second business unit (e.g., technical support) of the business entity with regard to an issue (e.g., problem) or potential issue with the entity's mobile phone (and/or the underlying information relating to contacting a service technician with regard to an issue or potential issue with the entity's mobile phone). Based at least in part on the cross-correlation of the first propensity model (and/or the associated first propensity score) with the second propensity model (and/or the associated second propensity score), the propensity component 122 can determine an aggregate propensity model (e.g., an aggregate or cross-correlated first propensity model) (and/or an associated aggregate or cross-correlated propensity score) relating to the propensity of the entity to purchase a mobile phone. For instance, the propensity component 122 can determine that the behavior relating to the entity contacting a service technician or a web page with regard to an issue or potential issue with the entity's mobile phone has a cross-correlation with (e.g., can have an influence on or affect) the behavior of purchasing of mobile phones by the entity. For example, the propensity component 122 can determine that, if the entity has had a mobile phone obtained from the business entity a relatively long amount of time ago (e.g., such that the entity may be ready to upgrade to a new mobile phone due to the age of the phone or its battery) and has not contacted a service technician or a web page for technical support much or at all due to problems with the entity's current mobile phone, the propensity component 122 can determine that the entity can be more likely to be interested in purchasing a new mobile phone, and/or, in particular, a new mobile phone of the same type (but upgraded to a newer model) as the entity's current mobile phone. Thus, there can be a cross-correlation (e.g., interrelationship or cross-interrelationship) between those respective behaviors associated with the entity that are related to disparate types of interactions associated with disparate business units of the business entity. The propensity component 122 can determine the first propensity model regarding the propensity of the entity to purchase a mobile phone from the first type of service entity (e.g., sales representative) associated with the first business unit (e.g., product and/or service sales) of the business entity based at least in part on the result of analyzing information relating to the interaction with the first type of service entity associated with the first business unit. The propensity component 122 also can determine a second propensity model relating to the propensity of the entity to contact a service technician or a web page associated with the second business unit (e.g., technical support) of the business entity with regard to an issue (e.g., problem) or potential issue with the entity's mobile phone based at least in part on the result of analyzing information relating to a previous interaction (if any) with the second type of service entity (e.g., service technician) associated with the second business unit. The propensity component 122 can cross-correlate the first propensity model (and/or the underlying information and/or first propensity score associated with the first propensity model) with the second propensity model (and/or the underlying information and/or second propensity score associated with the second propensity model). Accordingly, the propensity component 122 can determine the propensity score (e.g., aggregate, cross-correlated, or overall propensity score) associated with an aggregate propensity model regarding the propensity of the entity to purchase the mobile phone from the first type of service entity associated with the first business unit based at least in part on the cross-correlation of the first propensity model regarding the propensity of the entity to purchase the mobile phone from the first type of service entity associated with the first business unit with the second propensity model relating to the propensity of the entity to contact a service technician or a web page associated with the second business unit.

As another example, alternatively, the propensity component 122 can determine that, if the entity has had a mobile phone obtained from the business entity for a relatively long amount of time (e.g., such that the entity may be ready to upgrade to a new mobile phone due to the age of the phone or its battery) and has contacted a service technician or a web page for technical support a number of times due to problems the entity was having with the current mobile phone, the propensity component 122 can determine that the entity can be more likely to be interested in purchasing a new mobile phone, and/or, in particular, a new mobile phone of a different type as the entity's current mobile phone and/or can determine that the entity potentially can decide to terminate the entity's mobility services subscription with the business entity (e.g., due to the numerous problems with the mobile phone). Accordingly, when determining the propensity score for the first propensity model (e.g., an aggregate propensity score for an aggregate propensity model) regarding the propensity of the entity to purchase a mobile phone, the propensity component 122 can utilize the second propensity model (and the underlying information) to facilitate determining the propensity score for the first propensity model (e.g., the aggregate propensity score for the aggregate propensity model regarding the propensity of the entity to purchase a mobile phone). Additionally or alternatively, the propensity component 122 can determine a propensity score for a third propensity model regarding the propensity of the entity to terminate the entity's mobility services subscription with the business entity based at least in part on the first propensity model (and the underlying information) and/or the second propensity model (and the underlying information).

As another example of cross-correlation, the propensity component 122 can cross-correlate a propensity of an entity (e.g., an individual) to utilize social media on a mobile phone (or other type of communication device) during certain types of content currently being presented on television. For instance, the propensity component 122 can determine a first propensity model regarding the propensity of the entity to utilize social media on a mobile phone based at least in part on the result of analyzing information relating to the entity's use of the mobile phone. The propensity component 122 also can determine a second propensity model relating to the propensity of the entity to view various types of content on television based at least in part on the result of analyzing information relating to the entity viewing content on television. The propensity component 122 can analyze and cross-correlate the first propensity model and the second propensity model (and/or can analyze and cross-correlate the respective underlying information). Based at least in part on such analysis and cross-correlation, the propensity component 122 can determine an aggregate propensity model, and an associated aggregate propensity score (e.g., aggregate weighted propensity score), regarding the propensity of the entity to utilize social media on a mobile phone during certain types of content currently being presented on television (e.g., during viewing of the certain types of content currently being presented on television).

As still another example of cross-correlation, the propensity component 122 can cross-correlate a propensity or probability of mobile churn (e.g., churn with regard to a mobile device, a mobile device subscription, or a mobile application used on a mobile device) by an entity (or a group of entities) with a propensity or probability of churn across one or more other channels (e.g., other service channels, such as broadband or Internet service, cable or satellite television service, content streaming service, and/or electronic gaming service, . . . ) by the entity (or the group of entities). For example, the propensity component 122 can determine a first propensity model regarding the propensity of an entity to engage in mobile churn with regard to the entity's mobile device and/or associated subscription based at least in part on the result of analyzing information relating to the entity's actions with regard to the mobile device, subscription, or service and/or a context of the entity (e.g., current overall context of the entity and/or current context of the entity with regard to the mobile device and/or subscription). The entity's mobile device and/or associated subscription can relate to interactions between the entity and a first business unit of a service entity. The propensity component 122 also can determine a second propensity model relating to the propensity of the entity to churn with regard to another service, such as broadband/Internet service and/or associated subscription, based at least in part on the result of analyzing information relating to the entity's actions with regard to the other service and/or a context of the entity (e.g., current overall context of the entity and/or current context of the entity with regard to the other service and/or associated subscription). The entity's other service and/or associated subscription can relate to interactions between the entity and a second business unit of the service entity. The propensity component 122 can analyze and cross-correlate the first propensity model and the second propensity model (and/or can analyze and cross-correlate the respective underlying information). Based at least in part on such analysis and cross-correlation, the propensity component 122 can determine an aggregate propensity model, and an associated aggregate propensity score (e.g., aggregate weighted propensity score), regarding the propensity of mobile churn by the entity, wherein the second propensity model regarding the propensity of churn by the entity with regard to the other service and/or associated subscription can impact and/or have a certain amount of influence on the propensity or probability of mobile churn by the entity. Additionally or alternatively, based at least in part on such analysis and cross-correlation, the propensity component 122 can determine an aggregate propensity model, and an associated aggregate propensity score (e.g., aggregate weighted propensity score), regarding the propensity of the entity to churn with regard to the other service, wherein the first propensity model regarding the propensity of mobile churn by the entity can impact, drive, and/or have a certain amount of influence on the propensity of churn by the entity with regard to the other service.

As yet another example of cross-correlation, the propensity component 122 can cross-correlate a propensity of television service usage by an entity (or group of entities) during a landline outage of, for example, broadband service with a propensity to churn by the entity (or the group of entities) with regard to cable or satellite television service and/or another service(s) (e.g., broadband or Internet service, content streaming service, and/or electronic gaming service, . . . ). For example, the propensity component 122 can analyze information relating to television service usage by an entity during a landline outage, and based at least in part on the results of the analysis, the propensity component 122 can determine a first propensity model that can indicate a propensity of the entity to utilize television service during a landline outage of broadband service. The propensity component 122 also can analyze information relating to churn by the entity with regard to broadband service, and based at least in part on the results of such analysis, the propensity component 122 can determine a second propensity model that can indicate a propensity of the entity to churn with regard to broadband service. The propensity component 122 can analyze and cross-correlate the first propensity model and the second propensity model (and/or can analyze and cross-correlate the respective underlying information). Based at least in part on such analysis and cross-correlation, the propensity component 122 can determine an aggregate propensity model, and an associated aggregate propensity score (e.g., aggregate weighted propensity score), of television service usage by the entity during a landline outage of broadband service. Additionally or alternatively, based at least in part on the analysis and cross-correlation, the propensity component 122 can determine an aggregate propensity model, and an associated aggregate propensity score (e.g., aggregate weighted propensity score), of a propensity of churn with regard to broadband service by the entity, or, more particularly, a propensity of churn with regard to broadband service by the entity in relation to the propensity of the entity to utilize the television service during a landline outage of the broadband service.

In some embodiments, with regard to various types of content (e.g., movies, television programs, videos, music, electronic gaming, email, or text messages, . . . ; and/or various genres of content, such as comedy, drama, action, reality television, documentary, or news, . . . ), the propensity component 122 can cross-correlate a propensity of an entity to watch a particular type of content with a propensity of the entity to use a certain content delivery mechanism (e.g., television, mobile phone, electronic tablet or pad, or computer, . . . ) to watch the particular type of content. The propensity component 122 can determine a first propensity model of the first propensity of the entity to watch a particular type of content, determine a second propensity model of the second propensity of the entity to use a certain content delivery mechanism, and can cross-correlate the first propensity model with the second propensity model, in a manner similar to that as more fully described herein. Based at least in part on such cross-correlation, the propensity component 122 can determine an aggregate propensity model relating to the propensity of the entity to watch a particular type of content, and/or, in particular, an aggregate propensity model relating to the propensity of the entity to watch a particular type of content in relation to (e.g., as influenced or affected by) the propensity of the entity to use a certain content delivery mechanism. Additionally or alternatively, the propensity component 122 can determine an aggregate propensity model relating to the propensity of the entity to use a certain content delivery mechanism, and/or, in particular, an aggregate propensity model relating to the propensity of the entity to use a certain content delivery mechanism in relation to (e.g., as influenced or affected by) the propensity of the entity to watch a particular type of content. For example, a person may tend to use an electronic pad to view music videos, and the person may tend to use the television to watch movies.

In certain embodiments, the propensity component 122 can cross-correlate a propensity of a group of entities associated with a certain demographic (e.g., middle-class single mothers, men between 18-29 years of age with no college education, or men between 18-29 years of age with some college education, . . . ) to attempt fraud (e.g., falsely contest a billing charge that is accurate with regard to a subscription for a service) with a propensity (e.g., a resultant increase in a propensity or probability) of churning by entities of the group of entities (e.g., entities ending their subscription for the service and/or other services provided to them by the service entity). The propensity component 122 can determine a first propensity model of the first propensity of a group of entities associated with a certain demographic to attempt fraud with regard to service subscription billing, determine a second propensity model of the second propensity relating to churning by the group of entities with regard to the subscription, and can cross-correlate the first propensity model with the second propensity model, in a manner similar to that as more fully described herein. Based at least in part on such cross-correlation, the propensity component 122 can determine an aggregate propensity model relating to the propensity of the group of entities associated with the certain demographic to attempt fraud in relation to the propensity of churning by the group of entities with regard to the subscription. The propensity component 122 can perform an analysis, including such cross-correlation analysis, and can use the aggregate (e.g., cross-correlated) propensity model, to determine or facilitate determining if and under what instances or circumstances it can be less expensive to remove a billing charge from a bill of an entity associated with the certain demographic, even if the billing charge is proper and the entity potentially may be attempting to defraud the service entity, than it is to significantly increase the subscription loss in churn by not removing the billing charge from the bill.

Figure 2:
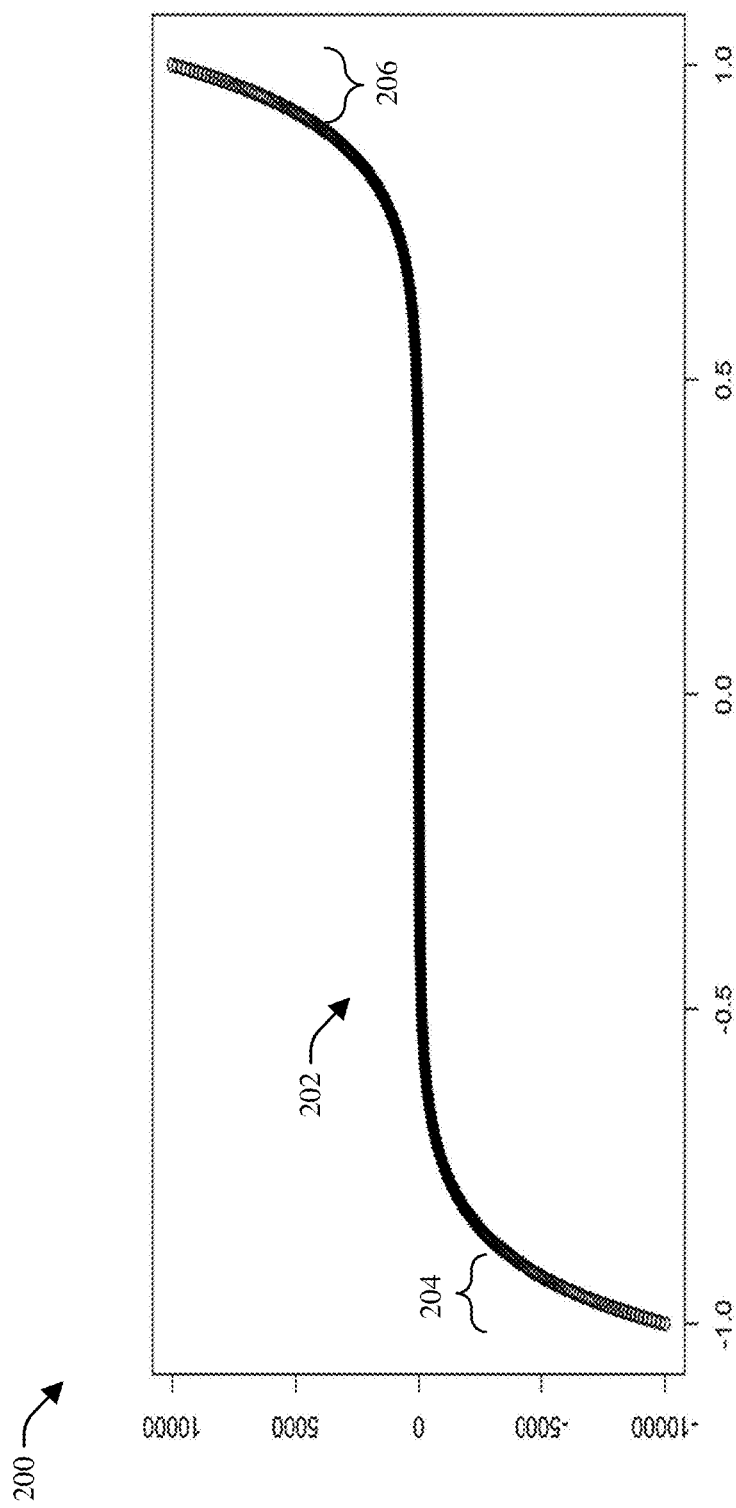
FIG. 2 presents a diagram of an example graph that can illustrate an example non-linear relationship between a first behavior of an entity and a second behavior of the entity, in accordance with various aspects and embodiments of the disclosed subject matter.

While some relationships (e.g., interrelationships) between behaviors of an entity or entities can be linear or substantially linear in nature, where there can be a direct or more direct correlation between one behavior and another type of behavior, other types of relationships of an entity or entities can be non-linear in nature. Referring briefly to FIG. 2 (along with FIG. 1), FIG. 2 presents a diagram of an example graph 200 that can illustrate an example non-linear relationship between a first behavior of an entity and a second behavior of the entity, in accordance with various aspects and embodiments of the disclosed subject matter. The example graph 200 can present a non-linear function 202 that can illustrate an example use case where the propensity for an entity (e.g., a customer) to watch a certain content type can be non-linearly related to a propensity or probability that the entity will purchase the content, which usually can be mediated by the price of purchasing the content. The propensity component 122 can determine this non-linear relationship and corresponding non-linear function 202, based at least in part on the results of analyzing information relating to the behavior of the entity with regard to watching content and the behavior of the entity with regard to purchasing content. As can be observed in a first region 204 of this example non-linear function 202, as the propensity to watch a certain content type becomes very low, the entity can have a propensity to no longer want to browse that content, or at least can have relatively little interest in browsing that content, which can make the probability of purchase of that content by the entity relatively low (e.g., almost null). The propensity of most customers to purchase content can be around chance levels. However, as can be observed in a second region 206 of the non-linear function 202, as the propensity of the entity to watch a content type becomes higher and gets to the point of being very high, the probability of the entity purchasing such content can increase and can be very high (e.g., close to 100%) when the propensity of the entity to watch the content is very high.

With further regard to FIG. 1, and with further regard to non-linear relationships, in accordance with various embodiments, the propensity component 122 can take into account that there can be moderating and/or mediating variables, and accordingly, moderation and/or mediation propensities, with regard to relationships between behaviors of an entity or entities. Moderation and/or mediation propensities can involve non-linear relationships (e.g., interrelationships) between certain behaviors of an entity or group of entities. As an example of moderation propensity, the propensity component 122 can analyze information relating an entity's behavior with regard to purchasing a service or good and the entity's behavior with regard to perceiving (e.g., viewing or hearing) an advertisement display (e.g., online advertisement, or television or radio commercial advertisement) for the service or good. Based at least in part on the results of analyzing such information, the propensity component 122 can determine an aggregate propensity model of a propensity, which can be a moderation propensity, of the entity to purchase the service or good in relation to the advertisement display for the service or good that can be perceived by the entity. For example, with regard to at least some entities (e.g., people), based at least in part on the results of analyzing such information, the propensity component 122 can determine that the propensity of the entity to purchase the service or good can be moderated such that the propensity of the entity to purchase the service or good can go down (e.g., decline) the more times the advertisement for the service or good is presented (e.g., displayed or presented in audio form) to the entity.

As an example of mediation propensity, the propensity component 122 can determine the propensity of an entity to watch particular content or a particular content type and/or purchase content (e.g., movie, television program, or other content) in relation to the propensity of the entity to look at an electronic program guide (EPG). The propensity component 122 can analyze information relating an entity's behavior with regard to watching particular content or content type and/or purchasing content, and the entity's behavior with regard to looking at the EPG, which can present information regarding various items and types of content that can be available for viewing and/or purchase. Based at least in part on the results of analyzing such information, the propensity component 122 can determine an aggregate propensity model of a propensity (e.g., a mediation propensity) of the propensity of the entity to watch particular content or a particular content type and/or purchase content in relation to the propensity of the entity to view the EPG. With regard to the mediating aspects of this aggregate propensity model, such model can take into account that, on the one hand, the entity may need to see content information regarding particular available content in the EPG in order for the entity to know such particular content exists, but, on the other hand, the mere fact of the entity changing the channel and seeing what content is available in the EPG does not drive, or at least does not necessarily drive, the propensity or probability of the entity purchasing content.

With further regard to propensity models in general, including propensity models that can involve cross-correlation and/or linear relationships between respective propensity models relating to respective behaviors, and propensity models that can involve non-linear relationships (e.g., interrelationships) between respective propensity models relating to respective behaviors, the propensity component 122, employing the scoring component, can determine respective weights (e.g., cross-correlation weights) that can be applied to respective propensity scores of respective propensity models relating to propensities for respective behaviors based at least in part on the amount of correlation there is between respective propensity models (e.g., as such amount of correlation is determined by the propensity component 122), in accordance with the defined interaction management criteria. The propensity component 122 can apply one or more respective weights (e.g., cross-correlation weights) to one or more of the respective propensity scores of one or more respective propensity models, and can determine the propensity score (e.g., overall, aggregate, or cross-correlated propensity score) for a particular propensity model of the one or more respective propensity models based at least in part on the one or more respective weighted propensity scores of the one or more respective weighted propensity models. As more fully described herein, with regard to the propensity score (e.g., overall, aggregate, or cross-correlated propensity score) of the particular propensity model, the propensity component 122 also can apply a desired weight to that propensity score to determine a weighted propensity score, based at least in part on the set of weighting factors.

In some embodiments, during an interaction between an entity (e.g., user 104, or VA 106) and another entity (e.g., user 114, or VA 116, for example, of a business entity), the propensity component 122 can employ a model context tracker that can track, determine, or update (e.g., update in real time) the context of the interaction between the entities, based at least in part on the result of analyzing information relating to the interaction and/or other desired information (e.g., relevant or pertinent information), to facilitate determining one or more respective propensity models relating to one or more respective behaviors of or associated with the entity (e.g., user 104, or VA 106). The propensity component 122 can receive such information relating to the interaction and/or the other desired information from the entities participating in the interaction, the communication device(s) (e.g., communication device 102, 108, 112, or 118) associated with the entity(ies), historical information relating to the entities, and/or demographic information relating to demographic characteristics associated with one or more of the entities. During the interaction, the propensity component 122, employing the propensity model platform, can update (e.g., update automatically, dynamically, and/or in real time) propensity models relating to behaviors of or associated with the entity (e.g., user 104, or VA 106) and/or propensity scores (e.g., weighted propensity scores) of such propensity models, based at least in part on the update to the context of the interaction between the entities. The updated propensity models can be utilized by the propensity component 122 to determine or facilitate determining a next action that can be performed by the other entity (e.g., user 114, or VA 116, for example, of a business entity) or the IMC 120 during the interaction with the entity (e.g., user 104, or VA 106), in accordance with the defined interaction management criteria. The disclosed subject matter can thereby facilitate automation of propensity outcomes associated with an entity during an interaction based at least in part on the context of or associated with the entity (e.g., user 104, or VA 106).

For instance, based at least in part on the updated context of the interaction, the propensity component 122, employing the propensity orchestrator component, can analyze the updated propensity models relating to the behaviors of the entity and associated updated weighted propensity scores of such propensity models, and, based at least in part on the analysis results, can determine one or more actions that can be performed by the other entity (e.g., user 114, or VA 116, for example, of a business entity) or the IMC 120 during the interaction with the entity (e.g., user 104, or VA 106). For example, the propensity component 122, employing the propensity orchestrator component, can determine and/or select one or more actions associated with one or more updated propensity models relating to respective behaviors that are associated with one or more highest or higher updated propensity scores (e.g., one or more highest or higher updated weighted propensity scores), in accordance with the defined interaction management criteria. As applicable, the propensity component 122 can communicate the one or more actions to the other entity (e.g., user 114, or VA 116) for consideration and/or performance by the other entity during the interaction, and/or the IMC 120 can perform the one or more actions during the interaction.

For instance, if one action of those one or more actions (e.g., the action associated with the propensity model having the highest weighted propensity score) involves the other entity (e.g., user 114, or VA 116) presenting a particular offer for a service to the entity (e.g., user 104, or VA 106), the other entity (e.g., user 114, or VA 116) can receive information relating to the one or more actions from the IMC 120, and can observe that the action is associated with the highest weighted propensity score. In some embodiments, the other entity also can receive a script relating to such action (e.g., determined and generated by the propensity orchestrator of the propensity component 122) to communicate (e.g., read) to the entity (e.g., user 104, or VA 106) to present the offer to the entity. The other entity, using the other entity's communication device (e.g., communication device 112 or 118) can present the offer to the entity (e.g., using the script) via the entity's communication device (e.g., communication device 102 or 108). The entity (e.g., user 104, or VA 106) can respond to offer presented by the other entity (e.g., via their respective communication devices, or in person, when the entity is at the store of the business entity). The other entity (e.g., user 114, or VA 116) can provide feedback information notating the response (e.g., acceptance of the offer, rejection of the offer, or other type of response) of the entity (e.g., user 104, or VA 106) to the offer to the IMC 120. The IMC 120, employing the propensity component 122, can analyze such feedback information, update the context of the interaction based at least in part on the results of analyzing such feedback information, and correspondingly, can update the propensity models relating to behaviors of or associated with the entity and associated propensity scores (e.g., weighted propensity scores) based at least in part on the analysis results and updated context to determine a next action to be performed by the other entity. For instance, if the entity (e.g., user 104, or VA 106) accepted the offer, depending on the updates propensity models and updated propensity scores, the next action for the other entity to perform can be to confirm acceptance of the offer by the entity or finalize details of the acceptance of the offer by the entity (e.g., presenting an agreement for the entity to sign or accept, providing details regarding payment for the service, or obtaining payment information from the entity, . . . ), or to present a second offer to the entity for consideration. If, instead, the entity declined the offer, depending on the updates propensity models and updated propensity scores, the next action for the other entity to perform can be, for example, to present a second offer for a service or product to the entity for consideration, or to continue to provide service to the entity with regard to an initial reason the entity contacted the business entity.

In some instances, the interaction involving the entity (e.g., user 104, or VA 106) can relate to the entity interacting with a website of the business entity using the communication device (e.g., communication device 102 or 108) of the entity, rather than interacting with the user 114 or VA 116 of the business entity. In such instances, if one action of those one or more actions (e.g., the action associated with the propensity model having the highest weighted propensity score) involves presenting a particular offer for a service to the entity, the IMC 120, or another component associated with the IMC 120, can modify (e.g., configure or customize) a web page of the website of the business entity to present the offer to the entity via the communication device (e.g., communication device 102 or 108) of the entity. If the entity (e.g., user 104, or VA 106) accepted the offer, depending on the updates propensity models and updated propensity scores, the next action for the IMC 120 to perform can be to confirm acceptance of the offer by the entity or finalize details of the acceptance of the offer by the entity (e.g., presenting an agreement for the entity to sign or accept, providing details regarding payment for the service, or obtaining payment information from the entity, . . . ), or to present a second offer to the entity for consideration. If, instead, the entity declined the offer, depending on the updates propensity models and updated propensity scores, the next action for the IMC 120 to perform can be, for example, to present a second offer for a service or product to the entity for consideration, or to continue to provide service to the entity with regard to the initial reason the entity accessed the website of the business entity.

It is to be appreciated and understood that, while the example action described herein relates to an offer for a service (e.g., offer for the customer to purchase a service), the action can be one of a variety of types of actions. As some non-limiting examples, an action to be performed by the other entity (e.g., user 114, or VA 116) can relate to payment of a bill for a subscription to a service or a product by the entity (e.g., user 104, or VA 106); configuration (e.g., customization) of an automated audio menu when the entity is interacting with a call center of the business entity; bypassing of an automated audio menu (e.g., when a propensity model of a behavior of an entity indicates that such entity does not like to use automated audio menus, but rather prefers to bypass such menus as quickly as possible and speak to a human service representative or technician); configuration (e.g., customization) of a web page of a website of the business entity; determination regarding whether the entity is a legitimate actor or an adversarial actor (e.g., fraudster, criminal, malicious, or otherwise adversarial entity); or transitioning the interaction involving user 104, or alternatively, VA 106, from being with user 114 to being with VA 116, or vice versa, based at least in part on preferences (e.g., interaction preferences) of the user 104, or alternatively, VA 106.

In some embodiments, during a VA-to-VA interaction (e.g., interaction between VA 106 and VA 116), the IMC 120 can enhance (e.g., improve or optimize) communication of information between VA 106 and VA 116, which can facilitate mitigating (e.g., reducing or minimizing) network traffic, network congestion, and/or the use of network resources of the communication network 110. For instance, the IMC 120 can manage or facilitate managing the interaction between the VA 106 and VA 116 to have the communication of data between the VA 106 and VA 116 be in a non-verbal form (e.g., communication of digital data), wherein such data can be communicated via a non-audio data communication channel. Such communication of data in non-verbal form (e.g., data traffic) can enable the exchange of information (e.g., interaction-related information) at a relatively high speed (e.g., typically a higher speed of communication of information than the speed that such information can be communicated in verbal or audio form).

In other embodiments, if a data communication channel is not available for VA-to-VA data communications, or if only a single communication channel is available (e.g., for communications relating to the interaction), the communication of data between the VA 106 and VA 116 can be in a verbal word form via an available communication channel (e.g., communication via a channel that supports presentation of verbal/audio words. In such instance, the IMC 120 can control (e.g., modify) the characteristics of the VA 106 and/or VA 116, and/or the respective VAs 106 and 116 can modify their respective characteristics, to exchange information at a higher speed (e.g., at a highest speed achievable via the communication channel). For example, the IMC 120, and/or the respective VAs 106 and 116, can modify (e.g., increase) the speed of presentation of verbal words by the VA 106 and/or VA 116, can modify the cadence of the verbal words being presented by the by the VA 106 and/or VA 116 to enhance (e.g., increase the speed of) the conversation between the VA 106 and VA 116.

The disclosed subject matter, by employing the IMC 120 and data repository 124, can provide a number of benefits or advantages. For instance, the disclosed subject matter, by employing the IMC 120 and data repository 124, can provide a personalized, relevant, and consistent experience for customers with propensity matching with regard to behaviors of customers. The disclosed subject matter can employ the data repository 124 as a single, centralized repository of customer propensity with regard to behaviors, which can make such information regarding customers commonly and readily accessible across the various business units of a business entity to facilitate improving interactions with customers. The disclosed subject matter, by employing the IMC 120 and data repository 124, can track or predict future behaviors of customers using the propensity scoring of behaviors, which can develop and enhance sales growth of products and services by the business entity. The disclosed subject matter, by employing the IMC 120 and data repository 124, also can enhance (e.g., improve or optimize) advertising to customers based upon an aggregate propensity score relating to the propensities of a customer with regard to various behaviors, wherein the aggregate propensity score also can include an aging function that can take into account that customers' desires can change over time.

The disclosed subject matter, by employing the IMC 120 and data repository 124, also can comprise a flexible model relevancy system where propensity model scoring can updates to propensity models and propensity scores can be performed at various times (e.g., various and dynamic time intervals), based on the information, context, and conditions relating to interactions, rather than being fixed to seconds, days, weeks, or years. In accordance with various embodiments, the IMC 120 and data repository 124, and associated flexible model relevancy system, can operate in real time (e.g., real-time, streaming operation), and/or can perform operations and functions dynamically or automatically as events occur during and within interactions, or outside of interactions. The disclosed subject matter, by employing the IMC 120 and data repository 124, also can perform dynamic propensity scoring of propensity models, and dynamic presentation of alternative offers (or other services) to entities (e.g., user 104, or VA 106) (and/or the other entity (e.g., user 114, or VA 116 of a business entity) interacting with the entity) based at least in part on external factors (e.g., social media information associated with the user 104 and/or demographic information relating to demographic characteristics associated with the user 104), which can enhance (e.g., improve or optimize) the interaction (e.g., enhance value exchange associated with the interaction).

The disclosed subject matter also can reduce the amount of time used for calls (e.g., phone calls and/or work calls) with service personnel (e.g., service technicians) of the business entity and/or can otherwise enhance performance of service personnel when interacting with customers on calls. The disclosed subject matter also can enable agents (e.g., human agents or VAs) of the business entity to have real time insight to the customer while interacting with the customer. The disclosed subject matter also can mitigate (e.g., reduce, minimize, or limit) the number of call transfers by agents of a business entity during an interaction (e.g., phone call) with a customer.

In some embodiments, the disclosed subject matter can provide opportunities for third-party monetization. For instance, in exchange for financial remuneration, the propensity models and scoring of propensity models, and/or services based on the propensity models and scoring of propensity models, can be provided to third parties for use in determining how to desirably interact with entities (e.g., human users or VAs) during interactions.

Figure 3:
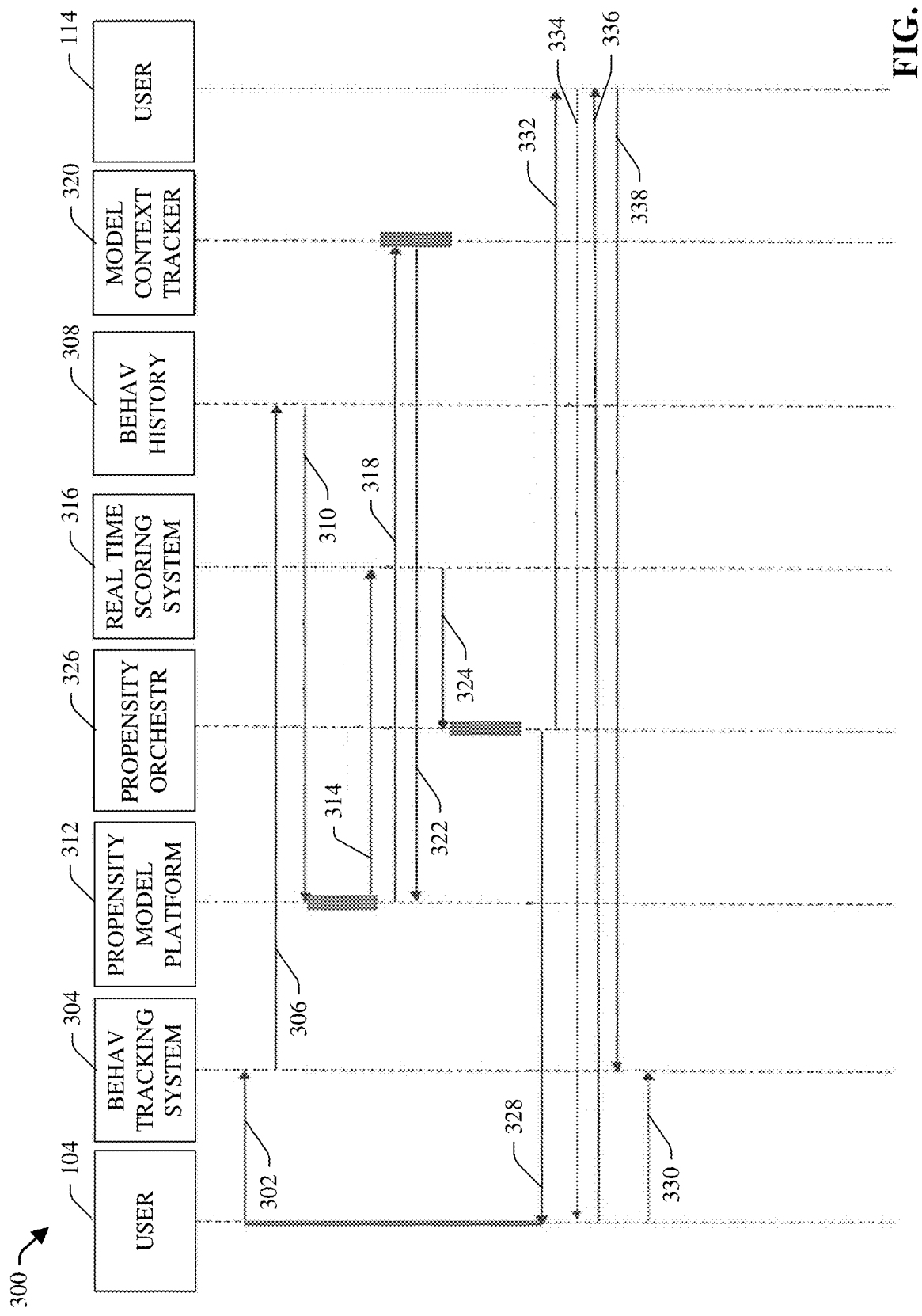
FIG. 3 depicts a diagram of an example interaction flow between respective users and/or their associated communication devices, in accordance with various aspects and embodiments of the disclosed subject matter.

Other aspects and embodiments of the disclosed subject matter will be described with regard to the other figures (and/or FIG. 1). Referring to FIG. 3 (along with FIG. 1), FIG. 3 depicts a diagram of an example interaction flow 300 between respective users and/or their associated communication devices, in accordance with various aspects and embodiments of the disclosed subject matter. As part of the example interaction flow 300, a user 104 (e.g., customer) can contact a business entity (e.g., a service provider) that can have a user 114 (e.g., operations agent) handling interactions (e.g., business interactions, such as phone calls, website interactions (e.g., live chat sessions)) with customers, such as the user 104. As indicated at reference numeral 302, during the interaction between the user 104 and user 114, the IMC 120 can employ a behavioral tracking system (BEHAV TRACKING SYSTEM) 304 that can monitor, track, measure, and/or determine the behavior(s) of the user 104 during the interaction. For instance, based at least in part on the tracking of the interaction, the IMC 120, employing the behavioral tracking system 304, can measure and/or determine one or more behaviors of the user 104 during the initial and subsequent parts of the interaction. The behavior(s) of the user 104 can comprise, can relate to, or can be determined from the action(s) (e.g., words spoken or typed, buttons pushed on an interface or menu, . . . ) performed by the user 104 during the interaction, voice inflection of the user 104 during the interaction, facial expression(s) of the user 104 during the interaction, and/or other behavior or behavior attributes exhibited by the user 104 during the interaction. The one or more behaviors of the user 104 can indicate or specify the reason the user 104 was contacting the business entity (e.g., if the user 104 initiated the interaction with the business entity), a service or product (if any) the user 104 is interested in, and/or a task (e.g., pay a bill, change (e.g., upgrade) a service, . . . ) the user 104 desires to accomplish during the interaction, etc.

As indicated at reference numeral 306, the IMC 120 can store behavior information relating to the one or more behaviors of the user 104 in the behavior history (BEHAV HISTORY) 308 of the user 104, wherein the IMC 120 can store the behavior history 308 of the user 104 in a user profile associated with the user 104 that can be stored in the data repository 124. For instance, in response to measuring and/or determining the one or more behaviors of the user 104, the IMC 120 can store the behavior information relating to the one or more behaviors, which can indicate, specify, and/or quantify the measured and/or determined behavior(s) of the user 104, in the behavior history 308 of the user 104 in the user profile of the user 104 in the data repository 124.

As indicated at reference numeral 310, the IMC 120 can analyze and/or parse the behavior information to transform the behavior information into transformed data relating to the one or more behaviors of the user 104 and can send (e.g., communicate) the transformed data to a propensity model platform 312 of the IMC 120. For instance, the IMC 120 can transform, normalize, and/or reformat respective items of data of the behavior information based at least in part on a data type of an item of data, a context of an item of data (e.g., context with respect to the user 104 and/or the interaction), a type of interaction associated with an item of data, a data rate associated with an item of data (e.g., is the item of data the type of data that is collected or particularly relevant on a minute basis, an hourly basis, a daily basis, a weekly basis, or a monthly basis, . . . ), and/or another data transformation factor, to generate the transformed data (e.g., transformed items of data) in a form that can be desirable (e.g., suitable, acceptable, usable, or optimal) to the propensity model platform 312 of the IMC 120. The IMC 120 can employ the propensity model platform 312 to analyze the transformed data relating to the one or more behaviors and determine one or more models (e.g., one or more propensity models) of the one or more behaviors based at least in part on the results of analyzing the transformed data. For each behavior of the user 104, the model (e.g., propensity model) of the behavior can indicate (e.g., specify or quantify) a propensity of the user 104 to exhibit or engage in the behavior.

As indicated at reference numeral 314, the IMC 120, employing the propensity model platform 312, can communicate (e.g., send or deliver) the one or more models (e.g., one or more propensity models) of the one or more behaviors to a real time scoring system 316 of the IMC 120. For each propensity model, the real time scoring system 316 can determine a propensity score of the model of the behavior based at least in part on one or more scoring factors (e.g., a type of behavior, a pattern of exhibiting a behavior by the user, a length of time the user has exhibited the behavior, the actions performed (or not performed) by the user with respect to the behavior, and/or a confidence, certainty, or strength level of the determination of the behavior, . . . ), such as more fully described herein, in accordance with the defined interaction management criteria.

As indicated at reference numeral 318, in parallel or simultaneously (or substantially simultaneously) with, or in succession to (e.g., in real time succession to), communicating the model(s) of the behavior(s) to the real time scoring system 316, the IMC 120, employing the propensity model platform 312, can communicate information relating to the channel for the user (e.g., customer) interaction of the user 104 to a model context tracker 320 of the IMC 120 to facilitate determining the context of the interaction and/or the context of the model(s) with respect to the interaction based at least in part on the channel for the user interaction or other interaction information that can be relevant to the interaction. For example, the IMC 120, employing the propensity model platform 312, can communicate, to the model context tracker 320, information that can indicate whether the user 104 is interacting or communicating with the website (e.g., a particular web page of the website) of the business entity, whether the user 104 is interacting via an online live chat session with an operations agent (e.g., user 114, such as, for example, a customer service representative, or a service technician, . . . ) of the business entity, whether the user 104 has called into a call center of the business entity, whether the user 104 is using an automated menu or is attempting to bypass the automated menu to talk to an operations agent of the business entity, whether the user 104 has walked into a retail store of the business entity and is interacting to an operations agent in the retail store, whether the user 104 is at home and is interacting with an operations agent (e.g., service technician) who is at the user's home, or whether the user 104 is using another type of channel of interaction to interact with an operations agent of the business entity.

The IMC 120, employing the model context tracker 320, can determine the context of the interaction, including context relating to the channel for user interaction, and the overall context of the interaction (e.g., status of the interaction, type of interaction, behavior exhibited by the user 104, action(s) or task(s) performed during the interaction, or what action(s) or task(s) remain or may remain to be performed during the interaction, . . . ) and/or the users (e.g., user 104, user 114), based at least in part on the information relating to the channel for user interaction and other information relating to the interaction, which the model context tracker 320 can obtain from the central repository 124. For each of the one or more propensity models of the one or more behaviors of the user 104, the IMC 120, employing the model context tracker 320, can determine a model update for the propensity model relating to the behavior. As indicated at reference numeral 322, the IMC 120, employing the model context tracker 320, can communicate the model update(s) for the propensity model(s) to the propensity model platform 312. The propensity model platform 312 can update the propensity model(s) based at least in part on the model update(s), and can communicate the updated propensity model(s) to the real time scoring system 316 for scoring the behavior(s) of the user 104 based at least in part on the updated propensity model(s).

For each update propensity model, the IMC 120, employing the real time scoring system 316, can determine a propensity score (e.g., updated propensity score), which can be a weighted propensity score (e.g., updated weighted propensity score), for the updated propensity model relating to a behavior of the user 104. As indicated at reference numeral 324, the real time scoring system 316 can communicate the one or more propensity scores of the one or more propensity models of the one or more behaviors of the user 104 to the propensity orchestrator (PROPENSITY ORCHESTR) 326 of the IMC 120. The IMC 120, employing the propensity orchestrator 326, can determine one or more actions that can be performed by the user 114 (e.g., operations agent) or a component(s) of the IMC 120, based at least in part on the one or more propensity scores, to attempt to elicit performance of a defined favorable action by the user 104 in response to the action(s) performed by the user 114 (e.g., operations agent) or the component(s) of the IMC 120, in accordance with the defined interaction management criteria. The propensity orchestrator 326 can rank the respective propensity scores (e.g., respective weighted propensity scores) and the respectively associated propensity models of the respective behaviors of the user 104, for example, from highest propensity score to lowest propensity score. In some embodiments, when the action recommended or instructed by the propensity orchestrator 326 involves the user 114 talking to the user 104 (e.g., to present an offer for a product or service), the propensity orchestrator 326 can determine a script that the user 114 can read from when talking to the user 104, based at least in part on the propensity model relating to a behavior of the user 104 (e.g., propensity model having the highest weighted propensity score).

In certain embodiments, as indicated at reference numeral 328, the IMC 120, employing the propensity orchestrator 326, can change applications, or the configuration of an application, in accordance with (e.g., to match) a propensity score (e.g., highest weighed propensity score) of a propensity model relating to a behavior of the user 104, to facilitate presenting desired information (e.g., customized information) to the user 104 via an interface (e.g., display screen and/or audio speakers) of the communication device 102 of the user 104, wherein the desired information can be determined (e.g., by the IMC 120) based at least in part on such propensity model. For example, if the user 104 is viewing a web page on the website of the business entity, and the propensity model associated with the highest weighted propensity score indicates that the web page is to be customized to change the information on the web page to include an offer for a service that can be provided by the business entity (or an associated business entity), the IMC 120 (e.g., employing the propensity orchestrator 326 or another component of the IMC 120) can modify (e.g., customize) the web page to include information (e.g., offer information, graphics relating to the offer) regarding such offer for the service, and can present (e.g., communicate) the modified web page to the communication device 102 of the user 104 to facilitate presenting the offer to the user.

As another example, a user 104 can use the communication device 102 to call in to a call center of the business entity, wherein, initially, the call center (e.g., communication device of the call center) can present the user 104, via the communication device 102, an automated audio menu. If the propensity model associated with the highest weighted propensity score indicates that the automated audio menu is to be customized to change the information or selection presented by the automated audio menu to include certain information or certain selections that may be relevant to the user 104, based at least in part on the behavior of the user 104 and/or the context of the interaction (or if the propensity model indicates that the automated audio menu is to be bypassed and the user 104 is to be connected to a human operations agent (e.g., user 114) because it is determined that the user 104 does not like automated audio menus and prefers to talk directly to a human operations agent), the IMC 120 (e.g., employing the propensity orchestrator 326 or another component of the IMC 120) can modify (e.g., customize) the automated audio menu to include the certain information or certain selections that may be relevant to the user 104, and can present (e.g., communicate) the modified automated audio menu to the communication device 102 of the user 104 to facilitate presenting the modified automated audio menu to the user 104 (or can bypass the automated audio menu and connect the communication device 102 of the user 104 to the communication device 112 of the user 114).

In response to the IMC 120 changing applications, or changing the configuration of an application(s), the user 102 (e.g., via the communication device 102) can perform a response action (e.g., accept the offer or reject the offer on the web page; or enter a particular selection from the automated audio menu). As indicated at reference numeral 330, the IMC 120 can notate the behavior of the user 104 (e.g., the response action of the user 104) to the action performed by the IMC 120 by communicating such information regarding the behavior of the user 104, to the behavior tracking system 304. The IMC 120, employing the behavior tracking system 304, can store such information regarding the behavior of the user 104 in the data repository 124, and the behavior tracking system 304 can determine or measure such behavior of the user 104. The interaction can continue from that point, and the IMC 120 can continue to perform operations relating to determining propensities of the behaviors of the user 104 and actions to perform or have the user 114 perform, at least until the interaction has been completed.

Alternatively or additionally, as shown at reference numeral 332, the IMC 120, employing the propensity orchestrator 326, can communicate a desired number of respective propensity scores (e.g., respective weighted propensity scores) associated with respective propensity models relating to respective behaviors of the user 104, wherein the respective propensity models can indicate respective options (e.g., make an offer for a service to the user 104, request that the user 104 pay a bill, or ask the user 104 for information to facilitate determining whether the user 104 is a fraudster/malicious person or not) for the user 114 (e.g., operations agent) to consider during the interaction with the user 104. As indicated at reference numeral 334, the user 114, using communication device 112, can present an option (e.g., present the option associated with the highest propensity score) to the user 104, via the communication device 102 of the user 104, for consideration by the user 104, wherein, in this example interaction, such option can be an offer for the user 104 to purchase a service.

As shown at reference numeral 336, the user 104 (e.g., customer), using the communication device 102, can respond to the offer (e.g., by performing an action, such as making a statement, to accept the offer, reject the offer, or take some other action in response to the offer), which can be communicated to the communication device 112 and presented to the user 114.

As indicated at reference numeral 338, the user 114 (and/or the communication device 112 and/or the IMC 120) can notate the behavior of the user 104 (e.g., the response action of the user 104) to the offer presented by the user 114, using the communication device 112, by communicating such information regarding the behavior of the user 104 to the behavior tracking system 304. The IMC 120, employing the behavior tracking system 304, can store such information regarding the behavior of the user 104 in the data repository 124, and the behavior tracking system 304 can determine or measure such behavior of the user 104. The interaction can continue from that point, and the IMC 120 can continue to perform operations relating to determining propensities of the behaviors of the user 104 and actions to perform or have the user 114 perform, at least until the interaction has been completed.

Figure 4:
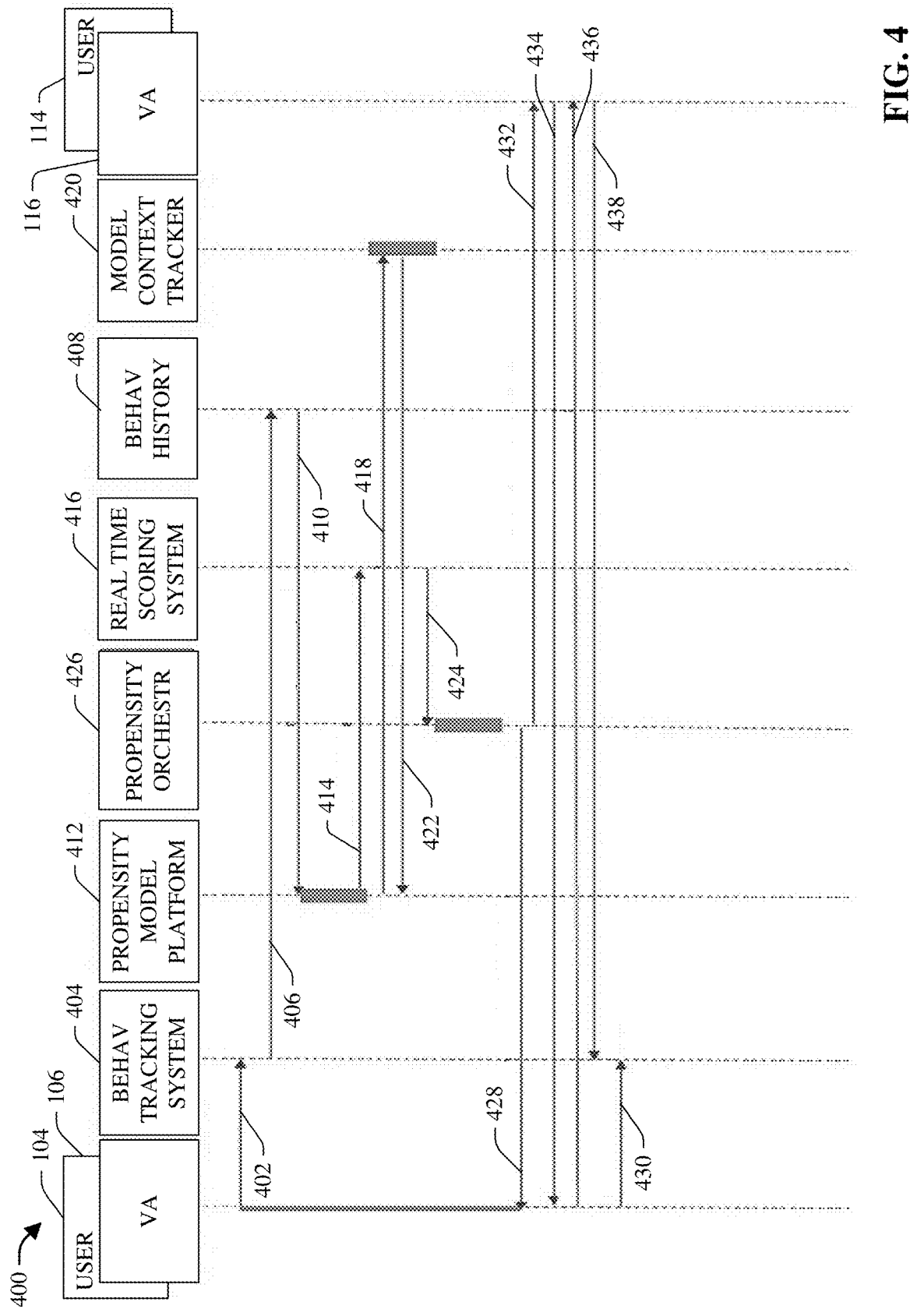
FIG. 4 depicts a block diagram of an example interaction flow between respective users (and/or their associated communication devices) and/or respective virtual assistants (VAs) associated with the respective users, in accordance with various aspects and embodiments of the disclosed subject matter.

Referring to FIG. 4 (along with FIG. 1), FIG. 4 depicts a block diagram of an example an example interaction flow 400 between respective users (and/or their associated communication devices) and/or respective VAs associated with the respective users, in accordance with various aspects and embodiments of the disclosed subject matter. As part of the example interaction flow 400, a user 104 (e.g., customer), or a VA 106 acting on behalf of the user 104 (e.g., via the communication device 102 or communication device 108) can contact a business entity (e.g., a service provider) that can have a user 114 (e.g., operations agent) or a VA 116 (e.g., via communication device 112 or communication device 118) handling interactions (e.g., business interactions, such as phone calls, website interactions (e.g., live chat sessions))

with customers, such as the user 104 or VA 106. As indicated at reference numeral 402, during the interaction between the user 104 (or VA 106) and user 114 (or VA 116), the IMC 120 can employ a behavioral tracking system 404 that can monitor, track, measure, and/or determine the behavior(s) of the user 104 (or VA 106) during the interaction. For instance, based at least in part on the tracking of the interaction, the IMC 120, employing the behavioral tracking system 404, can measure and/or determine one or more behaviors of the user 104 (or VA 106) during the initial and subsequent parts of the interaction. The behavior(s) of the user 104 (or VA 106) can comprise, can relate to, or can be determined from the action(s) (e.g., words spoken or typed, buttons pushed on an interface or menu, . . . ) performed by the user 104 (or VA 106) during the interaction, voice inflection of the user 104 (or VA 106) during the interaction, facial expression(s) of the user 104 during the interaction, and/or other behavior or behavior attributes exhibited by the user 104 (or VA 106) during the interaction. The one or more behaviors of the user 104 (or VA 106) can indicate or specify the reason the user 104 (or VA 106) was contacting the business entity (e.g., if the user 104 (or VA 106) initiated the interaction with the business entity), a service or product (if any) the user 104 (or VA 106 acting on behalf of the user 104) is interested in, and/or a task (e.g., pay a bill, change (e.g., upgrade) a service, . . . ) the user 104 (or VA 106) desires to accomplish during the interaction, etc. The one or more behaviors of the user 104 (or VA 106) also can indicate whether the entity contacting the business entity is the user 104 or the VA 106 acting on behalf of the user 104.

As indicated at reference numeral 406, the IMC 120 (e.g., employing the behavior tracking system 404) can store behavior information relating to the one or more behaviors of the user 104 (or VA 106) in the behavior history 408 of the user 104 (or VA 106), wherein the IMC 120 can store the behavior history 408 of the user 104 (or VA 106) in a user profile associated with the user 104 (or an associated VA profile associated with the VA 106) that can be stored in the data repository 124. For example, in response to measuring and/or determining the one or more behaviors of the user 104 (or VA 106), the IMC 120 can store the behavior information relating to the one or more behaviors, which can indicate, specify, and/or quantify the measured and/or determined behavior(s) of the user 104 (or VA 106), in the behavior history 408 of the user 104 in the user profile of the user 104 (or the VA profile associated with the VA 106) in the data repository 124.

As shown at reference numeral 410, the IMC 120 can analyze and/or parse the behavior information to transform the behavior information into transformed data relating to the one or more behaviors of the user 104 (or VA 106) and can send (e.g., communicate) the transformed data to a propensity model platform 412 of the IMC 120. For example, the IMC 120 can transform, normalize, and/or reformat respective items of data of the behavior information based at least in part on a data type of an item of data, a context of an item of data (e.g., context with respect to the user 104 (or VA 106) and/or the interaction), a type of interaction associated with an item of data, a data rate associated with an item of data (e.g., is the item of data the type of data that is collected or particularly relevant on a minute basis, an hourly basis, a daily basis, a weekly basis, or a monthly basis, . . . ), and/or another data transformation factor, to generate the transformed data (e.g., transformed items of data) in a form that can be desirable (e.g., suitable, acceptable, usable, or optimal) to the propensity model platform 412 of the IMC 120. The IMC 120 can employ the propensity model platform 412 to analyze the transformed data relating to the one or more behaviors of the user 104 (or the VA 106) and determine one or more models (e.g., one or more propensity models) of the one or more behaviors of the user 104 (or VA 106) based at least in part on the results of analyzing the transformed data. For each behavior of the user 104 (or VA 106), the model (e.g., propensity model) of the behavior can indicate (e.g., specify or quantify) a propensity of the user 104 (or VA 106) to exhibit or engage in the behavior.

As indicated at reference numeral 414, the IMC 120, employing the propensity model platform 412, can communicate (e.g., send or deliver) the one or more models (e.g., one or more propensity models) of the one or more behaviors of the user 104 (or the VA 106) to a real time scoring system 416 of the IMC 120. For each propensity model, the real time scoring system 416 can determine a propensity score of the model of the behavior of the user 104 (or the VA 106) based at least in part on one or more scoring factors (e.g., a type of behavior of the user 104 (or the VA 106), a pattern of exhibiting a behavior by the user 104 (or the VA 106), a length of time the user 104 (or the VA 106) has exhibited the behavior, the actions performed (or not performed) by the user 104 (or the VA 106) with respect to the behavior, and/or a confidence, certainty, or strength level of the determination of the behavior, . . . ), such as more fully described herein, in accordance with the defined interaction management criteria.

As shown at reference numeral 418, in parallel or simultaneously (or substantially simultaneously) with, or in succession to (e.g., in real time succession to), communicating the model(s) of the behavior(s) to the real time scoring system 416, the IMC 120, employing the propensity model platform 412, can communicate information relating to the channel for the user interaction of the user 104 (or the VA interaction of the VA 106) to a model context tracker 420 of the IMC 120 to facilitate determining the context of the interaction and/or the context of the model(s) with respect to the interaction based at least in part on the channel for the user interaction (or VA interaction) or other interaction information that can be relevant to the interaction. For instance, the IMC 120, employing the propensity model platform 412, can communicate, to the model context tracker 420, information that can indicate whether the user 104 (or VA 106) is interacting or communicating with the website of the business entity, whether the user 104 (or VA 106) is interacting via an online live chat session with an operations agent (e.g., user 114, such as, for example, a customer service representative, or a service technician; or VA 116, . . . ) of the business entity, whether the user 104 (or VA 106) has called into a call center of the business entity, whether the user 104 (or VA 106) is using an automated menu or is attempting to bypass the automated menu to talk to or interact with an operations agent (e.g., user 114 or VA 116) of the business entity, whether the user 104 has walked into a retail store of the business entity and is interacting to an operations agent in the retail store, whether the user 104 is at home and is interacting with an operations agent (e.g., service technician) who is at the user's home, or whether the user 104 (or VA 106) is using another type of channel of interaction to interact with an operations agent of the business entity.

The IMC 120, employing the model context tracker 420, can determine the context of the interaction, including context relating to the channel for user interaction (or VA interaction), and the overall context of the interaction (e.g., status of the interaction, type of interaction, behavior exhibited by the user 104 (or VA 106), action(s) or task(s) performed during the interaction, or what action(s) or task(s) remain or may remain to be performed during the interaction, . . . ) and/or the user(s) (e.g., user 104, user 114) or VA(s) (e.g., VA 106, VA 116), based at least in part on the information relating to the channel for user interaction and other information relating to the interaction, which the model context tracker 420 can obtain from the central repository 124. For each of the one or more propensity models of the one or more behaviors of the user 104 (or VA 106), the IMC 120, employing the model context tracker 420, can determine a model update for the propensity model relating to the behavior of the user 104 (or VA 106). As indicated at reference numeral 422, the IMC 120, employing the model context tracker 420, can communicate the model update(s) for the propensity model(s) to the propensity model platform 412. The propensity model platform 412 can update the propensity model(s) based at least in part on the model update(s), and can communicate the updated propensity model(s) to the real time scoring system 416 for scoring the behavior(s) of the user 104 (or VA 106) based at least in part on the updated propensity model(s).

For each updated propensity model, the IMC 120, employing the real time scoring system 416, can determine a propensity score (e.g., updated propensity score), which can be a weighted propensity score (e.g., updated weighted propensity score), for the updated propensity model relating to a behavior of the user 104 (or VA 106). As shown at reference numeral 424, the real time scoring system 416 can communicate the one or more propensity scores of the one or more propensity models of the one or more behaviors of the user 104 (or VA 106) to the propensity orchestrator 426 of the IMC 120. The IMC 120, employing the propensity orchestrator 426, can determine one or more actions that can be performed by the user 114 (e.g., operations agent), VA 116, or a component(s) of the IMC 120, based at least in part on the one or more propensity scores, to attempt to elicit performance of a defined favorable action by the user 104 (or VA 106) in response to the action(s) performed by the user 114 (e.g., operations agent), VA 116, or the component(s) of the IMC 120, in accordance with the defined interaction management criteria. The propensity orchestrator 426 can rank the respective propensity scores (e.g., respective weighted propensity scores) and the respectively associated propensity models of the respective behaviors of the user 104 (or VA 106), for example, from highest propensity score to lowest propensity score. In some embodiments, when the action recommended or instructed by the propensity orchestrator 426 involves the user 114 (or VA 116) talking to the user 104 (or VA 106) (e.g., to present an offer for a product or service to the user 104 (or VA 106)), the propensity orchestrator 426 can determine a script that the user 114 (or VA 116) can read from when talking to the user 104 (or VA 106), based at least in part on the propensity model relating to a behavior of the user 104 (or VA 106) (e.g., propensity model having the highest weighted propensity score).

In some embodiments, as indicated at reference numeral 428, the IMC 120, employing the propensity orchestrator 426, can change applications, or the configuration of an application, in accordance with (e.g., to match) a propensity score (e.g., highest weighed propensity score) of a propensity model relating to a behavior of the user 104 (or VA 106), to facilitate presenting desired information (e.g., customized information) to the user 104 (or VA 106) via an interface (e.g., display screen and/or audio speakers) of the communication device 102 of the user 104 (or via an interface of communication device 108), wherein the desired information can be determined (e.g., by the IMC 120) based at least in part on such propensity model. For example, if the user 104 is viewing (or the VA 106 is accessing) a web page on the website of the business entity, and the propensity model associated with the highest weighted propensity score indicates that the web page is to be customized to change the information on the web page to include an offer for a service that can be provided by the business entity (or an associated business entity), the IMC 120 (e.g., employing the propensity orchestrator 426 or another component of the IMC 120) can modify (e.g., customize) the web page to include information (e.g., offer information, graphics relating to the offer) regarding such offer for the service, and can present (e.g., communicate) the modified web page to the communication device 102 of the user 104 (or to the VA 106, via communication device 102 or 108) to facilitate presenting the offer to the user 104 (or VA 106).

In response to the IMC 120 changing applications, or changing the configuration of an application(s), the user 102, for example, via the communication device 102, (or the VA 106 via communication device 102 or 108) can perform a response action (e.g., accept the offer or reject the offer on the web page; or enter a particular selection from the automated audio menu; . . . ). As indicated at reference numeral 430, the IMC 120 can notate the behavior of the user 104 (or VA 106) (e.g., the response action of the user 104 (or VA 106)) to the action performed by the IMC 120 by communicating such information regarding the behavior of the user 104 (or VA 106), to the behavior tracking system 404. The IMC 120, employing the behavior tracking system 404, can store such information regarding the behavior of the user 104 (or VA 106) in the data repository 124, and the behavior tracking system 404 can determine or measure such behavior of the user 104 (or VA 106). The interaction can continue from that point, and the IMC 120 can continue to perform operations relating to determining propensities of the behaviors of the user 104 (or VA 106) and actions to perform or have the user 114 (or VA 116, IMC 120, or other component) perform, at least until the interaction has been completed.

Alternatively or additionally, as indicated at reference numeral 432, the IMC 120, employing the propensity orchestrator 426, can communicate a desired number of respective propensity scores (e.g., respective weighted propensity scores) associated with respective propensity models relating to respective behaviors of the user 104 (or VA 106), wherein the respective propensity models can indicate respective options (e.g., make an offer for a service to the user 104 (or 106), request that the user 104 (or VA 106) pay a bill, or ask the user 104 (or VA 106) for information to facilitate determining whether the user 104 (or VA 106 is a fraudster/malicious entity or not) for the user 114 (or VA 116) to consider during the interaction with the user 104 (or VA 106). As shown at reference numeral 434, the user 114, using communication device 112, (or the VA 116 using communication device 112 or 118) can present an option (e.g., present the option associated with the highest propensity score) to the user 104 (or VA 106), via the communication device 102 of the user 104 (or via the communication device 102 or 108 associated with the VA 106), for consideration by the user 104 (or VA 106), wherein, in this example interaction, such option can be an offer for the user 104 (or the VA 106 on behalf of the user 104) to purchase a service from the business entity.

As indicated at reference numeral 436, the user 104 (e.g., customer), using the communication device 102, (or the VA 106, via communication device 102 or 108) can respond to the offer (e.g., by performing an action, such as making a statement, to accept the offer, reject the offer, or take some other action in response to the offer), which can be communicated to the communication device 112 and presented to the user 114 (or can be communicated to the VA 116 via communication device 112 or 118).

As shown at reference numeral 438, the user 114 (and/or the communication device 112 and/or the IMC 120; or the VA, via communication device 112 or 118) can notate the behavior of the user 104 (or VA 106) (e.g., the response action of the user 104 (or VA 106)) to the offer presented by the user 114 (or VA 116), and can communicate such information notating such behavior of the user 104 (or the VA 106) to the behavior tracking system 404. The IMC 120, employing the behavior tracking system 404, can store such information regarding the behavior of the user 104 (or VA 106) in the data repository 124 (e.g., in the user profile of the user 104, or in the VA profile of the VA 106), and the behavior tracking system 404 can determine or measure such behavior of the user 104 (or VA 106). The interaction can continue from that point, and the IMC 120 can continue to perform operations relating to determining propensities of the behaviors of the user 104 (or VA 106) and actions to perform or have the user 114 (or VA 116) perform, at least until the interaction has been completed.

With further regard to the communication network 110 depicted in FIG. 1, a RAN of the communication network 110 can be associated with (e.g., connected to) or can comprise a core network (e.g., mobile core network) that can facilitate communications by communication devices (e.g., communication device 102, 108, 112, or 118, . . . ) wirelessly connected to the communication network 110. A communication device (e.g., communication device 102, 108, 112, or 118, . . . ) can be communicatively connected to the core network via a base station. The core network can facilitate wireless communication of voice and data associated with communication devices associated with the communication network 110. The core network can facilitate routing voice and data communications between communication devices and/or other communication devices (e.g., phone, computer, VA, email server, multimedia server, audio server, video server, news server, financial or stock information server, other communication devices associated with an IP-based network (e.g., the Internet, an intranet, . . . ) (not shown in FIG. 1) associated with the communication network 110.

In accordance with various embodiments, the communication network 110 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective communication devices (e.g., communication device 102, 108, 112, or 118, . . . ) can be associated with (e.g., communicatively connected to) the communication network 110 via a wireless communication connection or a wireline (e.g., wired) communication connection (e.g., via a cell and associated base station). The respective communication devices can operate and communicate in a communication network environment. At various times, a communication device can be communicatively connected via a wireless communication connection(s) to one or more RANs, which can comprise one or more base stations to communicatively connect the communication device to the communication network 110 to enable the communication device to communicate other communication devices associated with (e.g., communicatively connected to) the communication network 110 in the communication network environment. The one or more RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 110 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 106 (e.g., a core network, cellular network, or a network comprising a core network, cellular network, and/or an IP-based network) can facilitate routing voice and data communications between a communication device(s) (e.g., communication device 102, 108, 112, or 118, . . . ) and another communication device associated with the communication network 110 in the communication network environment. The communication network 110 and/or the core network also can allocate resources to the communication devices in the communication network 110, convert or enforce protocols, establish and enforce quality of service (QoS) for the communication devices, provide applications or services in the communication network 110, translate signals, and/or perform other desired functions to facilitate system interoperability and communication in the communication network 110 (e.g., wireless portion of the communication network 110 or wireline portion of the communication network 110). The communication network 110 and/or the core network thereof further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., communication device 102, 108, 112, or 118, . . . ) is moved through a wireless communication network environment, at various times, the communication device(s) can be connected (e.g., wirelessly connected) to one of a plurality of base stations or APs (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., base station) can serve a specified coverage area to facilitate communication by the communication device(s) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) located in the respective area covered by the respective cell, where such coverage can be achieved via a wireless link (e.g., uplink (UL), downlink (DL)). When an attachment attempt is successful, the communication device(s) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

Figure 5:
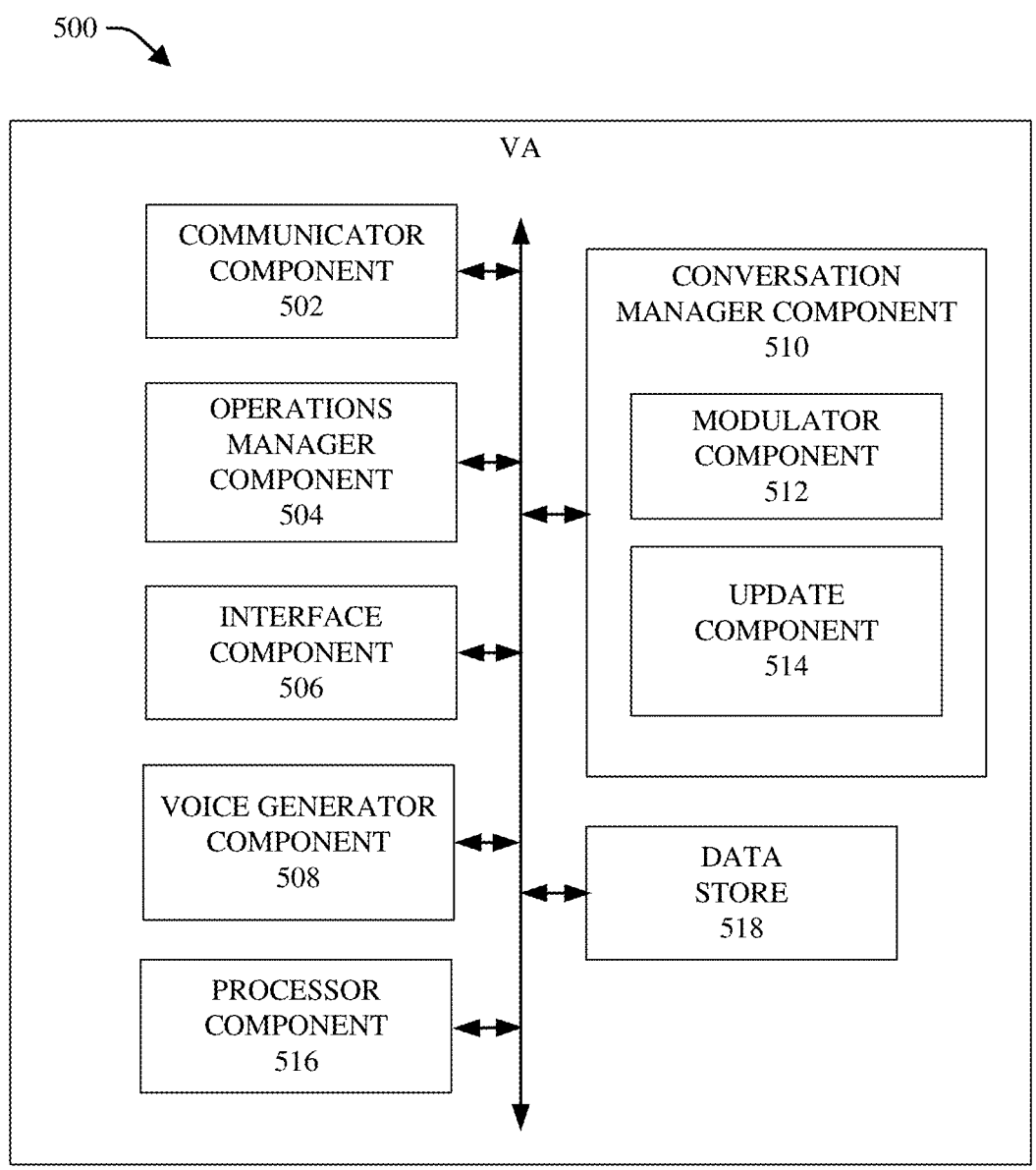
FIG. 5 depicts a block diagram of an example VA, in accordance with various aspects and embodiments of the disclosed subject matter.

FIG. 5 depicts a block diagram of an example VA 500, in accordance with various aspects and embodiments of the disclosed subject matter. The VA 500 can comprise, for example, a communicator component 502, an operations manager component 504, an interface component 506, a voice generator component 508, a conversation manager component 510, a modulator component 512, and an update component 514. In some embodiments, the VA 500 can be or can be associated with a VA device, which can be a type of communication device that includes VA capabilities.

The communicator component 502 can transmit information from the VA 500 to another component(s) or device(s) (e.g., another VA, a communication device, a network component or device, . . . ) and/or can receive information from the other component(s) or device(s). For instance, the communicator component 502 can receive (e.g., from another VA or a communication device of a user) information relating to an interaction, in connection with an interaction between the VA and the other component or device, identifier or authentication information (e.g., device ID, biometric information, communication network address (e.g., IP address), . . . ) associated with, and/or identifying or facilitating authenticating, an entity (e.g., a human user), component, or device, and/or other desired information. The communicator component 502 also can transmit, for example, information relating to an interaction, in connection with an interaction between the VA and the other component or device, identifier or authentication information associated with, and/or identifying or facilitating authenticating, the VA 500 or an entity (e.g., human user) associated with the VA 500, and/or other desired information.

The operations manager component 504 can control (e.g., manage) operations associated with the VA 500. For example, the operations manager component 504 can facilitate generating instructions to have components of the VA 500 perform desired operations, and can communicate respective instructions to respective components (e.g., communicator component 502, interface component 506, voice generator component 508, conversation manager component 510, modulator component 512, update component 514, . . . ) of the VA 500 to facilitate performance of operations by the respective components of the VA 500 based at least in part on the instructions, in accordance with the defined interaction management criteria and an interaction management algorithm(s) (e.g., interaction management algorithms as disclosed, defined, recited, or indicated herein by the methods, systems, and techniques described herein). The operations manager component 504 also can facilitate controlling data flow between the respective components of the VA 500 and controlling data flow between the VA 500 and another component(s) or device(s) (e.g., another VA, a communication device, a base station or other network node component or device of the communication network) associated with (e.g., connected to) the VA 500.

The interface component 506 can comprise one or more interfaces, such as, for example, a display screen (e.g., touch display screen), an audio interface (e.g., microphone(s), speaker(s)), keyboard, keypad, controls, buttons, etc., that can be used to present information to a user associated with (e.g., in proximity to or in communication with) the VA 500 or receive information from the user, such as information that is input to the VA 500 by the user and, for example, can be related to an interaction. The VA 500 can interact with and have a conversation with the user by using the speaker(s) of the interface component 506 to present verbal words to the user, and the VA 500 can receive, via a microphone(s) of the interface component 506, verbal words spoken by the user. As another example, the user can view information (e.g., information relating to an interaction or event) displayed on the display screen of the interface component 506.

The voice generator component 508 can generate one or more voices of the VA 500 for use in communicating (e.g., speaking) verbal words and sounds that can be emitted from the VA 500 via the interface component 506 and/or communicator component 502. A voice generated by the voice generator component 508 can be a virtual or emulated voice that can emulate, mimic, recreate, or sound similar to the actual voice of a human being. The voice can have various characteristics (e.g., word speed, speech cadence, inflection, tone, language, dialect, vocabulary level, . . . ) that can define or structure the voice and the speaking (e.g., virtual or emulated speaking) of verbal words by the voice generator component 508.

The conversation manager component 510 can manage (e.g., control, modify, or adjust) the voice (e.g., the characteristics of the virtual or emulated voice) and the emission (e.g., speaking) of verbal words by the voice generator component 508 to facilitate managing a conversation with a user or another VA during an interaction based at least in part on the context of the interaction with the user or other VA, including the verbal words spoken, and the characteristics of the verbal words spoken, by the user or other VA during the conversation. The conversation manager component 510 also can determine and manage the verbal words to be emitted by the voice generator component 508 during the conversation, based at least in part on the context of the interaction, including what was said to the VA 500 by the user or other VA participating in the conversation. For example, based at least in part on the context, the conversation manager component 510 (e.g., in coordination with, or as managed by, the CMC) can determine a question to ask or a statement to make to the user or other VA next in a conversation, a response to a question or statement made by the user or other VA to the VA 500, etc. The conversation manager component 510 can coordinate with, be managed by, and/or operate in conjunction with the CMC to facilitate managing the voice, the determination of verbal words to be emitted, the emission of verbal words, and the overall conversing by the voice generator component 508, based at least in part on the context, in accordance with the defined communication management criteria.

In some embodiments, the VA 500 can be associated with (e.g., communicatively connected to) the IMC, and the IMC can control operations of the VA 500, for example, during an interaction between the VA 500 and a user or another VA. For instance, during an interaction with the user (e.g., via a communication device of the user) or other VA, the VA 500 can receive instructions and/or a script to be employed during an interaction with the user or other VA from the IMC, wherein the IMC can determine the instructions and/or script based at least in part on the propensity score(s) (e.g., weighted propensity score(s)) associated with a behavior(s) of the user or other VA, and/or the context of the interaction, in accordance with the defined interaction management criteria, as more fully described herein. In response, the conversation manager component 510 can implement (e.g., execute or perform) the instructions and/or the script to interact with the user or the other VA, for example, by performing one or more actions based at least in part on the instructions and/or presenting the script to the user (e.g., directly to the user, or via the communication device of the user).

In certain embodiments, the conversation manager component 510 can comprise a modulator component 512 that can be utilized to modulate or adjust the voice, including adjusting the characteristics of the voice, produced by the voice generator component 508. For example, based at least in part on the context of the interaction and/or instructions or a script received from the IMC, the modulator component 512 can adjust (e.g., increase or decrease) the speed and/or cadence of the verbal words emitted by the voice generator component 508, the inflection and/or tone of the voice and/or verbal words emitted by the voice generator component 508, the language and/or dialect of the verbal words emitted by the voice generator component 508, the vocabulary level of the verbal words emitted by the voice generator component 508, the syntax of the conversation, and/or one or more other characteristics of the voice or verbal words to facilitate producing verbal words that can enhance the flow of the conversation and enhance the productivity and results of the conversation and interaction (e.g., enhance the productivity of the interaction to facilitate causing, or at least more likely causing, the user or other VA to perform a defined favorable action (e.g., acceptance of an offer for a product or service), in response to the conversation the VA 500 has with the user or other VA.

The update component 514 can be employed to provide a catch-up service to enable a user (or VA) to be caught up or updated regarding the status or progress of an interaction when the user (or VA) is entering or re-entering a conversation associated with the interaction or when an update regarding the status or progress of the interaction is otherwise desired by the user. In some embodiments, the update component 514 can coordinate with and/or can be managed by the IMC to facilitate determining whether an update is to be provided to a user (or VA) and/or the content of the update to be provided to the user (or VA). The update component 514 can determine and/or generate, facilitate determining and/or generating, or receive (e.g., from the IMC) an update, comprising interaction update information relating to the interaction, based at least in part on the current context of the interaction, including the current status or progress of the interaction, and/or based at least in part on instructions relating to the interaction (e.g., to instruct the VA 500 to perform an operation(s)), update information relating to an update regarding the interaction (e.g., update to status or progress of the interaction, update regarding behavior(s) of the user or other VA, update regarding the weighted propensity score(s) of the behavior(s) of the user or other VA as well as associated action(s) to perform with respect to the weighted propensity score(s)), and/or a script relating to the interaction (e.g., script to be presented to the user or other VA) received from the IMC. The interaction update information can comprise a summary or a subset of interaction-related information and/or event-related information, for example. The VA 500 can present the update (e.g., interaction update information) to the user or other VA via the interface component 506 or the communicator component 502.

The VA 500 also can include a processor component 516 that can work in conjunction with the other components (e.g., communicator component 502, interface component 506, voice generator component 508, conversation manager component 510, modulator component 512, update component 514, and data store 518) to facilitate performing the various functions of the VA 500. The processor component 516 can employ one or more processors, microprocessors, or controllers that can process data, such as information relating to interactions, events, contexts of interactions, status or progress of interactions, activities relating to interactions, scripts, behaviors of users or VAs, propensity scores (e.g., weighted propensity scores) relating to behaviors of users or VAs, actions associated with propensity scores, conversations associated with the VA 500, identifiers or authentication credentials associated with entities, devices, or components, voice generation of the VA 500, characteristics or modulations of the one or more voices generated by the VA 500, catch-up service, parameters, traffic flows, policies, defined interaction management criteria, algorithms (e.g., interaction management algorithm(s)), protocols, interfaces, tools, and/or other information, to facilitate operation of the VA 500, as more fully disclosed herein, and control data flow between the VA 500 and other components (e.g., other VAs, communication devices, base stations, network devices of the communication network, data sources, applications, . . . ) associated with the VA 500.

The data store 518 that can store data structures (e.g., user data, metadata), code structure(s) (e.g., modules, objects, hashes, classes, procedures) or instructions, information relating to interactions, events, contexts of interactions, status or progress of interactions, activities relating to interactions, scripts, behaviors of users or VAs, propensity scores (e.g., weighted propensity scores) relating to behaviors of users or VAs, actions associated with propensity scores, conversations associated with the VA 500, identifiers or authentication credentials associated with entities, devices, or components, voice generation of the VA 500, characteristics or modulations of the one or more voices generated by the VA 500, catch-up service, parameters, traffic flows, policies, defined interaction management criteria, algorithms (e.g., interaction management algorithm(s)), protocols, interfaces, tools, and/or other information, to facilitate controlling operations associated with the VA 500. In an aspect, the processor component 516 can be functionally coupled (e.g., through a memory bus) to the data store 518 in order to store and retrieve information desired to operate and/or confer functionality, at least in part, to the communicator component 502, interface component 506, voice generator component 508, conversation manager component 510, modulator component 512, update component 514, and data store 518, etc., and/or substantially any other operational aspects of the VA 500.

Figure 6:
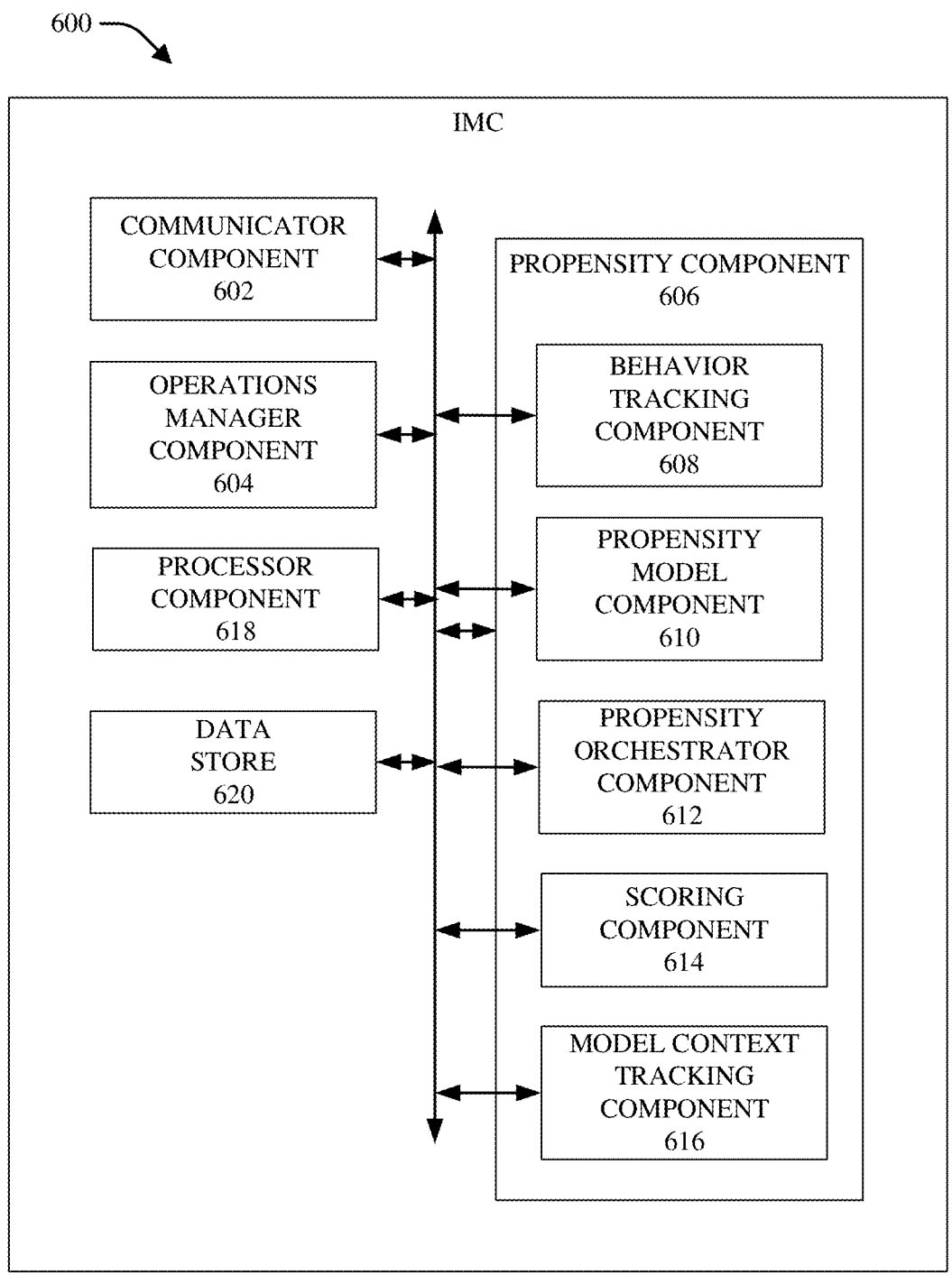
FIG. 6 illustrates a block diagram of an example interaction management component, in accordance with various aspects and embodiments of the disclosed subject matter.

FIG. 6 illustrates a block diagram of an example IMC 600, in accordance with various aspects and embodiments of the disclosed subject matter. The CMC 600 can comprise, for example, a communicator component 602, and an operations manager component 604. The IMC 600 also can comprise a propensity component 606, which can include a behavior tracking component 608 (e.g., behavior tracking system or subsystem), a propensity model component 610 (e.g., a propensity model platform), a propensity orchestrator component 612, a scoring component 614 (e.g., real time scoring system), and a model context tracker component 616 (e.g., model context tracking system). The IMC 600 further can comprise a processor component 618 and a data store 620. The IMC 600, and its sub-components, can be the same as or similar to, and/or can comprise the same or similar functionality as, respectively named components (e.g., same or similarly named components), as more fully described herein.

The communicator component 602 can transmit information from the IMC 600 to another component(s) or device(s) (e.g., a VA, a communication device, a network component or device, . . . ) and/or can receive information from the other component(s) or device(s). For instance, the communicator component 602 can receive (e.g., from a VA, or a communication device associated with a user) information relating to an interaction (e.g., interaction-related information, event-related information), identifier or authentication information (e.g., device ID, user ID, authentication credentials, biometric information, and/or communication network address, . . . ) associated with an entity, component, or device, and/or other desired information. The communicator component 602 also can, for example, transmit, to a user (e.g., communication device of a user, such as a service representative of an entity), a VA associated with an entity, or device associated with an entity (e.g., a device that can present information on a website of the entity), information relating to the interaction, instruction information to instruct a user, VA, or device associated with the entity to perform an action(s) during the interaction, script information regarding a script that the user, VA, or device is to present to another user (e.g., directly to the user, or via a communication device of the user) or another VA during the interaction, and/or other information relating to the interaction.

The operations manager component 604 can control (e.g., manage) operations associated with the IMC 600. For example, the operations manager component 604 can facilitate generating instructions to have components of the IMC 600 perform operations, and can communicate respective instructions to respective components (e.g., communicator component 602, operations manager component 604, propensity component 606, . . . ) of the IMC 600 to facilitate performance of operations by the respective components of the IMC 600 based at least in part on the instructions, in accordance with the defined interaction management criteria and a interaction management algorithm(s) (e.g., interaction management algorithms as disclosed, defined, recited, or indicated herein by the methods, systems, and techniques described herein). The operations manager component 604 also can facilitate controlling data flow between the respective components of the IMC 600 and controlling data flow between the IMC 600 and another component(s) or device(s) (e.g., a VA, a communication device, a base station or other network node component or device of the communication network) associated with (e.g., connected to) the IMC 600.

The propensity component 606 can track interactions between entities, including tracking behaviors exhibited or actions performed by entities during an interaction, words expressed by entities during an interaction, personality attributes exhibited by entities during an interaction, the type of interaction (e.g., reason for interaction, channel of interaction, . . . ), etc. The propensity component 606 also can facilitate maintaining histories, such as behavioral histories (e.g., entity profiles comprising behavioral histories), of entities involved in interactions, wherein the propensity component 606 can store information relating to interactions between entities in the data repository of or associated with the IMC 600 (e.g., in an entity profile of an entity (e.g., human customer or associated VA) participating in an interaction that is stored in the data repository) or in the data store 620.

The propensity component 606 can determine propensity models relating to behaviors of entities (e.g., user, such as a customer; or VA acting on behalf of the human user) involved in interactions with other entities (e.g., user, such as a service representative or technician, or VA acting as a service representative or technician, of a business entity), based at least in part on information relating to the interactions, historical information relating to the entities, demographic information associated with entities, and/or other information (e.g., social media information) associated with the entities, in accordance with the defined interaction management criteria. The propensity component 606 can determine propensity scores for propensity models relating to behaviors of an entity (e.g., customer or VA of a customer), wherein a propensity score for a propensity model relating to a behavior can indicate the propensity of the entity to engage in or exhibit a behavior (e.g., propensity to accept an offer for a service or product), in accordance with the defined interaction management criteria. The propensity component 606 also can apply respective weights to respective propensity scores of respective propensity models of respective behaviors to determine respective weighted propensity scores for such propensity models, in accordance with the defined interaction management component.

The propensity component 606 can determine one or more actions that another entity (e.g., user, such as a service representative or technician, or VA acting as a service representative or technician, of a business entity) participating in the interaction is to perform during the interaction to elicit, or at least attempt to elicit, a desirable favorable responsive action (e.g., acceptance of an offer for a service or product) by the entity (e.g., customer or VA of a customer), based at least in part on the respective weighted propensity scores (e.g., the highest weighted propensity score(s)) of the respective propensity models relating to respective behaviors of or associated with the entity, in accordance with the defined interaction management criteria. The propensity component 606 can continue to update propensity models during the interaction (e.g., in real time), or after the interaction, based at least in part on feedback information relating to the interaction received from the other entity to the interaction, the communication devices associated with the entities, the IMC 600, or other sources of information.

The behavior tracking component 608 can monitor, receive, track, and/or measure information relating to an interaction between entities (e.g., a user and another user, via respective communication devices; a user (e.g., via communication device of the user) and a VA (e.g., via a VA device or other communication device comprising or associated with the VA); a VA and another VA). The behavior tracking component 608 parse the information received from an entity (e.g., words spoken or presented by a user or VA; selection of a button or control; or other types of interaction by the entity) during the interaction, and can determine or measure a behavioral parameter or condition relating to a behavior(s) of the entity based at least in part on the results of the parsing of such information received from the entity.

The behavior tracking component 608 can store such information received from the entity and/or the results of the parsing of such information in the behavior(s) of the entity in the behavioral history associated with the entity. The behavior tracking component 608 can store the respective behavioral histories associated with respective entities in the data store 622 and/or in a central repository (e.g., central repository stored in the data store 622 or associated with the IMC 600).

The propensity component 606 can analyze or parse information in the behavioral history of an entity, including information relating to a current interaction (e.g., information relating to a behavior(s) of the entity during the current interaction), information relating to a previous interaction(s), and/or information associated with the entity received from an external source (e.g., social media information relating to the entity, and/or demographic information relating to demographic characteristics associated with the entity). Based at least in part on the results of such analysis or parsing, the propensity component 606 can transform such information into a format that can be usable by the propensity model component 610 to facilitate determining or generating a model (e.g., a behavioral model) of one or more behaviors of the entity. For instance, the propensity component 606 can transform respective types of information relating to respective behaviors of the entity to take into account that different types of behaviors can occur at different rates (e.g., different rates or frequencies of occurrence) and/or different times, so that the respective types of information can be understood in context when determining the propensity models relating to respective behaviors and associated propensity scores. For example, the propensity component 606 can transform information relating to monthly subscription payments for mobility services to take into account in the measurement of the behavior of the entity that the subscription payments are made by the entity on a monthly basis (e.g., as opposed to a weekly, bi-weekly, or quarterly basis). As another example, the propensity component 606 can transform information relating to the entity using a service to measure the behavior of the entity with respect to using the service on an hourly basis, as the entity may use the service one or more times during a particular hour.

As still another example of information transformation, the propensity component 606 can transform information by normalizing or standardizing such information to put such information in a normalized or standardized form that can be in a desired context for use when determining the propensity models relating to respective behaviors and associated propensity scores. For instance, the propensity component 606 can determine (e.g., calculate) an average or mean amount (or maximum or minimum amount) of a monthly bill for services over a defined time period (e.g., six months, one year, or two years, . . . ) with regard to the behavior of the entity using such services. The propensity component 606 also can determine (e.g., calculate) an average or mean (or maximum or minimum amount) of data services under a data service plan over a defined time period (e.g., six months, one year, or two years, . . . ) with regard to the behavior of the entity using such data services.

The propensity model component 610 can determine or generate respective models (e.g., propensity models) relating to respective behaviors of or associated with an entity based at least in part on the information (e.g., transformed information) relating to the one or more behaviors of or associated with the entity with respect to the current interaction or a previous interaction(s) based at least in part on the results of analyzing such information, in accordance with the defined interaction management criteria. The respective models relating to respective behaviors can relate to the same and/or different types of interactions. For example, a first model can relate to a propensity of an entity to engage in or exhibit the behavior of paying a bill for a subscription for mobility services with regard to the communication device associated with the entity, wherein the propensity model component 610 can determine or generate the first model based at least in part on the results of analyzing information relating to the current interaction (e.g., interaction relating bill payment for the mobility services, or other services or products provided by the business entity), a previous interaction(s) (e.g., previous interaction(s) relating to bill payment for services or products, or a previous interaction(s) relating to service provided by a service technician associated with the business entity), and/or demographic information relating to a demographic characteristic(s) associated with (e.g., shared by) the entity (e.g., a human user, or VA associated with the human user), which can be determined (e.g., by the IMC 600) to be relevant to the type of interaction of the current interaction.

In connection with determining one or more propensity models relating to one or more respective behaviors of or associated with an entity, the propensity model component 610 also can determine the channel of interaction associated with the interaction between entities. The channel of interaction can be, for example, a human user (e.g., customer or potential customer) using a communication device to make a phone call to an entity (e.g., human user or VA acting as a customer service representative of a business entity) and/or interacting with an automated audio menu of a call center of the business entity in connection with the phone call, the human user using a communication device to view and interact with a website of the business entity, a VA associated with (e.g., acting on behalf of) the human user contacting and interacting with a VA of the business entity (e.g., VA-to-VA communication, which can be verbal or nonverbal communication), or the human user walking into a store of the business entity and interaction with a human service representative or service technician of the business entity, etc. The propensity model component 610 can provide context information relating to the context of the interaction, including information relating to the channel of interaction associated with the interaction, to the model context tracker component 616 to facilitate determination (e.g., by the model context tracker component 616) of the context of the interaction between the entities (e.g., between human users or VAs).

The propensity orchestrator component 612 can determine one or more actions or operations for an entity (e.g., human user who is a service representative or service technician of a business entity; a VA acting as a service representative or service technician of the business entity; or the IMC 600 or associated component) to perform to interact with another entity (e.g., human user who is a customer or potential customer; or another VA acting on behalf of a customer or potential customer) during an interaction, based at least in part on one or more propensity scores (e.g., weighted propensity scores) associated with one or more propensity models relating to one or more behaviors of the other entity, in accordance with the defined interaction management criteria. Such action or operation to be performed by the entity can be or can comprise, for example, presenting (e.g., using a communication device or website of the entity) an offer for a product or service to the other entity. Such action or operation can be performed by the entity in an attempt to cause the other entity to perform a defined favorable action in response to the action or operation performed by the entity and/or to facilitate achieving a desirable outcome of the interaction (e.g., a favorable action in response or an outcome, as desired by the entity and/or business entity, such as, for example, the other entity accepting an offer for a product or service), in accordance with the defined interaction management criteria.

In some embodiments, the propensity orchestrator component 612 can determine and/or select a propensity model relating to a behavior(s) of the other entity that is associated with (e.g., having) the highest weighted propensity score, and can direct, instruct, or recommend that the entity (e.g., service representative or service technician) perform the action or operation associated with that propensity model. In certain embodiments, the propensity orchestrator component 612 can determine and/or select a set (e.g., two, three, or more) of propensity models relating to respective behaviors of the other entity that have higher propensity scores (including the highest weighted propensity score) as compared to other propensity scores associated with other behaviors of the other entity, and can direct, instruct, or recommend that the entity perform at least one of the actions associated with at least one of the propensity models (e.g., the propensity model associated with the highest weighted propensity score) and follow up by performing another one of the actions associated with another one of the propensity models of the set, as appropriate (e.g., if certain conditions are satisfied), in accordance with the defined interaction management criteria.

In some embodiments, the propensity orchestrator component 612 or another component of the IMC 600 can determine a script (e.g., script relating to an offer for a product or service) that the entity can present to the other entity as part of performing the action or operation. The propensity orchestrator component 612 or other component of the IMC 600 can present (e.g., communicate, via the communicator component 602) the script (e.g., script information) to the communication device of the entity (e.g., communication device of the service representative, or VA device).

In still other embodiments, the propensity orchestrator component 612 or another component of the IMC 600 can monitor the actions, conversations, personality attributes, and characteristics of a VA (e.g., VA acting as a service representative or service technician). The propensity orchestrator component 612 or other component of the IMC 600 can analyze information relating to the actions, conversations, personality attributes, and characteristics of the VA. Based at least in part on the results of such analysis, the propensity orchestrator component 612 or other component of the IMC 600 can determine the personality attributes of the VA (e.g., personality attributes being exhibited by the VA) and/or can determine the characteristics of the voice and verbal words being presented by a VA to another entity (e.g., human customer or associated VA) in the interaction at a given time, and/or can determine modifications that can be made to the personality attributes of the VA and/or the characteristics of the voice and verbal words being presented by a VA at a given time, based at least in part on the context determined for the interaction, to facilitate enhancing the presentation of verbal words by the VA, the conversation between the VA and the other entity, and the productivity and results of the interaction. For example, during an interaction, based at least in part on the context determined for the interaction, the propensity orchestrator component 612 or other component of the IMC 600 can determine that a speed and/or cadence of the presentation of words by the VA is to be modified (e.g., speed is to be decreased and/or cadence is to be adjusted) to facilitate enhancing the conversation between the VA and the other entity, wherein the context can indicate that the other entity is having some difficulty in understanding the verbal words being presented by the VA to the other entity.

The propensity orchestrator component 612 or other component of the IMC 600 also can manage the respective participation of respective participants (e.g., human user or VA) in an interaction, based at least in part on the context of the interaction (e.g., context at a given time during the interaction). For instance, the propensity orchestrator component 612 or other component of the IMC 600 can determine whether or when a VA (e.g., VA acting as a service representative or service technician) is to enter and participate in (or re-enter and again participate in), or leave and end participation in, an interaction with another entity (e.g., human customer or associated VA), based at least in part on the context of the interaction. The propensity orchestrator component 612 or other component of the IMC 600 can communicate with the VA, for example, via the communicator component 602 to instruct the VA (e.g., by providing instructions to the VA) whether or when to participate or not participate in the interaction.

As another example, the context of an interaction, a propensity model relating to a behavior of a human user (e.g., customer), and/or a propensity model relating to a behavior of a VA associated with the human user, at a given time, can indicate that it is acceptable or desirable for the VA of the business entity to communicate with a VA of the human user via a data communication channel, wherein the human user can become an inactive or passive member of the interaction. Based at least in part on the context and/or propensity model(s), the propensity orchestrator component 612 or other component of the IMC 600 can determine that the VA of the business entity is to communicate with the VA of the human user (e.g., using non-verbal data communication) via the data communication channel, and the human user can become an inactive or passive member of the interaction. The propensity orchestrator component 612 or other component of the IMC 600, employing the communicator component 602, can communicate information to the VA of the business entity, the other VA of the human user, a communication device of the human user, and/or a communication device of a human service representative or service technician that can indicate or instruct the VA, the other VA, the human user, and/or the human service representative or technician to have the VA and the other VA communicate data between each other (e.g., using non-verbal data communication) via the data communication channel, and to have the human user and/or human service representative or technician transition to an inactive or passive member of the interaction (unless the human user expresses a desire to continue being an active participant in the interaction).

In certain embodiments, the propensity orchestrator component 612 or other component of the IMC 600 can be employed to provide a catch-up service to enable a human user (or VA associated with the human user) to be caught up or updated regarding the status or progress of an interaction when the human user (or VA) is entering or re-entering a conversation associated with the interaction or when an update regarding the status or progress of the interaction is otherwise desired by the human user (or associated VA). In some embodiments, the propensity orchestrator component 612 or other component of the IMC 600 can coordinate with a human user (e.g., service representative or technician) or VA (e.g., VA acting as or on behalf of a service representative or technician) of the business entity to facilitate determining whether an update is to be provided to a human user (or VA associated with the user) and/or the content of the update to be provided to the human user (or associated VA). The propensity orchestrator component 612 or other component of the IMC 600 can determine and/or generate, or facilitate determining and/or generating, an update, comprising interaction update information relating to the interaction, based at least in part on the current context of the interaction, including the current status or progress of the interaction. The interaction update information can comprise, for example, a summary or a subset of interaction-related information and/or event-related information. The propensity orchestrator component 612 or other component of the IMC 600, employing the communicator component 602, can present the update (e.g., interaction update information) to the human user (e.g., communication device of the user) (or associated VA) via the VA of the business entity or by a human service representative or technician via a communication device of the human service representative or technician.

The scoring component 614 (e.g., real time scoring system) can determine (e.g., calculate) respective propensity scores (e.g., respective weighted propensity scores) for respective propensity models relating to respective behaviors of or associated with an entity based at least in part on the results of analyzing such respective propensity models and/or the underlying information (e.g., current interaction information, context information relating to the context of the current interaction, previous interaction information, and/or demographic information) associated with (e.g., utilized to determine or create) the respective propensity models, in accordance with the defined interaction management criteria, as more fully described herein. For instance, the scoring component 614 can determine a propensity score for a propensity model relating to behavior of an entity based at least in part on the results of analyzing such propensity model and/or the underlying information associated with that propensity model. The scoring component 614 also can apply respective weights (e.g., weight values) to respective propensity scores associated with respective propensity models relating to respective behaviors of or associated with the entity, including applying a desired weight to the propensity score for the propensity model relating to the behavior of or associated with the entity, to determine or generate respective weighted propensity scores associated with the respective propensity models relating to the respective behaviors of or associated with the entity, in accordance with the defined interaction management criteria, as more fully described herein.

The model context tracker component 616 can track and/or determine the context of an interaction between entities (e.g., between human users or VAs), based at least in part on the result of analyzing information relating to the interaction, to facilitate determining one or more respective propensity models relating to one or more respective behaviors of or associated with an entity (e.g., human user or VA associated with the human user) participating or associated with the interaction between the entities. The model context tracker component 616 can receive such information relating to the interaction from the entities participating in the interaction, the communication device(s) associated with the entity(ies), historical information relating to the entities, and/or demographic information relating to demographic characteristics associated with one or more of the entities.

The processor component 618 that can work in conjunction with the other components (e.g., communicator component 602, operations manager component 604, propensity component 606, . . . , and data store 620) to facilitate performing the various functions of the IMC 600. The processor component 618 can employ one or more processors, microprocessors, or controllers that can process data, such as information relating to interactions, events, transformation of information relating to interactions, contexts of interactions, status or progress of interactions, activities or actions relating to interactions, conversations associated with participants of interactions, scripts to be presented by entities, identifiers or authentication credentials associated with entities, behaviors of entities, propensity models relating to behaviors associated with entities, propensity scores and/or weighted propensity scores associated with the propensity models, devices, or components, voice generation of a VA, characteristics or modulations of one or more voices generated by a VA, catch-up (e.g., update) service, parameters, traffic flows, policies, defined interaction management criteria, algorithms (e.g., interaction management algorithm(s)), protocols, interfaces, tools, and/or other information, to facilitate operation of the IMC 600, as more fully disclosed herein, and control data flow between the IMC 600 and other components (e.g., VAs, communication devices, base stations, network devices of the communication network, data sources, applications, . . . ) associated with the IMC 600.

The data store 620 that can store data structures (e.g., user data, metadata), code structure(s) (e.g., modules, objects, hashes, classes, procedures) or instructions, information relating to interactions, events, transformation of information relating to interactions, contexts of interactions, status or progress of interactions, activities or actions relating to interactions, conversations associated with participants of interactions, scripts to be presented by entities, identifiers or authentication credentials associated with entities, behaviors of entities, propensity models relating to behaviors associated with entities, propensity scores and/or weighted propensity scores associated with the propensity models, devices, or components, voice generation of a VA, characteristics or modulations of one or more voices generated by a VA, catch-up service, parameters, traffic flows, policies, the defined interaction management criteria, algorithms (e.g., interaction management algorithm(s)), protocols, interfaces, tools, and/or other information, to facilitate controlling operations associated with the IMC 600. In an aspect, the processor component 618 can be functionally coupled (e.g., through a memory bus) to the data store 620 in order to store and retrieve information desired to operate and/or confer functionality, at least in part, to the communicator component 602, operations manager component 604, propensity component 606, and data store 620, etc., and/or substantially any other operational aspects of the IMC 600.

Figure 7:
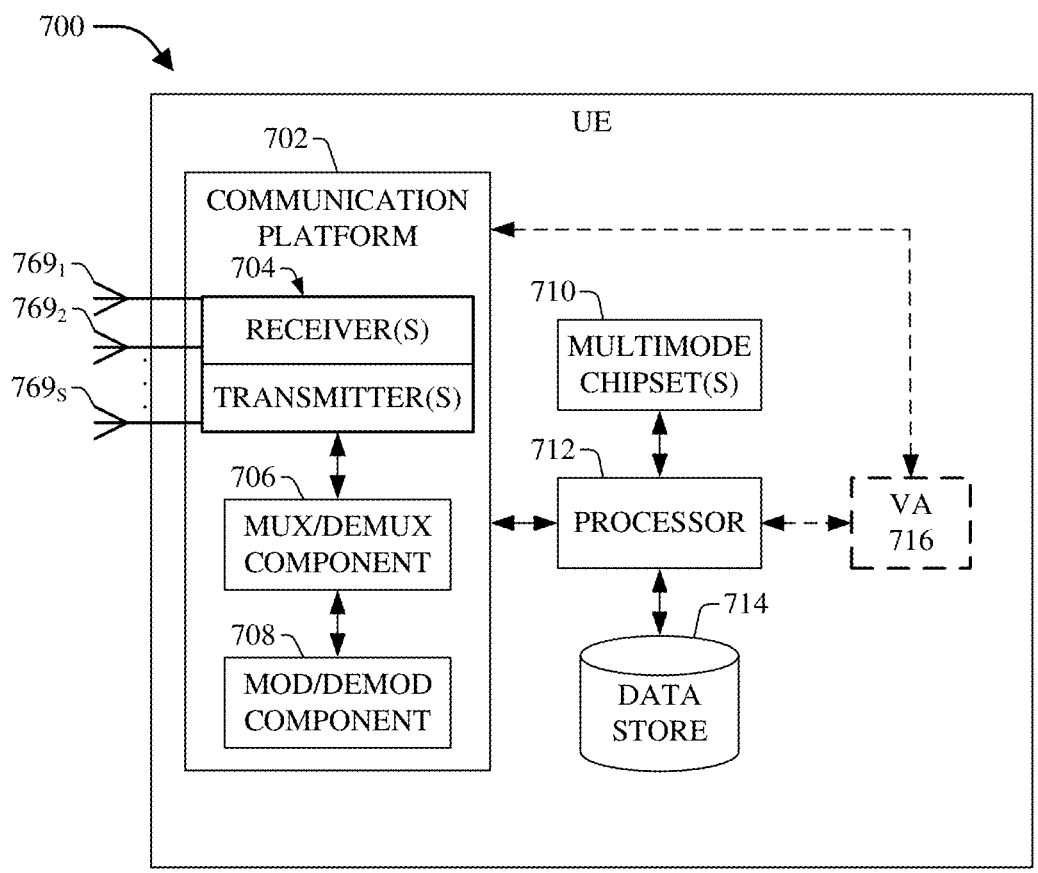
FIG. 7 depicts a block diagram of example user equipment, in accordance with various aspects and embodiments of the disclosed subject matter.

FIG. 7 depicts a block diagram of an example UE 700 (e.g., communication device) in accordance with various aspects and embodiments of the disclosed subject matter. In accordance with various embodiments, the UE 700 (e.g., communication device) can be a multimode access terminal, wherein a set of antennas $769_1$-$769_S$ (S can be a positive integer) can receive and transmit signal(s) from and to wireless devices like access points, access terminals, wireless ports and routers, and so forth, that operate in a radio access network. It should be appreciated that antennas $769_1$-$769_S$ can be a part of communication platform 702, which comprises electronic components and associated circuitry that provide for processing and manipulation of received signal(s) and signal(s) to be transmitted; e.g., receivers and transmitters 704, multiplexer/demultiplexer (mux/demux) component 706, and modulation/demodulation (mod/demod) component 708.

In some implementations, the UE 700 can include a multimode operation chipset(s) 710 that can allow the UE 700 to operate in multiple communication modes in accordance with disparate technical specification for wireless technologies. In an aspect, multimode operation chipset(s) 710 can utilize communication platform 702 in accordance with a specific mode of operation (e.g., voice, global positioning system (GPS), . . . ). In another aspect, multimode operation chipset(s) 710 can be scheduled to operate concurrently (e.g., when S>1) in various modes or within a multitask paradigm.

The UE 700 also can include a processor(s) 712 that can be configured to confer functionality, at least in part, to substantially any electronic component within the UE 700, in accordance with aspects of the disclosed subject matter. For example, the processor(s) 712 can facilitate enabling the UE 700 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 712 can facilitate enabling the UE 700 to process data relating to messaging, voice calls, or other services (e.g., Internet services or access); information relating to measurements of signal conditions with respect to cells; information relating to cells to facilitate connection to a source cell or target cell; information relating to parameters (e.g., UE parameters, network-related parameters); information relating to interactions between the UE 700 and other devices or components (e.g., VA, another communication device), as more fully described herein; and/or other data.

The UE 700 also can contain a data store 714 that can store data structures (e.g., user data, metadata); code structure(s) (e.g., modules, objects, classes, procedures) or instructions; message hashes; neighbor cell list; one or more lists (e.g., whitelist, etc.); information relating to measurements of signal conditions with respect to cells; information relating to cells to facilitate connection to a source cell or target cell; information relating to parameters (e.g., UE parameters, network-related parameters); information relating to interactions between the UE 700 and other devices or components (e.g., VA, another communication device); UE identifier; information relating to voice calls, messaging, or other services associated with the UE 700; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 712 can be functionally coupled (e.g., through a memory bus) to the data store 714 in order to store and retrieve information (e.g., neighbor cell list; signal quality measurement-related information; cell-related information; parameter information; information relating to messaging, voice calls, or other services (e.g., interactive services); information relating to interactions; frequency offsets; desired algorithms; security code; UE identifier; . . . ) desired to operate and/or confer functionality, at least in part, to communication platform 702, multimode operation chipset(s) 710, and/or substantially any other operational aspects of the UE 700.

In some embodiments, the UE 700 can comprise a VA 716 that can interact with the user of the UE 700 and/or interact with a communication device or other UE associated with the UE 700 (e.g., via a communication network). The VA 716 can be the same as or similar to, and/or can comprise the same or similar functionality as, VAs, as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
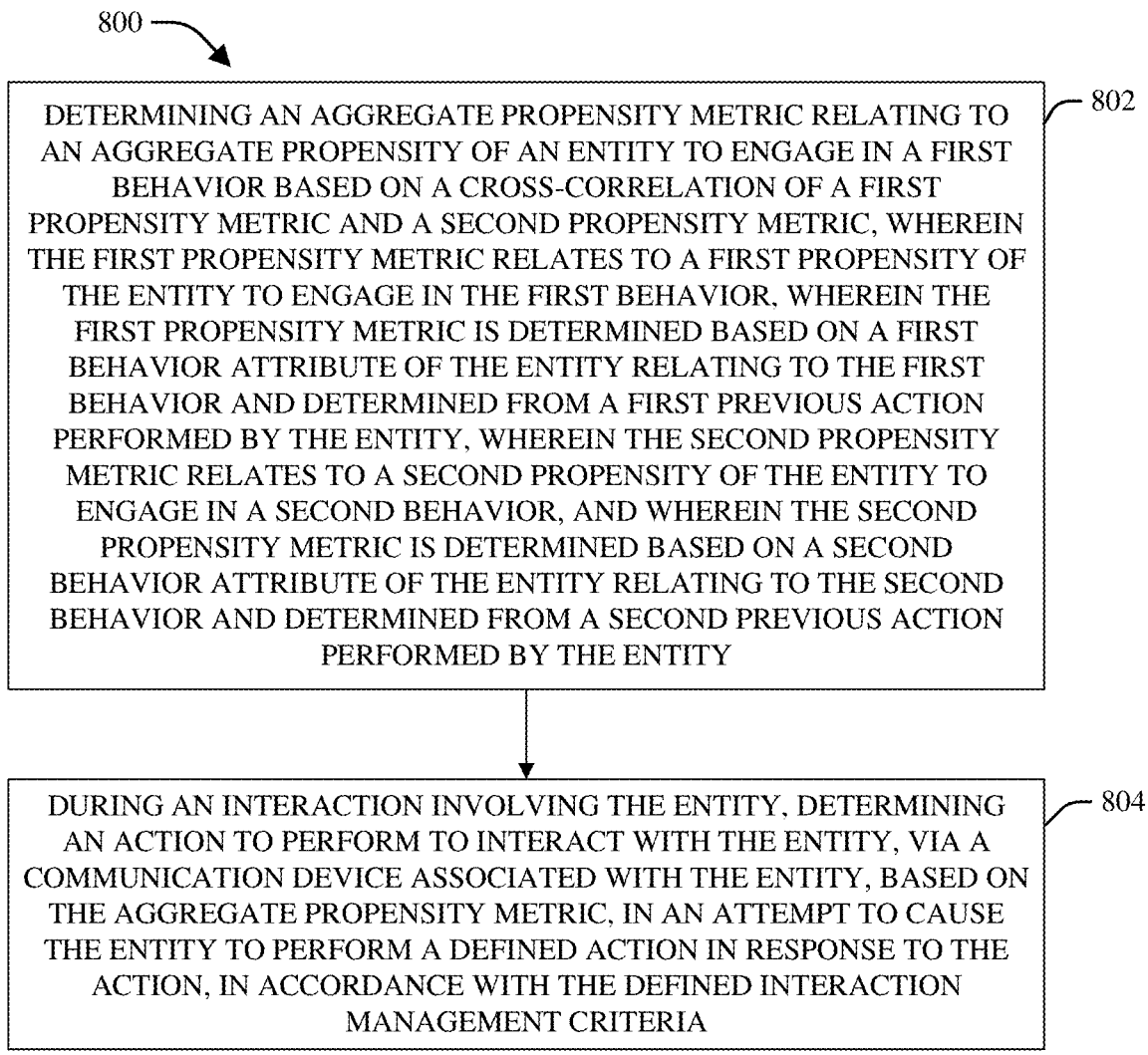
FIG. 8 illustrates a flow chart of an example method that can determine propensities of entities for various behaviors and using such propensities to facilitate managing interactions between entities, in accordance with various aspects and embodiments of the disclosed subject matter.
Figure 9:
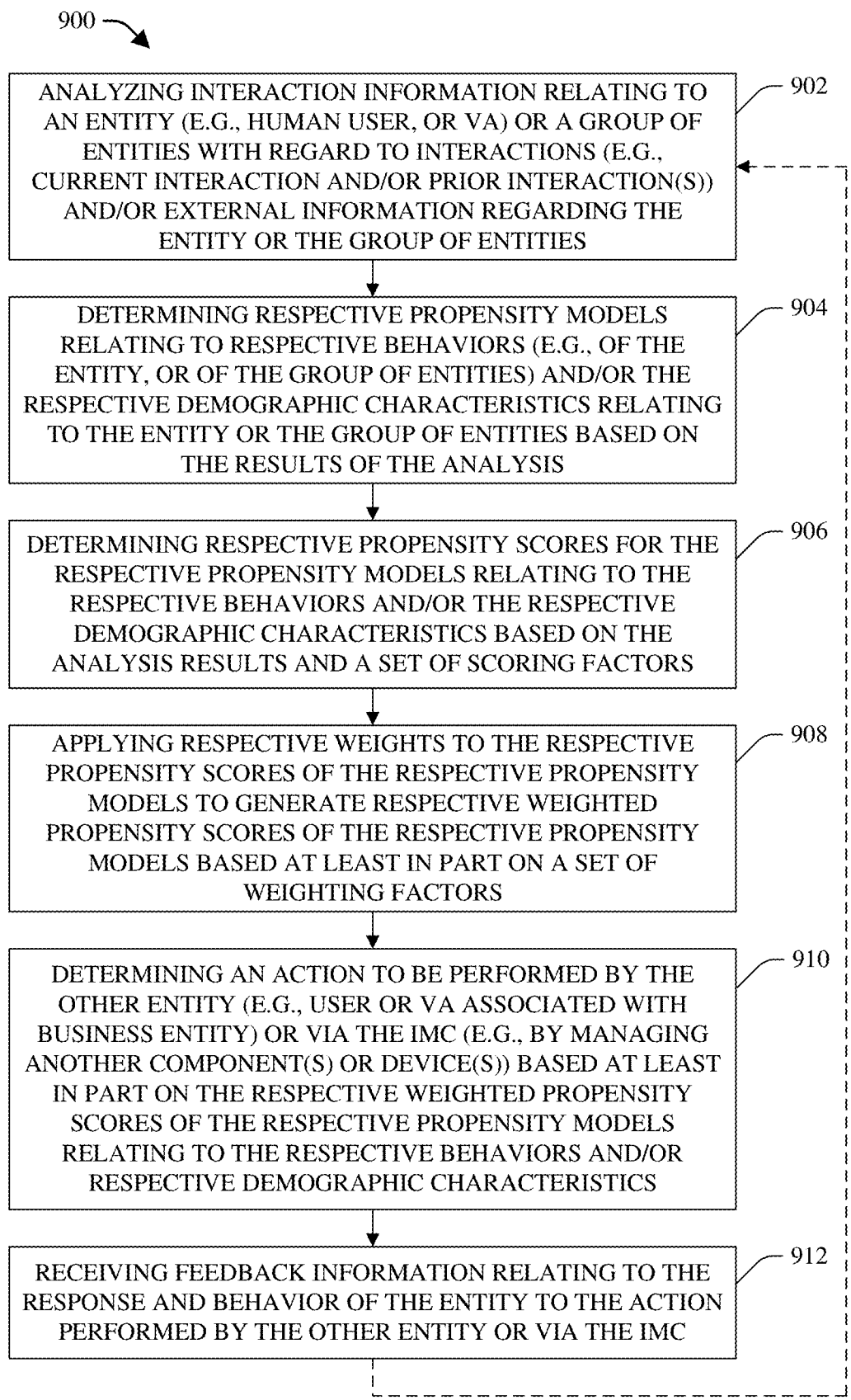
FIG. 9 depicts a flow chart of an example method that can determine and generate respective propensity models relating to respective behaviors of an entity or group of entities and/or respective demographic characteristics associated with the entity or group of entities, and determine and generate weighted propensity scores for the respective propensity models, to facilitate managing interactions between entities, in accordance with various aspects and embodiments of the disclosed subject matter.

In view of the example systems and/or devices described herein, example methods that can be implemented in accordance with the disclosed subject matter can be further appreciated with reference to flowcharts in FIGS. 8-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 that can determine propensities of entities (e.g., human users or VAs) for various behaviors and using such propensities to facilitate managing interactions between entities, in accordance with various aspects and embodiments of the disclosed subject matter. The method 800 can be employed by, for example, a system comprising the IMC (e.g., employing a propensity component), a processor component (e.g., of or associated with the IMC), and/or a data store (e.g., of or associated with the IMC). The IMC can comprise or be associated with the propensity component and/or a data repository.

At 802, an aggregate propensity metric relating to an aggregate propensity of an entity to engage in a first behavior can be determined based at least in part on a cross-correlation of a first propensity metric and a second propensity metric, wherein the first propensity metric relates to a first propensity of the entity to engage in the first behavior, wherein the first propensity metric is determined based at least in part on a first behavior attribute of the entity relating to the first behavior and determined from a first previous action performed by the entity, wherein the second propensity metric relates to a second propensity of the entity to engage in a second behavior, and wherein the second propensity metric is determined based at least in part on a second behavior attribute of the entity relating to the second behavior and determined from a second previous action performed by the entity. Prior to or during an interaction involving the entity, the IMC (e.g., employing the propensity component) can determine the first propensity metric based at least in part on the first behavior attribute of the entity (e.g., human user, or VA acting on behalf of the human user) relating to the first behavior, wherein the IMC can determine the first behavior attribute from the first previous action performed by the entity (e.g., during a previous interaction or the current interaction). The IMC also can determine the second propensity metric based at least in part on the second behavior attribute of the entity relating to the second behavior, wherein the IMC can determine the second behavior attribute from the second previous action performed by the entity. The IMC can cross-correlate the first propensity metric (and/or the underlying information) and the second propensity metric (and/or the underlying information). The IMC can determine the aggregate propensity metric relating to the aggregate propensity (e.g., inclination or proclivity) of the entity to engage in the first behavior based at least in part on the cross-correlation of the first propensity metric and the second propensity metric.

In accordance with various embodiments, as more fully described herein, the IMC can determine respective propensity metrics relating to respective behaviors based at least in part on respective information relating to respective behaviors exhibited or engaged in by the entity and/or behavior attributes determined from such information. The IMC also can determine respective propensity models relating to the respective behaviors of the entity based at least in part on the respective propensity metrics, and can determine respective weighted propensity scores relating to the respective propensity models associated with the respective behaviors of the entity, in accordance with the defined interaction management criteria, as more fully described herein.

At 804, during an interaction involving the entity, an action to perform to interact with the entity, via a communication device associated with the entity, can be determined based at least in part on the aggregate propensity metric, in an attempt to cause the entity to perform a defined action in response to the action, in accordance with the defined interaction management criteria. During the interaction, the IMC can determine an action to perform to interact with the entity, via the communication device associated with the entity, based at least in part on the aggregate propensity metric, in an attempt to cause the entity to perform the defined action (e.g., a defined favorable action) in response to the action, in accordance with the defined interaction management criteria. For instance, based at least in part on respective aggregate propensity metrics associated with respective behaviors of the entity, and/or respective aggregate weighted propensity scores relating to the respective aggregate propensity models associated with the respective behaviors of the entity as derived (e.g., determined or calculated from the propensity metrics), the IMC can determine an action to perform to interact with the entity, via the communication device associated with the entity, in an effort to prompt or cause the entity to perform the defined action (e.g., relating to a service provided by a service entity) in response to the action, in accordance with the defined interaction management criteria. For example, the action can be the one that is associated with a behavior (e.g., first behavior) of the entity that is associated with the highest weighted aggregated propensity score and associated aggregated propensity model of that behavior (e.g., first behavior), relative to the other weighted aggregate propensity scores of the other aggregate propensity models of the other behaviors associated with the entity.

The action can be an action performed by another entity (e.g., human user, VA, or another hardware and/or software-based component associated with the IMC). For example, the action can be an offer to sell a service or product that can be presented by the other entity (e.g., human customer service representative of a business, or VA acting as a customer service representative) to the entity (e.g., customer or potential customer), via the respective devices (e.g., communication devices and/or VA devices) of the respective entities. As another example, the action can be a modification of a web page of the business that is presented to the communication device of the entity, wherein the modification to the web page can customize the web page to present the offer to sell the service or product to the entity. Alternatively, the action can be another type of action (e.g., action to request that the entity pay a bill that is due, action to request the entity to participate in a survey, action to address a problem the entity is experiencing, action to transfer the entity from being served by a VA of the other entity to being served by a human customer service representative of the other entity, or other desired (e.g., suitable, appropriate, or optimal) action), in accordance with (e.g., as indicated or specified by) the defined interaction management criteria, as more fully described herein.

The defined action (e.g., defined favorable action) can be or can comprise, for example, the entity accepting the offer to purchase a product or service from the business, in response to the action to present (e.g., convey) the offer to purchase the product or service from the business, or the entity not terminating a subscription for a service provided by the business or another business associated with the business, or the entity performing another desired action, in accordance with the defined interaction management criteria, as more fully described herein. With regard to other types of actions performed by the other entity, the defined action that the other entity desires the entity to perform can vary based at least in part on the other type of action that was performed by the other entity and the desired outcome of the interaction (e.g., outcome desired by the other entity or associated business), in accordance with the defined interaction management criteria, such as more fully described herein.

FIG. 9 depicts a flow chart of an example method 900 that can determine and generate respective propensity models relating to respective behaviors of an entity or group of entities and/or respective demographic characteristics associated with the entity or group of entities, and determine and generate weighted propensity scores for the respective propensity models, to facilitate managing interactions between entities, in accordance with various aspects and embodiments of the disclosed subject matter. The method 900 can be employed by, for example, a system comprising the IMC (e.g., employing a propensity component), a processor component (e.g., of or associated with the IMC), and/or a data store (e.g., of or associated with the IMC). The IMC can comprise or be associated with the propensity component and/or a data repository.

At 902, interaction information relating to an entity (e.g., human user, or a VA associated with a human user) or a group of entities with regard to interactions (e.g., current interaction and/or prior interaction(s)) and/or external information (e.g., social media information, demographic information of demographic characteristics, and/or credit reports)

regarding the entity or the group of entities can be analyzed. The IMC can analyze the interaction information relating to the entity or the group of entities with regard to interactions and/or the external information regarding the entity or the group of entities. The IMC can perform such analysis to facilitate determining and generating respective propensity models (e.g., model-specific) relating to respective behaviors of the entity and/or determining and generating respective propensity models (e.g., model-general) relating to respective behaviors of entities associated with respective demographic characteristics (e.g., age, race, gender, religion, nationality, geographic residential location, income, wealth, employment, education, family status, type of entity (e.g., human user, or VA), . . . ).

At 904, respective propensity models relating to respective behaviors (e.g., of the entity, or of the group of entities) and/or the respective demographic characteristics relating to the entity or the group of entities can be determined based at least in part on the results of the analysis of the interaction information relating to the entity or the group of entities with regard to the interactions and/or the external information regarding the entity or the group of entities. The IMC can determine and generate the respective propensity models relating to respective behaviors (e.g., respective behaviors of the entity for model-specific propensity models, and/or respective behaviors associated with the entities for model-general propensity models) and/or the respective demographic characteristics based at least in part on the results of the analysis of the interaction information relating to the entity or the group of entities with regard to interactions and/or the external information regarding the entity or the group of entities, in accordance with the defined interaction management criteria. Such analysis of interaction information with regard to the current interaction between the entity and another entity (e.g., human user who is a service representative or technician associated with a business entity; or VA acting as a service representative or technician associated with a business entity) can comprise the IMC determining the context of the interaction, including the channel of the interaction, based at least in part on the results of analyzing the interaction information.

The respective propensity models (e.g., model-specific) of the behaviors of or associated with the entity can model or characterize respective behaviors or behavior attributes of the entity as measured or determined from the interaction information relating to the entity with regard to interactions (e.g., previous interactions or a current interaction involving the entity) and/or the external information regarding the entity, and/or can model or characterize certain behaviors or behavior attributes that the entity can be expected or predicted to have based at least in part on the demographic information regarding the demographic characteristics of the entity and the demographic information relating to the demographic characteristics of the entities of the group of entities. The respective propensity models (e.g., model-general) of the respective behaviors associated with the group of entities and the respective demographic characteristics associated with the group of entities can model or characterize respective behaviors or behavior attributes of the group of entities for the respective demographic characteristics associated with the group of entities, as those behaviors or behavior attributes can be measured or determined (e.g., by the IMC) from the interaction information relating to the group of entities and/or the external information (e.g., social media information and demographic information relating to demographic characteristics) regarding the group of entities.

At 906, respective propensity scores for the respective propensity models relating to the respective behaviors and/or the respective demographic characteristics can be determined based at least in part on the analysis results and a set of scoring factors, in accordance with the defined interaction management criteria. Based at least in part on the results of the analysis of the interaction information relating to the entity or the group of entities with regard to interactions and/or the external information regarding the entity or the group of entities and based at least in part on the set of scoring factors, the IMC can determine the respective propensity scores for the respective propensity models relating to the respective behaviors of the entity or the group of entities and/or the respective demographic characteristics associated with the entity or the group of entities, in accordance with the defined interaction management criteria.

The IMC can determine a propensity score for a propensity model relating to a behavior and/or a demographic characteristic based at least in part on the set of scoring factors, in accordance with (e.g., as indicated or specified by) the defined interaction management criteria. The scoring factors can comprise, for example, a type of behavior, a type of demographic characteristic, a relevance (e.g., determined relevance) of a demographic characteristic to a behavior, a pattern of exhibiting a behavior by the entity, a length of time an entity has exhibited a behavior, the actions performed (or not performed) by an entity with respect to a behavior, a confidence, certainty, or strength level of the determination of a behavior, and/or another desired scoring factor, such as described herein.

At 908, respective weights can be applied to the respective propensity scores of the respective propensity models to generate respective weighted propensity scores of the respective propensity models based at least in part on a set of weighting factors, in accordance with the defined interaction management criteria. The IMC can determine the respective weights to be applied to the respective propensity scores of the respective propensity models relating to the respective behaviors of the entity or the group of entities and/or the respective demographic characteristics associated with the entity or the group of entities based at least in part on the set of weighting factors, in accordance with the defined interaction management criteria. The defined interaction management criteria can indicate or specify different weights to apply to the respective propensity scores of the respective propensity models based at least in part on the set of weighting factors, comprising, for example, a type of interaction to which a propensity model(s) is to be applied, a type of behavior associated with the propensity model, a type of demographic characteristic associated with the propensity model, a level of relevance (e.g., determined level of relevance) of a behavior and/or demographic characteristic to the interaction, whether the entity(ies) is a human user(s) or a VA(s), whether the other entity (e.g., customer service representative) interacting with the entity is a human user or a VA, a business goal of a business entity associated with the interaction, a user preference (e.g., a preference of a manager of a business unit of the business entity), and/or another desired weighting factor.

At 910, an action to be performed by the other entity (e.g., user or VA associated with the business entity) or via the IMC (e.g., by managing another component(s) or device(s)) can be determined based at least in part on the respective weighted propensity scores of the respective propensity models relating to the respective behaviors and/or the respective demographic characteristics, in accordance with the defined interaction management criteria. The IMC, employing the propensity component, can determine an action (e.g., next action) that the other entity or the IMC can perform during the interaction based at least in part on the respective weighted propensity scores of the respective propensity models relating to the respective behaviors and/or the respective demographic characteristics, in accordance with the defined interaction management criteria. For instance, the IMC can determine the action that is associated with the highest weighted propensity score associated with a propensity model relating to a behavior of or associated with the entity, and can select that action to be the action to be performed by the other entity or the IMC during the interaction.

When the action is to be performed by the other entity, the IMC can present information relating to such action to the other entity, via the communication device associated with the other entity, wherein the information relating to such action can indicate what type of action the action is and/or can include a script that the other entity can use in connection with performing the action. The action can involve, for example, the other entity presenting an offer for a service or product to the entity, the other entity requesting payment of a bill by the entity, the other entity requesting additional information or additional action from the entity (e.g., to authenticate or verify the entity, and/or to determine whether the entity is a fraudster or otherwise a malicious entity), the other entity presenting a solution to an issue (e.g., problem with service or product) raised by the entity during the interaction, and/or other type of action, as is determined to be appropriate based at least in part on the respective weighted propensity scores of the respective propensity models, and the context of the interaction (which is accounted for in the propensity models and associated propensity scores).

When the action is to be performed or managed by or via the IMC, the IMC can control components or devices, for example, to customize a web page associated with the business entity that the entity is interacting with to have the web page present an offer for a service or product to the entity, request payment of a bill by the entity, request additional information or additional action from the entity (e.g., to authenticate or verify the entity, and/or to determine whether the entity is a fraudster or otherwise a malicious entity), present a solution to the issue raised by the entity during the interaction, and/or other type of action, as is determined to be appropriate based at least in part on the respective weighted propensity scores of the respective propensity models, and the context of the interaction.

At 912, feedback information relating to the response and behavior of the entity to the action performed by the other entity or via the IMC can be received. The IMC can receive the feedback information relating to the response and behavior of the entity to the action performed by the other entity or via the IMC from a communication device of the other entity, from the components or devices associated with the web page in connection with the response action performed by the entity when interacting with the web page, and/or through other monitoring of the interaction by the IMC. For instance, when the other entity performed the action, and the entity performed a response action in response to the action, the other entity can communicate feedback information relating to (e.g., notating or indicating) the behavior of the entity, including the response action performed by the entity, in response to the action performed by the entity and/or the communication device can capture such feedback information. The IMC can receive the feedback information from the communication device associated with the other entity.

If the action related to customization of the web page associated with the business entity, the IMC can monitor the website and can receive or capture the feedback information from the components or devices associated with the website, wherein the feedback information can be based at least in part on the entity's interaction with the customized web page.

At this point, the method 900 can return to reference numeral 902, wherein the feedback information can be part of the interaction information that can be analyzed (e.g., in an updated analyzed performed by the IMC), wherein the respective propensity models and respective weighted propensity scores can be updated, based at least in part on the updated analysis results, and a next action to be performed by the other entity or via the IMC can be determined based at least in part on the updated propensity models and updated weighted propensity scores.

Figure 10:
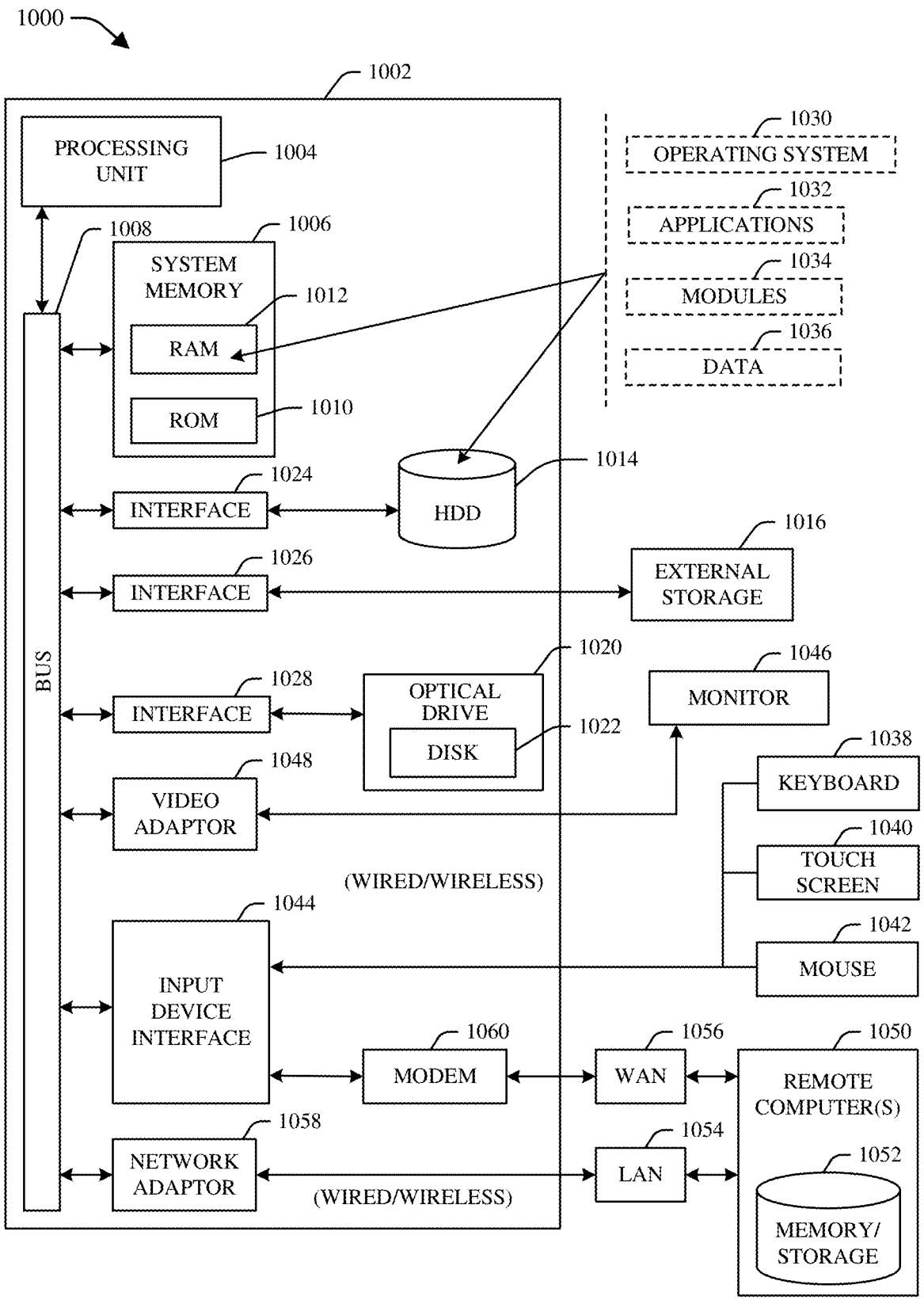
FIG. 10 is a schematic block diagram illustrating a suitable computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, virtual assistant, interaction management component, propensity component, data repository, communication network, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    determining, by a system comprising a processor, an aggregate propensity metric relating to an aggregate propensity of an entity to engage in a first behavior based on a cross-correlation of a first propensity metric and a second propensity metric, wherein the first propensity metric relates to a first propensity of the entity to engage in the first behavior, wherein the first propensity metric is determined based on a first behavior attribute of the entity relating to the first behavior and determined from a first previous action performed by the entity, wherein the second propensity metric relates to a second propensity of the entity to engage in a second behavior, and wherein the second propensity metric is determined based on a second behavior attribute of the entity relating to the second behavior and determined from a second previous action;
    during an interaction involving the entity, determining, by the system, an action to perform to interact with the entity, via a device associated with the entity, based on the aggregate propensity metric, in an attempt to cause the entity to perform a defined action, relating to a service provided by a service entity, in response to the action, in accordance with a defined interaction management criterion,
        wherein the device is one device of a group of devices comprising a virtual assistant device and a communication device, and wherein the entity is one entity of a group of entities comprising a virtual assistant associated with the virtual assistant device and a user associated with the communication device; and
    determining, by the system, whether the entity is the virtual assistant, as opposed to being the user, based on a result of analyzing behavior attributes, comprising the first behavior attribute, of the entity, wherein the behavior attributes relate to behaviors, comprising the first behavior, of the entity that are observed and measured to facilitate determining the behavior attributes of the entity.

2. The method of claim 1, wherein the service entity is a first service entity, and wherein the method further comprises:
    determining, by the system, the first propensity metric based on the first behavior attribute of the entity determined from the first previous action performed by the entity during a first interaction between the entity and a first service representative entity associated with a first business unit of the first service entity; and
    one of:
        determining, by the system, the second propensity metric based on the second behavior attribute of the entity determined from the second previous action performed by the entity during a second interaction between the entity and a second service representative entity associated with a second business unit of the service entity, or
        determining, by the system, the second propensity metric based on the second behavior attribute of the entity determined from the second previous action performed by the entity during a third interaction between the entity and a third service representative entity associated with a second service entity.

3. The method of claim 1, further comprising:
    determining, by the system, a context of the interaction based on a result of analyzing information relating to the interaction, comprising behavior information relating to the first behavior of the entity and interaction information relating to events associated with the interaction; and determining the first propensity metric relating to the first propensity of the entity to engage in the first behavior based on the first behavior attribute of the entity and the context of the interaction.

4. The method of claim 3, wherein the behavior information is first behavior information, wherein the action is a first action, wherein second behavior information relates to the second behavior of the entity, wherein the interaction information is first interaction information, wherein the result is a first result, and wherein the method further comprises:

during the interaction:
receiving, by the system, third behavior information relating to a third behavior of the entity in response to action information relating to the first action being presented to the entity via the device associated with the entity, wherein the third behavior information comprises response action information relating to an entity response action performed by the entity in response to the action information relating to the first action being presented to the entity via the device, and wherein the entity response action performed by the entity is the defined action or a disparate action;

determining, by the system, a first update to the first behavior attribute of the entity, based on a second result of analyzing the third behavior information, to generate an updated behavior attribute of the entity;

determining, by the system, a second update to the context of the interaction based on a third result of analyzing second information relating to the interaction, to generate an updated context of the interaction, wherein the second information comprises second interaction information relating to additional events associated with the interaction and the third behavior information, and wherein the additional events comprise presenting the action information relating to the first action to the entity via the device associated with the entity and the entity response action performed by the entity;

modifying, by the system, the aggregate propensity metric, based on the updated behavior attribute of the entity and the updated context of the interaction, to generate a modified aggregate propensity metric; and determining, by the system, a second action to perform to respond to the entity based on the modified aggregate propensity metric.

5. The method of claim 1, wherein the defined action is a defined favorable action, wherein the determining of the action comprises: based on the aggregate propensity metric, determining the action that is predicted to cause the entity to perform the defined favorable action in response to action information relating to the action being presented to the entity via the device, wherein the defined favorable action is determined to satisfy a threshold level of favorability, and wherein the method further comprises:

communicating, by the system, the action information relating to the action to the device to facilitate presenting the action information to the entity and the performing of the action.

6. The method of claim 5, wherein the action information comprises first action information relating to the action, and wherein the method further comprises:

communicating, by the system, second information relating to the action to a service entity device associated with the service entity to facilitate presenting, by the service entity device or the service entity, the second information to the entity via the device of the entity, wherein the determining of the action comprises: based on the aggregate propensity metric, determining the action that is predicted to cause the entity to perform the defined favorable action in response to the first action information or the second action information relating to the action being presented to the entity.

7. The method of claim 1, wherein the interaction management criterion is a first interaction management criterion, wherein the entity is determined to be the virtual assistant and wherein the method further comprises:

determining, by the system, whether the virtual assistant is a fraudulent actor based on a result of analyzing interaction information relating to a third behavior of the virtual assistant during the interaction and behavior attributes, comprising the first behavior attribute, the second behavior attribute, and a third behavior attribute relating to the third behavior, of the virtual assistant and based on a second interaction management criterion that indicates what constitutes fraudulent behavior, wherein the behavior attributes relate to the behaviors, comprising the first behavior, the second behavior, and the third behavior, of the virtual assistant.

8. The method of claim 1, further comprising:

determining, by the system, a first model, based on the first behavior associated with the entity, and a second model, based on a second behavior associated with the entity;

determining, by the system, a first score associated with the first model, based on the first propensity metric associated with the first behavior, and a second score associated with the second model, based on a second propensity metric associated with the second behavior;

applying, by the system, a first weight to the first score to generate a first weighted score associated with the first model relating to the first behavior and a second weight to the second score to generate a second weighted score associated with the second model relating to the second behavior; and determining, by the system, an aggregate score of the aggregate propensity metric relating to the aggregate propensity of the entity to engage in the first behavior based on the first weighted score and the second weighted score.

9. The method of claim 8, wherein the determining the action comprises determining the action to perform to interact with the entity, via the device associated with the entity, based on the aggregate score of the aggregate propensity metric.

10. The method of claim 1, wherein the first behavior relates to an offer interaction associated with the entity with regard to an offer regarding the service or a product, a service call interaction associated with the entity with regard to a service call, a bill payment interaction associated with the entity with regard to payment of a bill, a website interaction associated with the entity with regard to a website of a service provider, a call center interaction associated with the entity with regard to a call center of the service provider, a menu interaction with regard to a graphical menu or an audio menu presented to the entity, or a fraudulent interaction associated with the entity.

11. The method of claim 1, further comprising:

receiving, by the system, first behavior information relating to the first behavior from a first device associated with a first previous interaction with the entity, wherein the first previous interaction is associated with the previous action performed by the entity; and receiving, by the system, second behavior information relating to the second behavior from a second device associated with a second previous interaction with the entity, wherein the second previous interaction is a different interaction type than the first previous interaction, and wherein the determining of the aggregate propensity metric relating to the aggregate propensity of the entity to engage in the first behavior comprises determining the aggregate propensity metric relating to the aggregate propensity of the entity to engage in the first behavior based on a result of analyzing the first behavior information and the second behavior information.

12. The method of claim 11, further comprising:

receiving, by the system, third behavior information relating to the first behavior from a third device, wherein the third behavior information relates to a group of entities having a demographic attribute, wherein the entity has the demographic attribute, and wherein the determining of the aggregate propensity metric relating to the aggregate propensity of the entity to engage in the first behavior based on the result of the analyzing of the first behavior information and the second behavior information comprises determining the aggregate propensity metric relating to the aggregate propensity of the entity to engage in the first behavior based on the result of the analyzing of the first behavior information, the second behavior information, and the third behavior information.

13. A system, comprising:

a processor; and a memory that stores executable instructions that, when executed by the processor, facilitate performance of operations, comprising:

determining an aggregate propensity metric relating to an aggregate inclination of an entity to exhibit a first behavior based on a cross-correlation of a first propensity metric and a second propensity metric, wherein the first propensity metric relates to a first inclination of the entity to engage in the first behavior, wherein the first propensity metric is determined based on a first behavior characteristic of the entity relating to the first behavior and determined from a first entity action performed by the entity, wherein the second propensity metric relates to a second inclination of the entity to engage in a second behavior, and wherein the second propensity metric is determined based on a second behavior characteristic of the entity relating to the second behavior and determined from a second entity action;

during an interaction with the entity, determining an action to perform to interact with the entity, via a device associated with the entity, based on the aggregate propensity metric, to elicit performance of a defined action by the entity in response to the action, wherein the defined action is in accordance with a defined interaction management criterion, wherein the device is one device of a group of devices comprising a virtual assistant device and a communication device, and wherein the entity is one entity of a group of entities comprising a virtual assistant associated with the virtual assistant device and a user associated with the communication device; and determining whether the entity is the virtual assistant, rather than the user, based on a result of analyzing behavior characteristics, comprising the first behavior characteristic and the second behavior characteristic, of the entity, wherein the behavior characteristics relate to behaviors, comprising the first behavior and the second behavior, of the entity that are observed and measured to facilitate determining the behavior characteristics of the entity.

14. The system of claim 13, wherein the operations further comprise:

determining a context of the interaction based on a result of analyzing information relating to the interaction, comprising behavior information relating to the first behavior of the entity and interaction information relating to events associated with the interaction; and determining the first propensity metric relating to the first inclination of the entity to exhibit the first behavior based on the first behavior characteristic of the entity and the context of the interaction.

15. The system of claim 14, wherein the behavior information is first behavior information, wherein second behavior information relates to the second behavior of the entity, wherein the action is a first action, wherein the interaction information is first interaction information, and wherein the operations further comprise:

during the interaction:

receiving third behavior information relating to a third behavior of the entity in response to action information relating to the first action presented to the entity via the device associated with the entity, wherein the third behavior information comprises response action information relating to an entity response action performed by the entity in response to the action information relating to the first action being presented to the entity via the device, and wherein the entity response action performed by the entity is the defined action or a different action;

determining a first update to the first behavior characteristic of the entity, based on the third behavior information, to generate an updated behavior characteristic of the entity;

determining a second update to the context of the interaction based on second information relating to the interaction, to generate an updated context of the interaction, wherein the second information comprises second interaction information relating to additional events associated with the interaction and the third behavior information;

adjusting the aggregate propensity metric, based on the updated behavior characteristic of the entity and the updated context of the interaction, to generate an adjusted aggregate propensity metric; and determining a second action to perform to respond to the entity based on the adjusted aggregate propensity metric.

16. The system of claim 13, wherein the defined action is a defined favorable action, wherein the determining of the action comprises: based on the aggregate propensity metric, determining the action that is predicted to elicit the performance of the defined favorable action by the entity in response to first action information or second action information relating to the action being presented to the entity via the device, wherein the defined favorable action is determined to satisfy a minimum threshold level of favorability, wherein the operations further comprise:

communicating the first action information relating to the action to the device to facilitate presenting the first action information to the entity and the performing of the action; or communicating the second information relating to the action to a service entity device associated with a service entity to facilitate presenting, by the service entity device or the service entity, the second information to the entity via the device of the entity.

17. The system of claim 13, wherein the interaction management criterion is a first interaction management criterion, wherein the entity is determined to be the virtual assistant, and wherein the operations further comprise:

determining whether the virtual assistant is a malicious actor based on a result of analyzing interaction information relating to a third behavior of the virtual assistant during the interaction and behavior characteristics, comprising the first behavior characteristic, the second behavior characteristic, and a third behavior characteristic relating to the third behavior, of the virtual assistant and based on a second interaction management criterion that indicates what constitutes malicious behavior, wherein the behavior characteristics relate to the behaviors, comprising the first behavior, the second behavior, and the third behavior, of the virtual assistant.

18. The system of claim 13, wherein the interaction management criterion is a first interaction management criterion, wherein the entity is a user associated with the device, wherein the operations further comprise:

determining whether the user is a fraudulent actor based on a result of analyzing interaction information relating to a third behavior of the user during the interaction and behavior characteristics, comprising the first behavior characteristic the second behavior characteristic, and a third behavior characteristic relating to the third behavior, of the user and based on a second interaction management criterion that indicates what constitutes fraudulent behavior, wherein the behavior characteristics relate to the behaviors, comprising the first behavior, the second behavior, and the third behavior, of the user.

19. A non-transitory machine-readable medium, comprising executable instructions that, when executed by a processor, facilitate performance of operations, comprising:

determining an aggregate propensity score relating to an aggregate proclivity of an entity to exhibit a first behavior based on an interrelationship between a first proclivity of the entity to exhibit the first behavior and a second proclivity of the entity to exhibit the second behavior, wherein the first proclivity is determined based on a first behavior attribute of the entity that relates to the first behavior and is determined from a first previous action performed by the entity, and wherein the second proclivity is determined based on a second behavior attribute of the entity that relates to the second behavior and is determined from a second previous action performed by the entity; and during an interaction involving the entity, determining an action to perform to interact with the entity, via a device associated with the entity, based on the aggregate propensity score, in an attempt to cause the entity to perform a defined action in response to the action, in accordance with a defined interaction management criterion, wherein the device is one of a group of devices comprising a virtual assistant device and user equipment, and wherein the entity is one of a group of entities comprising a virtual assistant associated with the virtual assistant device and a user associated with the user equipment;

determining whether the entity is the user, as opposed to the virtual assistant, based on a result of analyzing behavior attributes, comprising the first behavior attribute and the second behavior attribute, of the entity, wherein the behavior attributes relate to behaviors, comprising the first behavior and the second behavior, of the entity that are observed and measured to facilitate determining the behavior attributes of the entity.

20. The non-transitory machine-readable storage medium of claim 19, wherein the operations further comprise:

analyzing information relating to the interaction, comprising behavior information relating to the first behavior of the entity and interaction information relating to events associated with the interaction;

determining a context of the interaction based on a result of the analyzing of the information relating to the interaction; and determining the first proclivity of the entity to exhibit the first behavior based on the first behavior attribute of the entity and the context of the interaction.

* * * * *